(12) United States Patent
Kang et al.

(10) Patent No.: US 12,072,734 B2
(45) Date of Patent: Aug. 27, 2024

(54) ELECTRONIC DEVICE INCLUDING ANTENNA ARRANGEMENT

(71) Applicant: SAMSUNG ELECTRONICS CO., LTD., Suwon-si (KR)

(72) Inventors: Jooyoung Kang, Suwon-si (KR); Yeonggyu Yoon, Suwon-si (KR); Inkuk Yun, Suwon-si (KR); Wonho Lee, Suwon-si (KR); Joungmin Cho, Suwon-si (KR); Junyoung Choi, Suwon-si (KR); Yangwook Kim, Suwon-si (KR); Byounguk Yoon, Suwon-si (KR); Hyunju Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 39 days.

(21) Appl. No.: 18/157,909

(22) Filed: Jan. 23, 2023

(65) Prior Publication Data

US 2023/0152850 A1    May 18, 2023

Related U.S. Application Data

(63) Continuation of application No. 17/375,894, filed on Jul. 14, 2021, now Pat. No. 11,561,576.

(30) Foreign Application Priority Data

Jul. 14, 2020   (KR) .................. 10-2020-0086795
Dec. 30, 2020   (KR) .................. 10-2020-0187278

(51) Int. Cl.
*G06F 1/16*   (2006.01)
*H01Q 1/24*   (2006.01)
*H04M 1/02*   (2006.01)

(52) U.S. Cl.
CPC .......... *G06F 1/1624* (2013.01); *G06F 1/1652* (2013.01); *H01Q 1/243* (2013.01);
(Continued)

(58) Field of Classification Search
CPC combination set(s) only.
See application file for complete search history.

(56) References Cited

U.S. PATENT DOCUMENTS 10,582,629 B2    3/2020   Xu et al.
10,887,438 B2 *  1/2021   Baek ................... H04M 1/0237
(Continued)

FOREIGN PATENT DOCUMENTS

CN    106233361 A    12/2016
JP    2016197255 A   11/2016
(Continued)

OTHER PUBLICATIONS

Supplementary European Search Report dated Jun. 22, 2023, in connection with European Patent Application No. 21843380.3, 9 pages.
(Continued)

*Primary Examiner* — Lisa Lea-Edmonds

(57) ABSTRACT

An electronic device includes a first housing including a first space and including a first support member. The device includes a second housing including a second space, including a second support member, and slidably combined with the first housing. The device includes a bendable member connected to the first housing, being at least partly accommodated in a second space in a slide-in state, and at least partly forming the same plane with the first housing in a slide-out state. The device includes a flexible display including a first part disposed to be seen from an outside in the slide-in state, and a second part not seen from the outside. The device includes at least one first antenna and a wireless (Continued)

communication circuit configured to transmit or receive a wireless signal. The first support member includes a non-overlapping part not overlapping the second support member in the slide-in state.

20 Claims, 41 Drawing Sheets

(52) U.S. Cl.
CPC ....... *H04M 1/0237* (2013.01); *H04M 1/0268* (2013.01); *H04M 1/0277* (2013.01)

(56) References Cited

U.S. PATENT DOCUMENTS

| | | | | |
|---|---|---|---|---|
| 11,003,207 | B2* | 5/2021 | Kim | G06F 1/1686 |
| 11,071,218 | B2* | 7/2021 | Wittenberg | G06F 1/1624 |
| 11,211,961 | B2 | 12/2021 | Noh et al. | |
| 11,212,379 | B2* | 12/2021 | Baek | G06F 1/1652 |
| 11,243,634 | B2* | 2/2022 | Ko | G06F 3/0446 |
| 11,304,300 | B2 | 4/2022 | Woo et al. | |
| 11,493,956 | B2* | 11/2022 | Kang | H01Q 1/243 |
| 11,561,576 | B2* | 1/2023 | Kang | G06F 1/1686 |
| 11,720,141 | B2* | 8/2023 | Kim | G06F 1/3209 345/173 |
| 2010/0177020 | A1 | 7/2010 | Bemelmans et al. | |
| 2013/0141847 | A1 | 6/2013 | Ryu | |
| 2014/0211399 | A1* | 7/2014 | O'Brien | G06F 1/1652 29/592.1 |
| 2014/0240178 | A1 | 8/2014 | Chun et al. | |
| 2015/0230349 | A1 | 8/2015 | Lee et al. | |
| 2017/0064847 | A1 | 3/2017 | Lim | |
| 2017/0068288 | A1 | 3/2017 | Uttermann et al. | |
| 2017/0154609 | A1 | 6/2017 | Yoon et al. | |
| 2017/0250460 | A1 | 8/2017 | Shin et al. | |
| 2017/0364119 | A1* | 12/2017 | Lee | G06F 1/1652 |
| 2018/0014417 | A1* | 1/2018 | Seo | H05K 1/189 |
| 2019/0268455 | A1* | 8/2019 | Baek | G06F 1/1684 |
| 2020/0020255 | A1 | 1/2020 | Yoon | |
| 2020/0218353 | A1 | 7/2020 | Song et al. | |
| 2020/0371558 | A1* | 11/2020 | Kim | H04M 1/0237 |
| 2021/0098723 | A1* | 4/2021 | Shin | G06F 1/1601 |
| 2021/0126993 | A1* | 4/2021 | Baek | G06F 1/1683 |
| 2021/0135492 | A1* | 5/2021 | Kim | H02J 50/10 |
| 2021/0263552 | A1* | 8/2021 | Kim | G06F 3/041 |
| 2022/0019261 | A1* | 1/2022 | Kang | G06F 1/1686 |
| 2023/0152850 | A1* | 5/2023 | Kang | H04M 1/0268 361/679.01 |
| 2023/0209750 | A1* | 6/2023 | Kim | H02J 7/0042 361/807 |
| 2023/0247119 | A1* | 8/2023 | Jung | G06F 1/1677 455/566 |
| 2023/0276584 | A1* | 8/2023 | Jung | G09F 9/301 361/807 |
| 2023/0352814 | A1* | 11/2023 | An | H04M 1/0237 |
| 2024/0063528 | A1* | 2/2024 | Seol | H04M 1/0216 |

FOREIGN PATENT DOCUMENTS

| | | |
|---|---|---|
| JP | 2017117433 A | 6/2017 |
| KR | 20120009846 A | 2/2012 |
| KR | 20130071606 A | 7/2013 |
| KR | 20150094833 A | 8/2015 |
| KR | 20170062327 A | 6/2017 |
| KR | 20170100972 A | 9/2017 |
| KR | 20170141438 A | 12/2017 |
| KR | 20180006533 A | 1/2018 |
| KR | 20190086305 A | 7/2019 |
| KR | 20190115888 A | 10/2019 |
| KR | 20200007366 A | 1/2020 |

OTHER PUBLICATIONS

International Search Report and Written Opinion of the International Searching Authority in connection with International Application No. PCT/KR2021/008276 issued Oct. 7, 2021, 14 pages.
International Search Report and Written Opinion of the International Searching Authority in connection with International Application No. PCT/KR2021/008279 issued Sep. 24, 2021, 16 pages.
International Search Report and Written Opinion of the International Searching Authority in connection with International Application No. PCT/KR2021/008283 issued Sep. 27, 2021, 16 pages.
International Search Report and Written Opinion of the International Searching Authority in connection with International Application No. PCT/KR2021/008273 issued Oct. 7, 2021, 6 pages.
Supplementary European Search Report dated Oct. 30, 2023, in connection with European Patent Application No. 21841844.0, 8 pages.
Supplementary European Search Report dated Oct. 30, 2023, in connection with European Patent Application No. 21842077.6, 9 pages.
Supplementary European Search Report dated Oct. 31, 2023, in connection with European Patent Application No. 21842131.1, 7 pages.
Office Action dated Nov. 9, 2023, in connection with Indian Patent Application No. 202317002790, 6 pages.

* cited by examiner

ELECTRONIC DEVICE INCLUDING ANTENNA ARRANGEMENT

CROSS-REFERENCE TO RELATED APPLICATIONS

This application is a continuation application of U.S. Non-Provisional application Ser. No. 17/375,894 filed Jul. 14, 2021, now U.S. Pat. No. 11,561,576, issued Jan. 23, 2023, which is based on and claims priority to Korean Patent Application No. 10-2020-0086795 filed on Jul. 14, 2020, and Korean Patent Application No. 10-2020-0187278 filed on Dec. 30, 2020 in the Korean Intellectual Property Office, the disclosures of which are herein incorporated by reference in their entirety.

BACKGROUND

1. Field

Various embodiments of the disclosure relate to an electronic device including an antenna arrangement.

2. Description of Related Art

An electronic device has gradually become slimmer, and has been developed so as to increase stiffness, reinforce the design aspect, and differentiate functional elements thereof at the same time. The electronic device has been deviated from the uniform rectangular shape, and has been gradually changed to various shapes. The electronic device may have a transformable structure which is convenient to carry and which can be used as a large-screen display. For example, as part of the transformable structure, the electronic device may have a structure (e.g., rollable structure or slidable structure) which can vary a display area of a flexible display through support of housings operating in a sliding manner against each other.

SUMMARY

An electronic device may include a slidable electronic device (e.g., rollable electronic device) that can be transformed to expand the display area thereof. The slid able electronic device may include a first housing (e.g., first housing structure, base housing, base bracket, or base structure) and a second housing (e.g., second housing structure, slide housing, slide bracket, or slide structure) which can be movably combined with each other in a manner that they are at least partly fitted together. For example, since the first housing and the second housing operate slid ably against each other and support at least a part of a flexible display (or expandable display), the first housing and the second housing may induce the flexible display to have a first display area in a slide-in state, and may induce the flexible display to have a second display area that is larger than the first display area in a slide-out state.

The slid able electronic device may include a driving section of a flexible display, and may include an overlapping portion in which the two housings partly overlap each other in the slide-in state and/or the slide-out state, and due to such a driving section and overlapping, the radiation performance of an antenna may be degraded.

Various embodiments of the disclosure can provide an electronic device including an antenna having an arrangement structure capable of reducing the degradation of the radiation performance.

According to various embodiments, it is possible to provide an electronic device including an antenna that can manifest excellent radiation performance regardless of the slide-in state and the slide-out state.

According to various embodiments, an electronic device may include: a first housing including a first space and including a first support member at least partly extending to the first space; a second housing including a second space, including a second support member at least partly extending to the second space, and slidably combined with the first housing along a first direction; a bendable member connected to the first housing, being at least partly accommodated in the second space in a slide-in state, and at least partly forming the same plane with the first housing in a slide-out state; a flexible display including a first part disposed to be seen from an outside in the slide-in state, and a second part extending from the first part and being at least partly accommodated in the second space so as not to be seen from the outside through the bendable member; at least one first antenna disposed in the first housing; and a wireless communication circuit disposed in the first space and configured to transmit and/or receive a wireless signal in at least one frequency band through the at least one first antenna, wherein the first support member includes a non-overlapping part not overlapping the second support member in the slide-in state and at least partly formed as a non-conductive area, and wherein as seen from an upside of the first support member, the at least one first antenna is disposed in a position overlapping the non-conductive area.

Effects that can be obtained in the disclosure are not limited to the above-described effects, and other unmentioned effects can be clearly understood by those of ordinary skill in the art to which the disclosure pertains from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
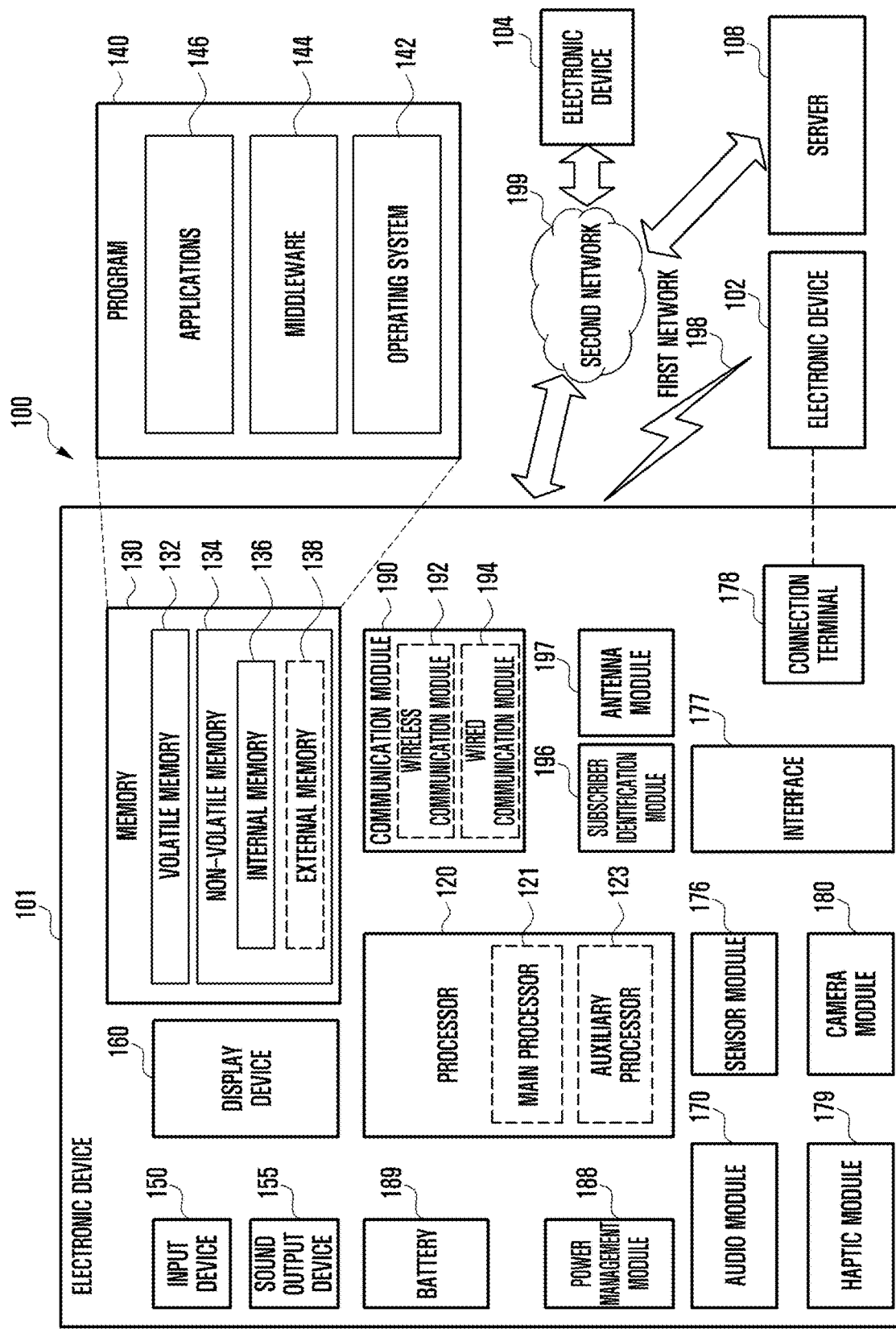
FIG. 1 illustrates a block diagram of an electronic device in a network environment according to various embodiments of the disclosure.

FIG. 1 illustrates a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
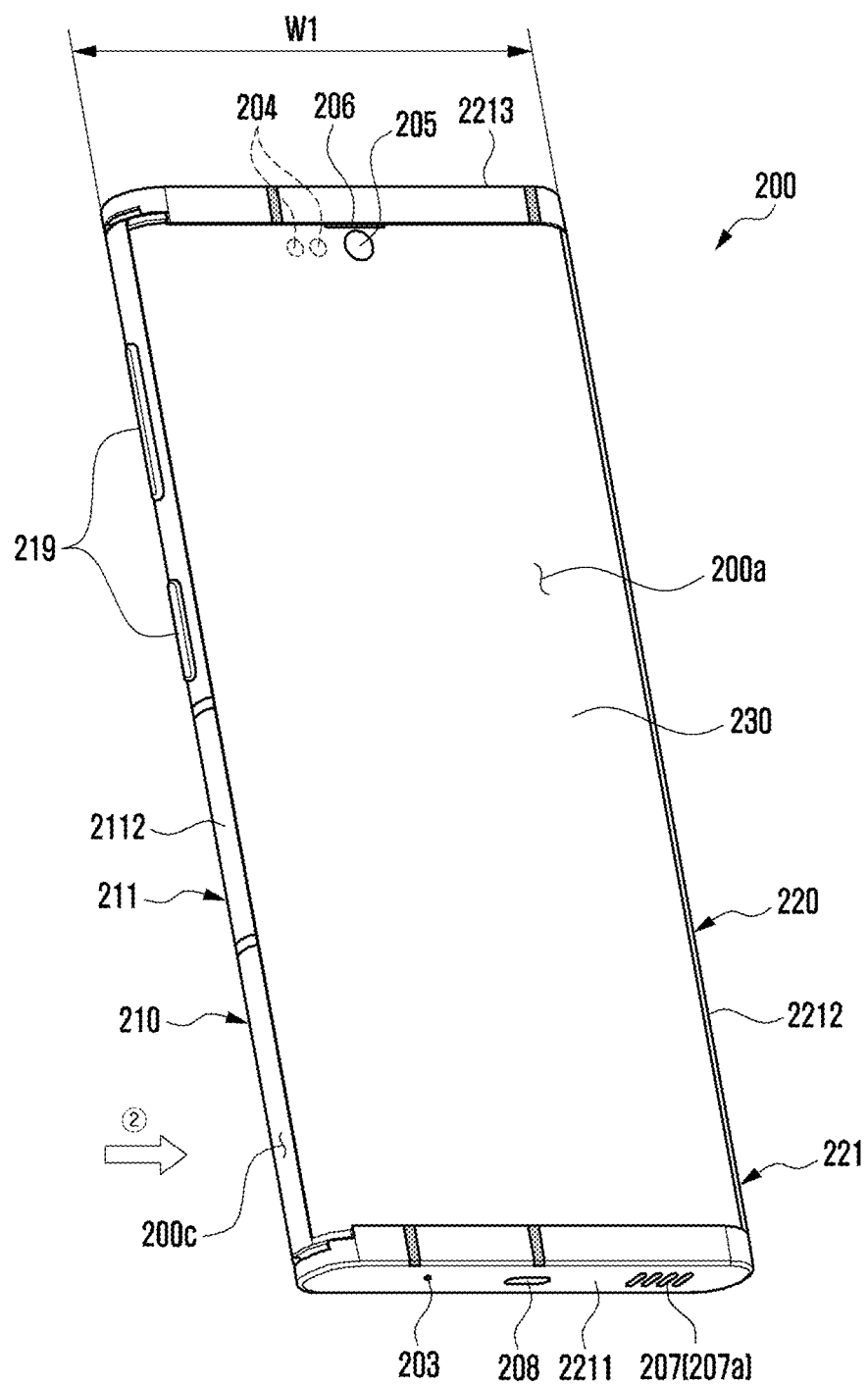
FIG. 2A illustrates a view of a front surface of an electronic device in a slide-in state according to various embodiments of the disclosure.
Figure 2B:
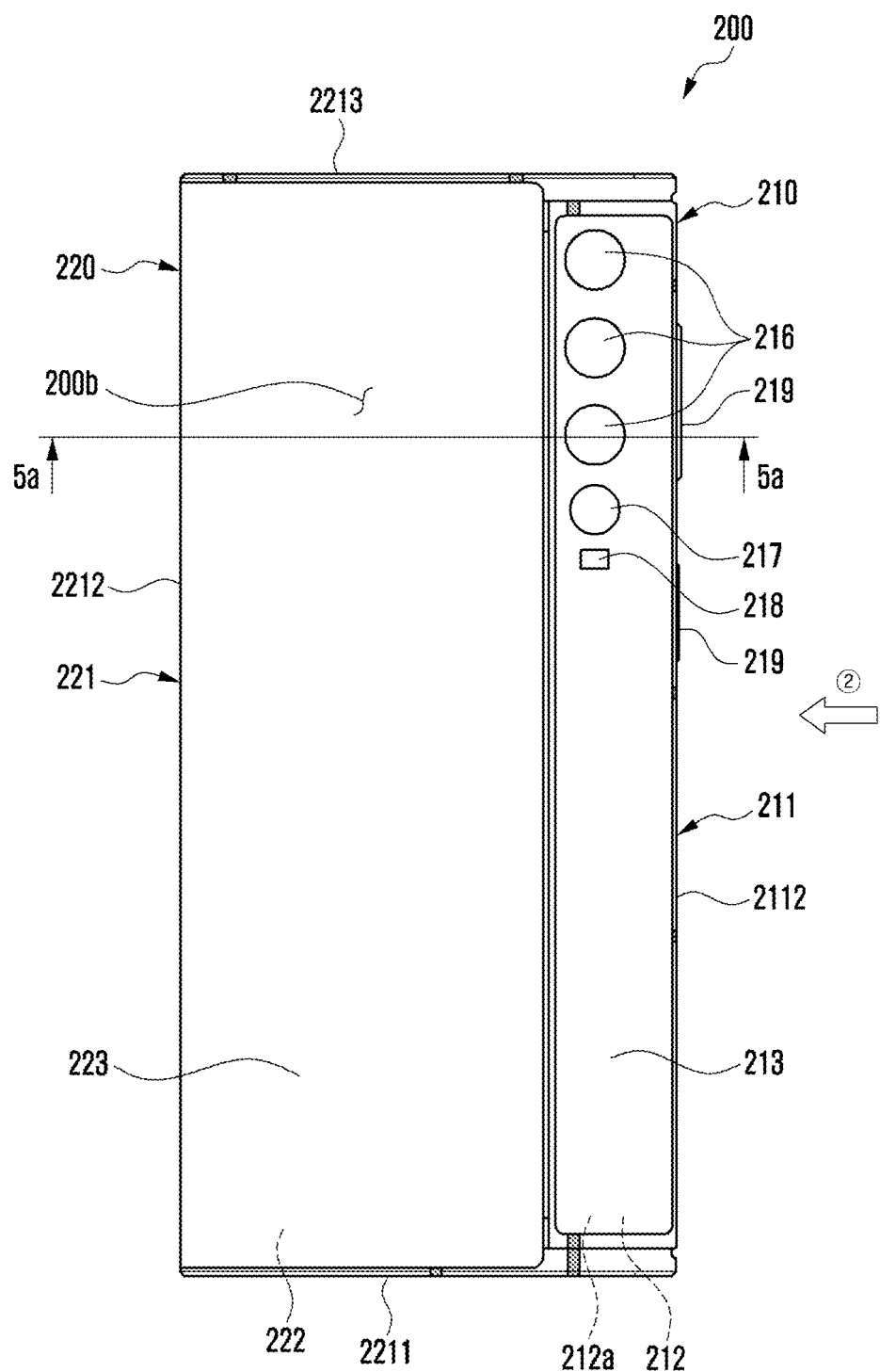
FIG. 2B illustrates a view of a rear surface of an electronic device in a slide-in state according to various embodiments of the disclosure.
Figure 3A:
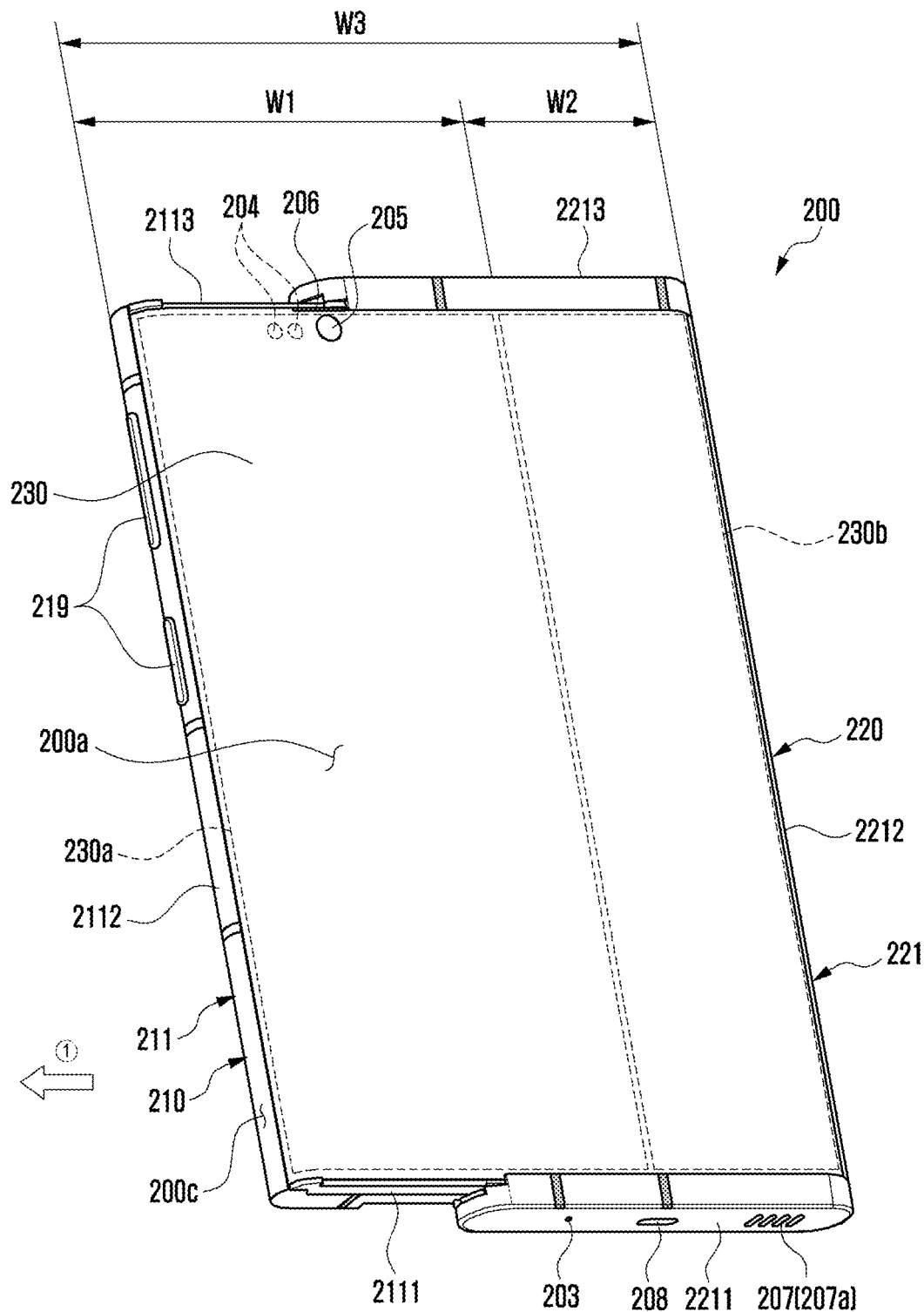
FIG. 3A illustrates a view of a front surface of an electronic device in a slide-out state according to various embodiments of the disclosure.
Figure 3B:
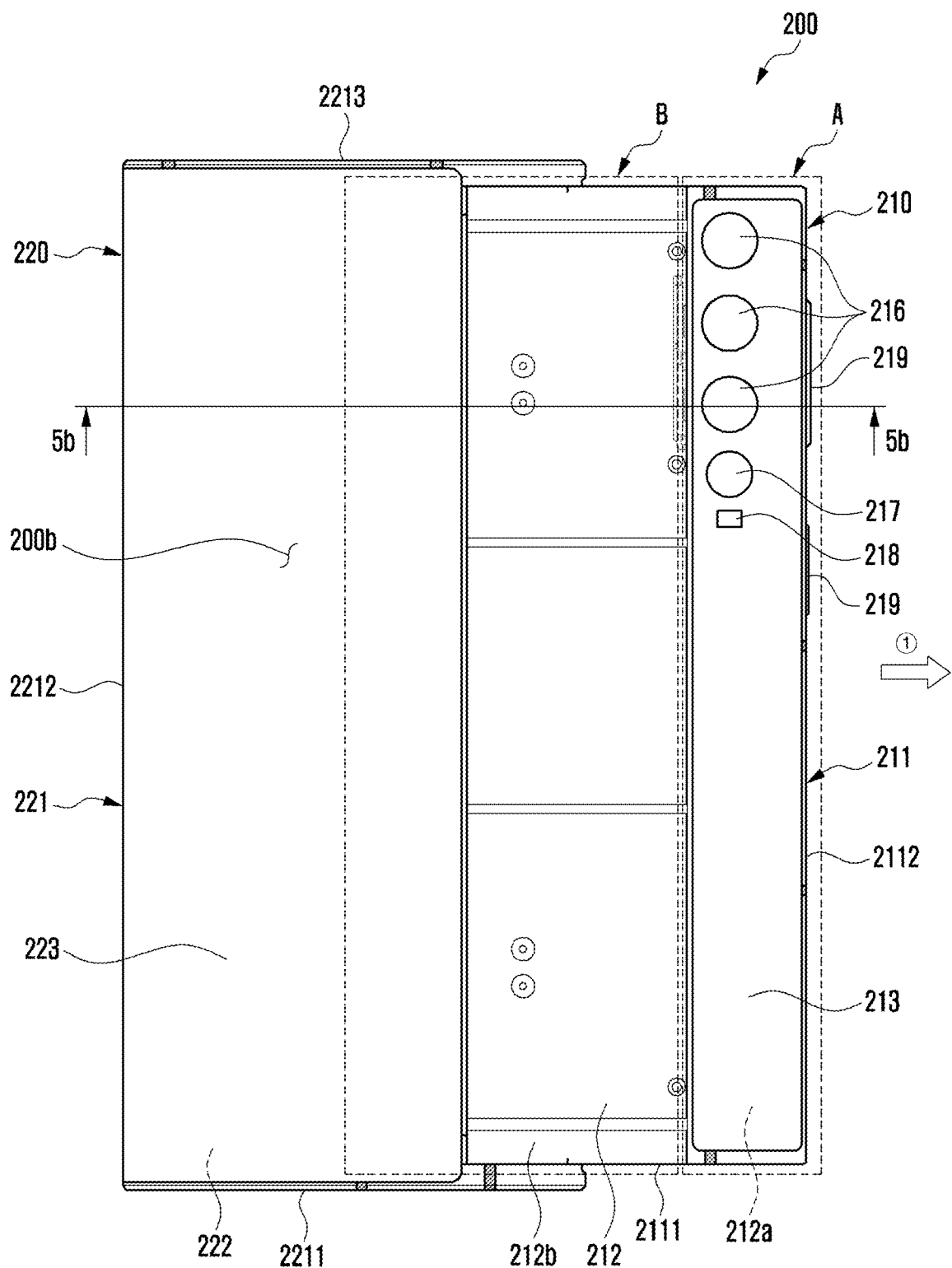
FIG. 3B illustrates a view of a rear surface of an electronic device in a slide-out state according to various embodiments of the disclosure.

FIGS. 2A and 2B illustrate views of a front surface and a rear surface of an electronic device in a slide-in state according to various embodiments of the disclosure. FIGS. 3A and 3B illustrates views of a front surface and a rear surface of an electronic device in a slide-out state according to various embodiments of the disclosure.

An electronic device 200 of FIGS. 2A to 3B may be at least partly similar to an electronic device 101 of FIG. 1, or may further include other embodiments of the electronic device.

Referring to FIGS. 2A to 3B, the electronic device 200 may include a first housing 210 (e.g., first housing structure or base housing), a second housing 220 (e.g., second housing structure or slide housing) movably combined with the first housing 210 in a designated first direction (direction ①) and a second direction (direction ②) that is opposite to the first direction (direction ①), and a flexible display 230 (e.g., expandable display) disposed to be supported through at least parts of the first housing 210 and the second housing 220. According to an embodiment, the electronic device 200 may include a bendable member or a bendable support member (e.g., bendable member 240 of FIG. 5A) (e.g., multi-joint hinge module) supporting the flexible display 230 by being at least partly connected to at least a part of the first housing 210 in a slide-out state and by being at least partly accommodated in an inner space (e.g., second space 2201 of FIG. 5A) of the second housing 220 in a slide-in state. According to an embodiment, at least a part of the flexible display 230 may be disposed so as not to be seen from an outside in the slide-in state by being accommodated in the inner space (e.g., second space 2201 of FIG. 5A) of the second housing 220 while being supported by the bendable member (e.g., bendable member 240 of FIG. 5A). According to an embodiment, the at least a part of the flexible display 230 may be disposed to be seen from the outside in the slide-out state while being supported by the bendable member (e.g., bendable member 240 of FIG. 5A) forming the same plane at least partly with the first housing 210.

According to various embodiments, the electronic device 200 may include a front surface 200a (e.g., first space), a rear surface 200b (e.g., second surface) directed in an opposite direction to the front surface 200a, and a side surface (not illustrated) surrounding a space between the front surface 200a and the rear surface 200b. According to an embodiment, the electronic device 200 may include the first housing 210 including a first side member 211 and the second housing 220 including a second side member 221. According to an embodiment, the first side member 211 may include a first side surface 2111 with a first length along the first direction (direction ①), a second side surface 2112 extending from the first side surface 2111 with a second length that is longer than the first length along a substantially vertical direction to the first direction, and a third side surface 2113 extending from the second side surface 2112 substantially in parallel to the first side surface 2111 with the first length. According to an embodiment, the first side member 211 may be at least partly formed of a conductive material (e.g., metal). According to an embodiment, the first side member 211 may include a first support member 212 extending up to at least a part of the inner space (e.g., first space 2101 of FIG. 5A) of the first housing 210. For example, the first side member 211 may be integrally formed with the first support member 212. As another example, the first support member 212 may be formed separately from the first side member 211, and may be structurally combined with the first side member 211.

According to various embodiments, the second side member 221 may include a fourth side surface 2211 corresponding to the first side surface 2111 at least partly, and having a third length, a fifth side surface 2212 extending from the fourth side surface 2211 in a direction substantially parallel to the second side surface 2112 and having a fourth length that is longer than the third length, and a sixth side surface 2213 extending from the fifth side surface 2212 to correspond to the third side surface 2113, and having the third length. According to an embodiment, the second side member 221 may be at least partly formed of a conductive material (e.g., metal). According to an embodiment, at least a part of the second side member 221 may include a second support member 222 extending up to at least a part of the inner space (e.g., second space 2201 of FIG. 5) of the second housing 220. For example, the second side member 221 may be integrally formed with the second support member 222. As another example, the second support member 222 may be formed separately from the second side member 221, and may be combined with the second side member 221.

According to an embodiment, the first side surface 2111 and the fourth side surface 2211, and/or the third side surface 2113 and the sixth side surface 2213 may be slidably combined with each other. According to an embodiment, in the slide-in state, at least a part of the first side surface 2111 may be disposed so as not to be seen from the outside by overlapping at least a part of the fourth side surface 2211. According to an embodiment, in the slide-in state, at least a part of the third side surface 2113 may be disposed so as to be seen from the outside by overlapping at least a part of the sixth side surface 2213. According to an embodiment, in the slide-in state, at least a part of the first support member 212 may overlap the second support member 222, and the remaining part of the first support member 212 may be disposed to be seen from the outside. Accordingly, in the slide-in state, the first support member 212 may include a non-overlapping part 212a that does not overlap the second support member 222 and an overlapping part 212b that overlaps the second support member 222. In a certain embodiment, the non-overlapping part 212a and the overlapping part 212b may be integrally formed. In a certain embodiment, the non-overlapping part 212a and the overlapping part 212b may be separately prepared, and may be structurally combined with each other.

Figure 4:
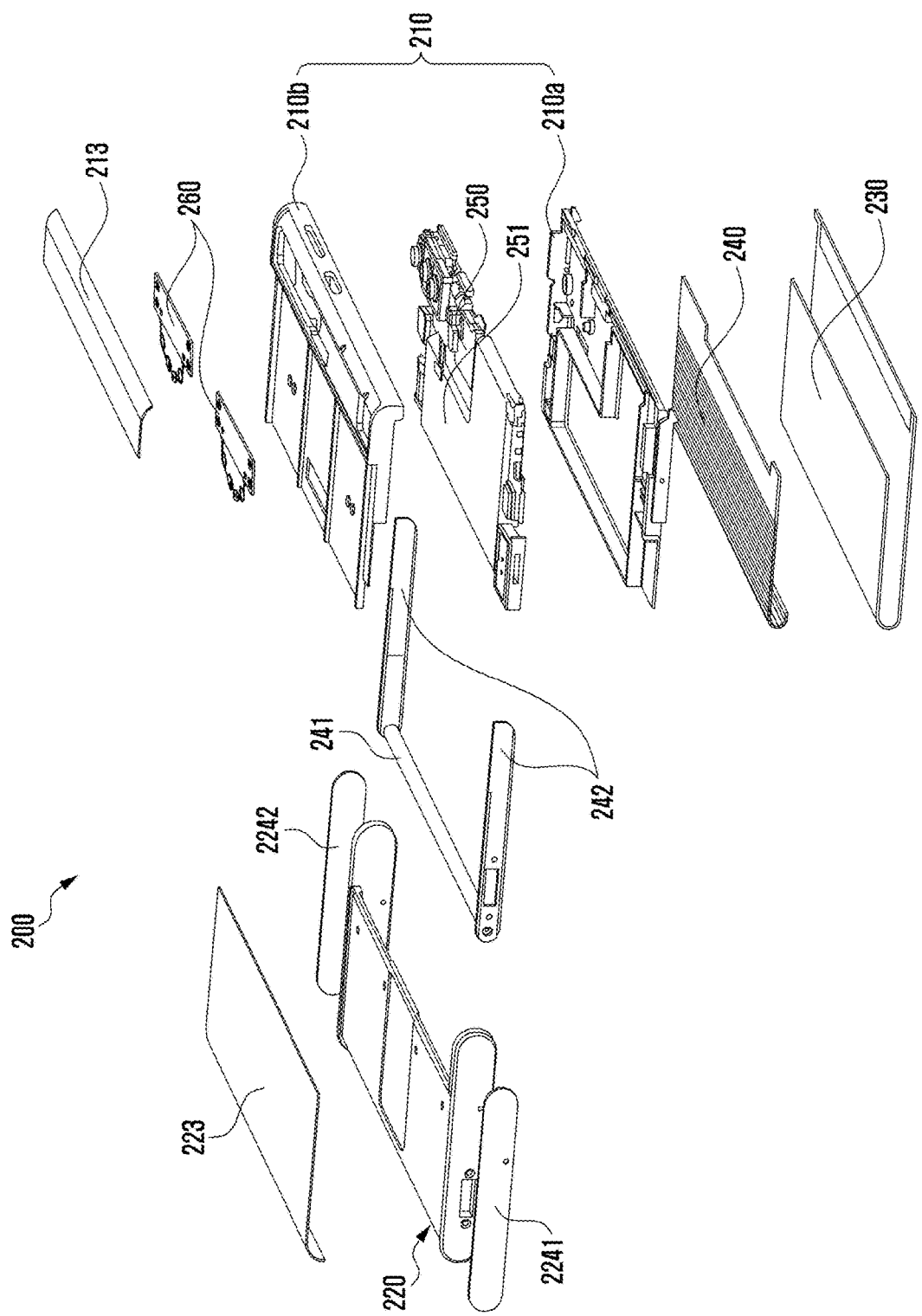
FIG. 4 illustrates an exploded perspective view of an electronic device according to various embodiments of the disclosure.
Figure 5A:
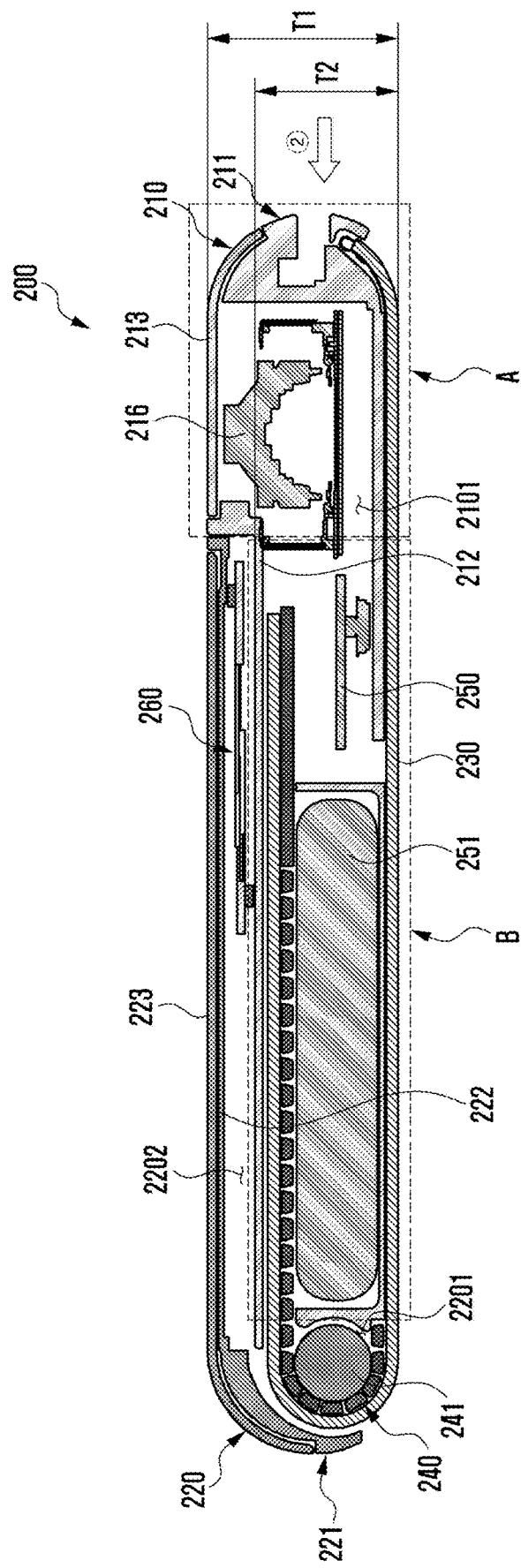
FIG. 5A illustrates a cross-sectional view of an electronic device as seen along line 5a-5a of FIG. 2B according to various embodiments of the disclosure.

According to various embodiments, the first housing 210 may include a first subspace A corresponding to the non-overlapping part 212a and/or a second subspace B corresponding to the overlapping part 212b in the first space (e.g., first space 2101 of FIG. 5A). According to an embodiment, the first subspace A and the second subspace B may be disposed in a manner that they are at least partly connected to each other or are separated from each other. According to an embodiment, the first subspace A may be formed in a different shape from the shape of the second subspace B. This may be caused by an overlapping structure in which the second support member 222 and the first support member 212 overlap each other in an area corresponding to the second subspace B. According to an embodiment, the electronic device 200 may include a plurality of electronic components (e.g., camera module 216, sensor module 217, flash 218, main board (e.g., main board 250 of FIG. 4), or battery (e.g., battery 251 of FIG. 4)) disposed in the first space (e.g., first space 2101 of FIG. 5) of the first housing 210. According to an embodiment, the first subspace A may be used, for example, as an area where the electronic components (e.g., camera module 216, sensor module 217, or flash 218) are disposed, which occupy a relatively large mounting space or a relatively large mounting thickness, or which should be operated to avoid the overlapping structure. According to an embodiment, the second subspace B may be used, for example, as an area where the electronic components (e.g., main board 250 (PCB) of FIG. 4 or battery (e.g., battery 251 of FIG. 4)) are disposed, which occupy a relatively small mounting space or a relatively small mounting thickness, or which can be operated regardless of the overlapping structure.

According to various embodiments, the front surface 200a and the rear surface 200b of the electronic device 200 may have variable areas in accordance with the slide-in state and the slide-out state. In a certain embodiment, the electronic device 200 may include a first rear cover 213 disposed on at least a part of the first housing 210 and a second rear cover 223 disposed on at least a part of the second housing 220 on the rear surface 200b. According to an embodiment, the first rear cover 213 and/or the second rear cover 223 may be disposed in a manner that they are combined with at least parts of the first support member 212 and the second support member 222. In a certain embodiment, the first rear cover 213 may be formed in conjunction with the first side member 211. As another embodiment, the second rear cover 223 may be formed in conjunction with the second side member 221. According to an embodiment, the first rear cover 213 and/or the second rear cover 223 may be formed by polymer, coated or colored glass, ceramic, metal (e.g., aluminum, stainless steel (STS), or magnesium), or a combination of at least two of the above materials. In a certain embodiment, the first rear cover 213 may extend up to at least parts of the first side members 211. In a certain embodiment, the second rear cover 223 may extend up to at least a part of the second side member 221. In a certain embodiment, at least an extending part of the first side member 211 of the first rear cover 213 may be formed into a curved surface. In a certain embodiment, at least an extending part of the second side member 221 of the second rear cover 223 may be formed into a curved surface. In a certain embodiment, at least a part of the first support member 212 may be replaced by the first rear cover 213, and at least a part of the second support member 222 may be replaced by the second rear cover 223.

According to various embodiments, the electronic device 200 may include the flexible display 230 disposed to be supported by at least parts of the first housing 210 and the second housing 220. According to an embodiment, the flexible display 230 may include a first part 230a (e.g., planar part) that is seen from the outside, and a second part 230b (e.g., flexible part) extending from the first part 230a and at least partly sliding into the inner space (e.g., first space 2101 of FIG. 5A) of the second housing 220 so as not to be seen from the outside in the slide-in state. According to an embodiment, the first part 230a may be disposed to be supported by the first housing 210, and the second part 230b may be disposed to be at least partly supported by the bendable member (e.g., bendable member 240 of FIG. 5). According to an embodiment, in a state where the first housing 210 slides out along the designated first direction (direction ①), at least a part of the second part 230b of the flexible display 230 may extend from the first part 230a while being supported by the bendable member (e.g., bendable member 240 of FIG. 5A), may form the substantially the same plane with the first part 230a, and may be disposed to be seen from the outside. According to an embodiment, in a state where the first housing 210 slides in along the designated second direction (direction ②), at least a part of the second part 230b of the flexible display 230 may slide into the inner space (e.g., second space 2201 of FIG. 5A) of the second housing 220, and may be disposed so as not to be seen from the outside. Accordingly, in the electronic device 200, as the first housing 210 moves to slide against the second housing 220 along the designated direction, the display area of the flexible display 230 may be varied.

According to various embodiments, the first housing 210 and the second housing 220 may be operated in a sliding manner so that the overall width is varied against each other. According to an embodiment, in the slide-in state, the electronic device 200 may be configured to have a first width W1 measured from the second side surface 2112 to the fourth side surface 2211. According to an embodiment, in the slide-out state, the electronic device 200 may be configured to have a third width W3 that is larger than the first width W1 since a part of the bendable member (e.g., bendable member 240 of FIG. 5A) that slides into the inner space (e.g., second space 2201 of FIG. 5A) of the second housing 220 moves to have an additional second width W2. For example, the flexible display 230 may have a display area substantially corresponding to the first width W1 in the slide-in state, and may have an extended display area substantially corresponding to the third width W3 in the slide-out state.

According to various embodiments, the slide-out operation of the electronic device 200 may be performed through a user's operation. For example, the electronic device 200 may be transitioned from the slide-in state to the slide-out state through the operation of the flexible display 230 being pushed in the designated first direction (direction ①)

through the user's operation. According to an embodiment, the electronic device 200 may be transitioned from the slide-out state to the slide-in state through the operation of the flexible display 230 being pushed in the designated second direction (direction ②) through the user's operation. According to an embodiment, the electronic device 200 may maintain the slide-out state and the slide-in state since the first housing 210 is pressed in a slide-in direction or in a slide-out direction based on a designated inflection point against the second housing 220 through a slide hinge module (e.g., slide hinge module 260 of FIG. 5A) disposed between the first housing 210 and the second housing 220. In a certain embodiment, the electronic device 200 may be configured so that the first housing 210 slides out in the designated first direction (direction ①) through an operation of a locker exposed through the rear surface 200b of the electronic device 200. In a certain embodiment, the electronic device 200 may be automatically operated through a drive mechanism (e.g., drive motor, deceleration module, and/or gear assembly) disposed in the inner space (e.g., first space 2101 of FIG. 5A) of the first housing 210 and/or the inner space (e.g., second space 2201 of FIG. 5A) of the second housing 220. According to an embodiment, in case of detecting an event for transition of the slide-in/slide-out states of the electronic device 200 through the processor (e.g., processor 120 of FIG. 1), the electronic device 200 may be configured to control the operation of the second housing 220 through the drive mechanism. In a certain embodiment, the processor (e.g., processor 120 of FIG. 1) of the electronic device 200 may control the flexible display 230 to display objects in various ways corresponding to the changed display area of the flexible display 230 and to execute application programs in accordance with the slide-in state, the slide-out state, or an intermediate state (e.g., including a free stop state). For example, the intermediate state may mean an intermediate state between the slide-in state and the slide-out state. For example, a state that is changed from the slide-in state to the slide-out state may be the intermediate state. As another example, a state that is changed from the slide-out state to the slide-in state may be the intermediate state.

According to various embodiments, the electronic device 200 may include at least one of an input device 203, sound output devices, sensor modules 204 and 217, camera modules 205 and 216, a connector port 208, a key input device 219, or an indicator (not illustrated). As another embodiment, the electronic device 200 may be configured to omit at least one of the above-described constituent elements or to additionally include other constituent elements.

According to various embodiments, the input device 203 may include a microphone. In a certain embodiment, the input device 203 may include a plurality of microphones disposed to detect the direction of sound. The sound output devices may include speakers. The sound output devices may include a call receiver 206 and an external speaker 207. According to an embodiment, the external speaker 207 may be disposed in the second housing, and may be configured to transfer sound to the outside through a first speaker hole 207a. According to an embodiment, the external speaker 207 is disposed in the inner space (e.g., second space 2201 of FIG. 5A) of the second housing 220, and thus can provide sound of an excellent quality to a user regardless of the sliding operation of the first housing 210. According to an embodiment, together with the external speaker 207, the connector port 208 may be disposed in the inner space (e.g., inner space 2101 of FIG. 5A) of the second housing 220. In a certain embodiment, the connector port 208 may be disposed in the inner space of the first housing 210, and in the slide-in state, the connector port 208 may face the outside through a connector port hole (not illustrated) formed on the second housing 220. In this case, the connector port 208 may be configured to be hidden so as not to be seen from the outside through the second housing 220 in the slide-in state. According to an embodiment, the receiver 206 may be configured to correspond to an external environment in the inner space (e.g., first space of FIG. 5A) of the first housing 210. In this case, the first housing may include an acoustic emission hole (e.g., acoustic emission hole 206a of FIG. 17). According to an embodiment, the acoustic emission hole (acoustic emission hole 206a of FIG. 17) may be hidden so as not to be seen from the outside through at least a part of the second housing 220 in a state where the acoustic emission performance is maintained. In a certain embodiment, the sound output devices 206 and 207 may include speakers (e.g., piezo speakers) operating in a state where separate speaker holes are excluded.

According to various embodiments, the sensor modules 204 and 217 may generate electrical signals or data values corresponding to an internal operation state of the electronic device 200 or an external environment state. For example, the sensor modules 204 and 217 may include a first sensor module 204 (e.g., proximity sensor or illumination sensor) disposed on the front surface 200a of the electronic device 200 and/or a second sensor module 217 disposed on the rear surface 200b. According to an embodiment, the first sensor module 204 may be disposed under the flexible display 230 on the front surface 200a of the electronic device 200. According to an embodiment, the first sensor module 204 and/or the second sensor module 217 may include at least one of a proximity sensor, an illumination sensor, a time of flight (TOF) sensor, an ultrasonic sensor, a fingerprint recognition sensor, a gesture sensor, a gyro sensor, a barometric pressure sensor, a magnetic sensor, an acceleration sensor, a grip sensor, a color sensor, an infrared (IR) sensor, a bio-sensor, a temperature sensor, or a humidity sensor.

According to various embodiments, the camera modules 205 and 216 may include a first camera module 205 disposed on the front surface 200a of the electronic device 200 and a second camera module 216 disposed on the rear surface 200b. According to an embodiment, the electronic device 200 may include the flash 218 located near the second camera module 216. According to an embodiment, the camera modules 205 and 216 may include one or a plurality of lenses, image sensors, and/or image signal processors. According to an embodiment, the first camera module 205 may be disposed under the flexible display 230, and may be configured to photograph the subject through a part of an active area of the flexible display 230. According to an embodiment, the flash 218 may include, for example, light emitting diodes or xenon lamps.

According to various embodiments, the first camera module 205 of the camera modules 205 and 216 and/or the sensor module 204 of the sensor modules 204 and 217 may be disposed so as to come in contact with the external environment through an opening or transmission area perforated on the flexible display 230 in the inner space (e.g., first space 2101 of FIG. 5A) of the electronic device 200. According to an embodiment, an area facing the first camera module 205 of the flexible display 230 may be a part of an area on which content is displayed, and may be formed as a transmissive area having a designated transmittance. According to an embodiment, the transmissive area may be formed to have the transmittance in the range of about 5% to 20%. The transmissive area may include an area which overlaps the effective area (e.g., field of view area) of the first camera module 205 and through which light for creating an image through image formation by an image sensor passes. For example, the transmission area of the flexible display 230 may include an area having a pixel density and/or wiring density which are lower than those of the surroundings. For example, the transmissive area may replace the above-described opening. For example, the camera module 205 may include an under display camera (UDC). In a certain embodiment, the sensor module 204 may be disposed to perform the function thereof without being visually exposed through the flexible display 230 in the inner space of the electronic device 200. According to an embodiment, the second camera module 216 of the camera modules 205 and 216 and/or the sensor module 217 of the sensor modules 204 and 217 may be disposed to correspond to the external environment through at least a part (e.g., first rear cover 213) of the first housing in the inner space (e.g., first space 2101 of FIG. 5A) of the electronic device 200. In this case, the second camera module and/or the sensor module 217 may be disposed in designated positions of the first housing 210 that is seen from the outside regardless of the slide-in state and/or the slide-out state.

FIG. 4 illustrates an exploded perspective view of an electronic device according to various embodiments of the disclosure.

Referring to FIG. 4, an electronic device 200 may include a first housing 210 including a first space (e.g., first space 2101 of FIG. 5A), a second housing 220 slidably combined with the first housing 210 and including a second space (e.g., second space 2201 of FIG. 5A), a bendable member 240 at least partly rotatably disposed in the second space (e.g., second space 2201 of FIG. 5A), a flexible display 230 disposed to be supported by at least a part of the bendable member 240 and the first housing 210, and at least one slide hinge module 260 pressing the first housing 210 in a slide-in direction or in a slide-out direction against the second housing 220. According to an embodiment, the first space (e.g., first space 2101 of FIG. 5A) of the first housing 210 may be provided through a combination of a first bracket housing 210a (e.g., front bracket housing) and a second bracket housing 210b (e.g., rear bracket housing). In a certain embodiment, at least parts of the first bracket housing 210a and/or the second bracket housing 210b may include at least a part of a first side member 211 or a first support member (e.g., first support member 212 of FIG. 3B), or may be replaced by the first support member 212. According to an embodiment, the electronic device 200 may include a main board 250 disposed in the first space (e.g., first space 2101 of FIG. 5A). According to an embodiment, the electronic device 200 may include a camera module (e.g., camera module 216 of FIG. 3B) or a sensor module (e.g., sensor module 217 of FIG. 3B) disposed in the first space (e.g., first space 2101 of FIG. 5A). According to an embodiment, the bendable member 240 may be disposed so that one end thereof is fixed to the first housing 210 and the other end thereof is at least partly rotatably accommodated in the second space (e.g., second space 2201 of FIG. 5A) of the second housing 220. According to an embodiment, the bendable member 240 may include a plurality of multi-bars rotatably connected against each other. According to an embodiment, the bendable member 240 may be supported through a shaft-shaped support member 241 disposed in the second space (e.g., second space 2201 of FIG. 5A). According to an embodiment, the support member 241 may include a support roller rotatably disposed in the second space (e.g., support member 241 of FIG. 5A). In a certain embodiment, the electronic device 200 may include a tension providing member which is disposed in the inner space (e.g., second space 2201 of FIG. 5A) of the electronic device 200 to support the rear side of the bendable member 240, and provides tension for preventing drooping of the flexible display 230 during movement. According to an embodiment, the tension providing member may include a tension belt of a metal material.

According to various embodiments, the bendable member 240 may be at least partly accommodated in the second space (e.g., second space 2201 of FIG. 5A) in the slide-in state, and may slide out at least partly from the second space (e.g., second space 2201 of FIG. 5A) so as to form substantially the same plane with the first housing 210 in the slide-out state. Accordingly, the display area of the flexible display 230 being supported by the first housing 210 and the bendable member 240 may be varied in accordance with the sliding operation. According to an embodiment, the electronic device 200 may further include a guide rail 242 disposed on the side surfaces of the first bracket housing 210a and the second bracket housing 210b combined with each other to be guided in the inner space (e.g., second space 2201 of FIG. 5) of the second housing 220. In a certain embodiment, the electronic device 200 may include at least one side cover 2241 and 2242 disposed on both sides of the second support member (e.g., second support member 222 of FIG. 3B) of the second housing 220. According to an embodiment, the at least one side cover 2241 and 2242 may include a first side cover 2241 disposed so as to at least partly hide the fourth side surface (e.g., fourth side surface 2211 of FIG. 2A) of the second housing 220 and a second side cover 2242 disposed so as to at least partly hide the sixth side surface (e.g., sixth side surface 2213 of FIG. 2A) of the second housing 220.

Figure 5B:
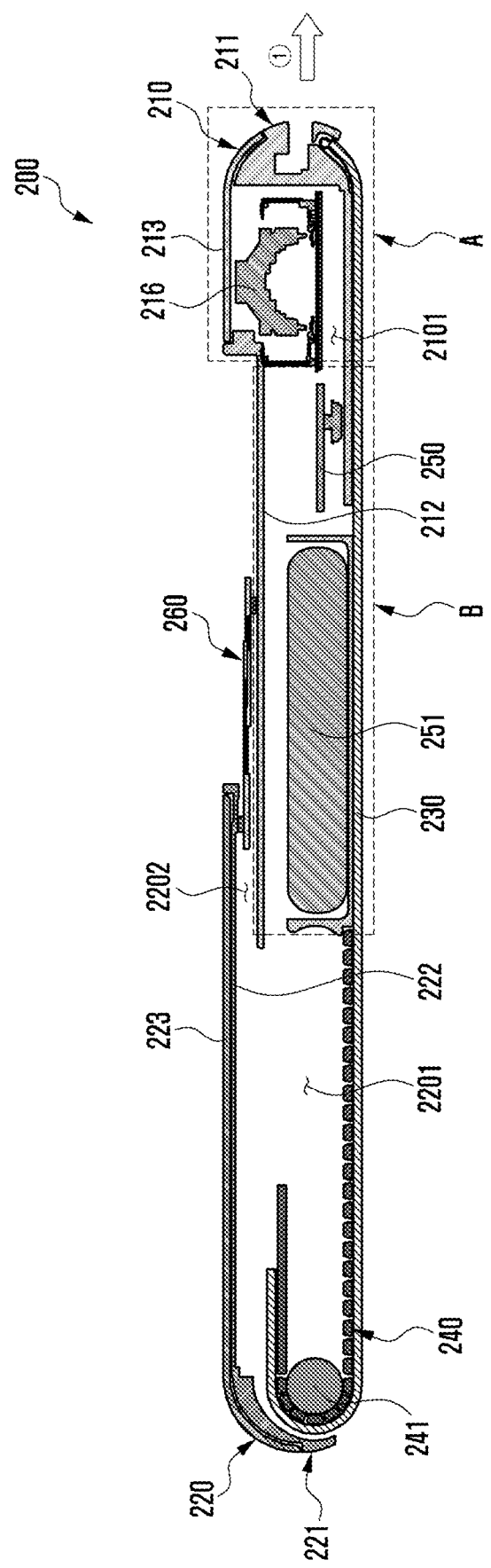
FIG. 5B illustrates a cross-sectional view of an electronic device as seen along line 5b-5b of FIG. 3B according to various embodiments of the disclosure.

FIG. 5A illustrates a cross-sectional view of an electronic device as seen along line 5a-5a of FIG. 2B according to various embodiments of the disclosure. FIG. 5B illustrates a cross-sectional view of an electronic device as seen along line 5b-5b of FIG. 3B according to various embodiments of the disclosure.

Referring to FIGS. 5A and 5B, an electronic device 200 may include a first housing 210 having a first space 2101, a second housing 220 having a second space 2201, a bendable member 240 connected to the first housing 210 and being at least partly accommodated in the second space 2201 in the slide-in state, a flexible display 230 disposed to be supported by at least a part of the bendable member 240 and at least a part of the first housing 210, and a slide hinge module 260 disposed in a third space 2202 between the first housing 210 and the second housing 220 and pressing the first housing 210 in a slide-out direction (direction) and/or in a slide-in direction against the second housing 220. According to an embodiment, the electronic device 200 may include a plurality of electronic components. According to an embodiment, the plurality of electronic components may be disposed in the first space 2101 of the first housing 210. According to an embodiment, the first space 2101 may include a first subspace A and a second subspace B connected to the first subspace A. According to an embodiment, when the electronic device 200 is in the slide-in state, the second subspace B may include a space corresponding to an area in which a part of the first housing 210 overlaps a part of the second housing 220 on the rear surface (e.g., rear surface 200b of FIG. 3B) of the electronic device 200.

According to various embodiments, among the plurality of electronic components, the first electronic components, which occupy a relatively large mounting space or a relatively large mounting thickness T1 of the electronic device 200, or which should be operated to avoid the overlapping structure of the two housings 210 and 220, may be disposed in the first subspace A. According to an embodiment, the first electronic components may include a camera module 216, a sensor module (e.g., sensor module 217 of FIG. 3B), or a flash (e.g., flash 218 of FIG. 3B). In this case, at least some of the first electronic components may be disposed to face an external environment through a first support member 212 and/or a first rear cover 213. According to an embodiment, among the plurality of electronic components, the second electronic components, which occupy a relatively small mounting space or a relatively small mounting thickness T2 of the electronic device 200, or which can be operated regardless of the overlapping structure of the two housings 210 and 220, may be disposed in the second subspace B. According to an embodiment, the second electronic components may include a main board 250 and/or a battery 251. In a certain embodiment, in case that the first subspace A and the second subspace B are connected to each other, some of the plurality of electronic components (e.g., main board 250 or FPCB) may be disposed together in the two subspaces. In a certain embodiment, the above-described first subspace A and/or second subspace B may be designed to provide an efficient arrangement space for the plurality of electronic components regardless of the slide-in state and/or the slide-out state of the electronic device 200.

According to various embodiments, at least one slide hinge module 260 may be disposed in the third space 2202 between the first support member 212 of the first housing 210 and the second support member 222 of the second housing 220 on the rear surface (e.g., rear surface 200b of FIG. 3B) of the electronic device 200. According to an embodiment, the third space 2202 may be formed to have a structure which is partly separated from the second space 2201 through at least a part of the first housing 210 in the slide-in state, and which is at least partly connected to the second space 2201 in the slide-out state. According to an embodiment, the at least one slide hinge module 260 may include an elastic member (e.g., torsion spring) that provides an elastic force to press the first housing 210 in the slide-out direction (direction ①) and/or in the slide-in direction (direction ②) against the second housing 220 based on a designated inflection point. For example, the electronic device 200 may be pressed in the direction (direction ①) in which the flexible display 230 is to slide out through a user's operation, and when moving over the inflection point, the electronic device 200 may be continuously pressed to maintain the slide-out state through the slide hinge module 260. According to an embodiment, the electronic device 200 may be pressed in the direction (direction ②) in which the flexible display 230 is to slide in through the user's operation, and when moving over the inflection point, the electronic device 200 may be continuously pressed to maintain the slide-in state through the slide hinge module 260.

According to the exemplary embodiments of the disclosure, the electronic components of the electronic device 200 can be properly disposed corresponding to the subspaces A and B having different shapes in the first space 2101 of the first housing 210, and such an efficient arrangement structure can help slimming and performance improvement of the electronic device 200. Since the first housing 210 is pressed in the slide-out direction (direction ①) and/or in the slide-in direction (direction ②) based on the designated inflection point against the second housing 220 through the slide hinge module 260, it is possible to provide an improved operational convenience.

Figure 6:
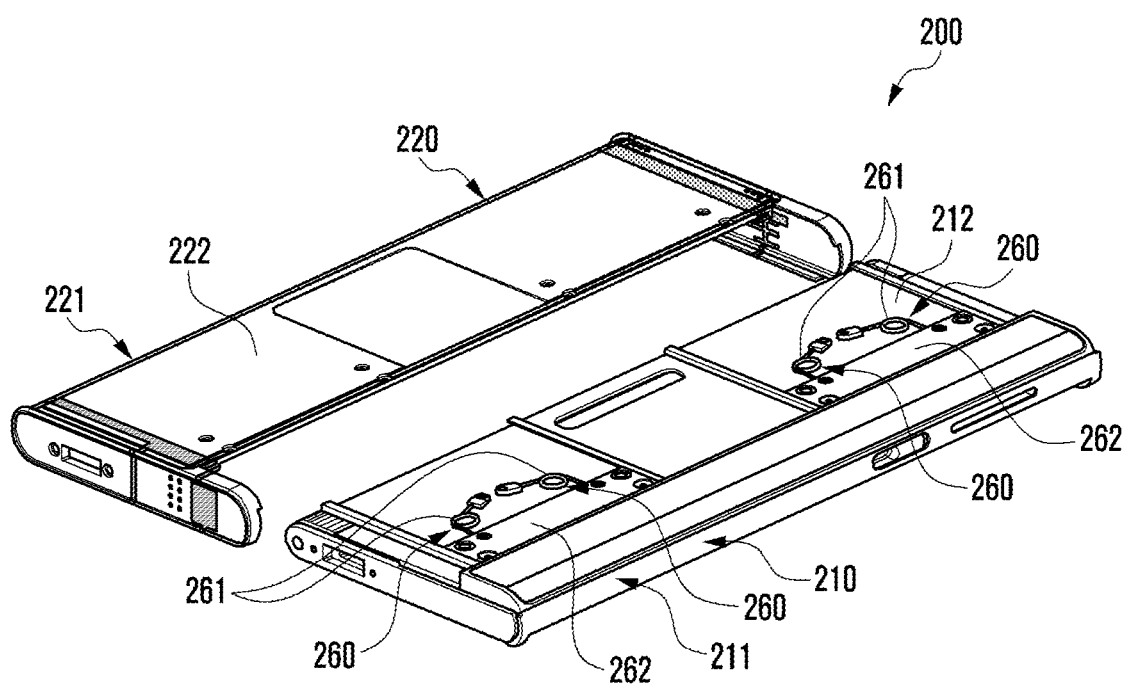
FIG. 6 illustrates a partially exploded perspective view of an electronic device including a slide hinge module according to various embodiments of the disclosure.

FIG. 6 illustrates a partially exploded perspective view of an electronic device including a slide hinge module according to various embodiments of the disclosure.

Referring to FIG. 6, an electronic device 200 may include a first housing 210, a second housing 220 slidably combined with the first housing 210, and at least one slide hinge module 260 disposed between the first housing 210 and the second housing 220 and pressing the first housing 210 in a slide-in direction or in a slide-out direction against the second housing 220. According to an embodiment, the at least one slide hinge module 260 may be disposed between a first support member 212 and the first housing and a second support member 222 of the second housing 220. According to an embodiment, the at least one slide hinge module 260 may be disposed in four places so as to be spaced apart from each other at designated intervals between the first support member 212 and the second support member 222, but the number of arrangement places is not limited thereto. For example, the at least one slide hinge module 260 may be disposed in places of which the number is smaller or larger than four in accordance with the level of the pressing force to make the first housing 210 slide in or slide out.

According to various embodiments, the at least one slide hinge module 260 may include a torsion spring 261. According to an embodiment, the torsion spring 261 may be installed to press the first housing 210 in the slide-in direction or in the slide-out direction based on a designated inflection point against the second housing 220. According to an embodiment, the at least one slide hinge module 260 may include a slide plate 262 slidably combined with the first support member 212 and fixed to the second support member 222. Accordingly, in accordance with the slide-in operation and the slide-out operation of the electronic device, the slide plate 262 may slidably move on the first support member 212. According to an embodiment, the sliding distance (e.g., sliding distance S of FIG. 7B) of the first housing 210 may be determined in accordance with the shape of the slide plate 262 and a combination position of the at least one slide hinge module 260. According to an embodiment, a part (e.g., the other end 2612 of FIG. 7B) of the torsion spring 261 may be fixed to the slide plate 262. In a certain embodiment, the at least one slide hinge module 260 may be formed in a manner that at least one torsion spring 261 is combined with one slide plate 262. As illustrated, in the at least one slide hinge module 260, two torsion springs 261 are combined with one slide plate 262, but one torsion spring 261 or three or more torsion springs 261 may be combined with one slide plate 262.

Figure 7A:
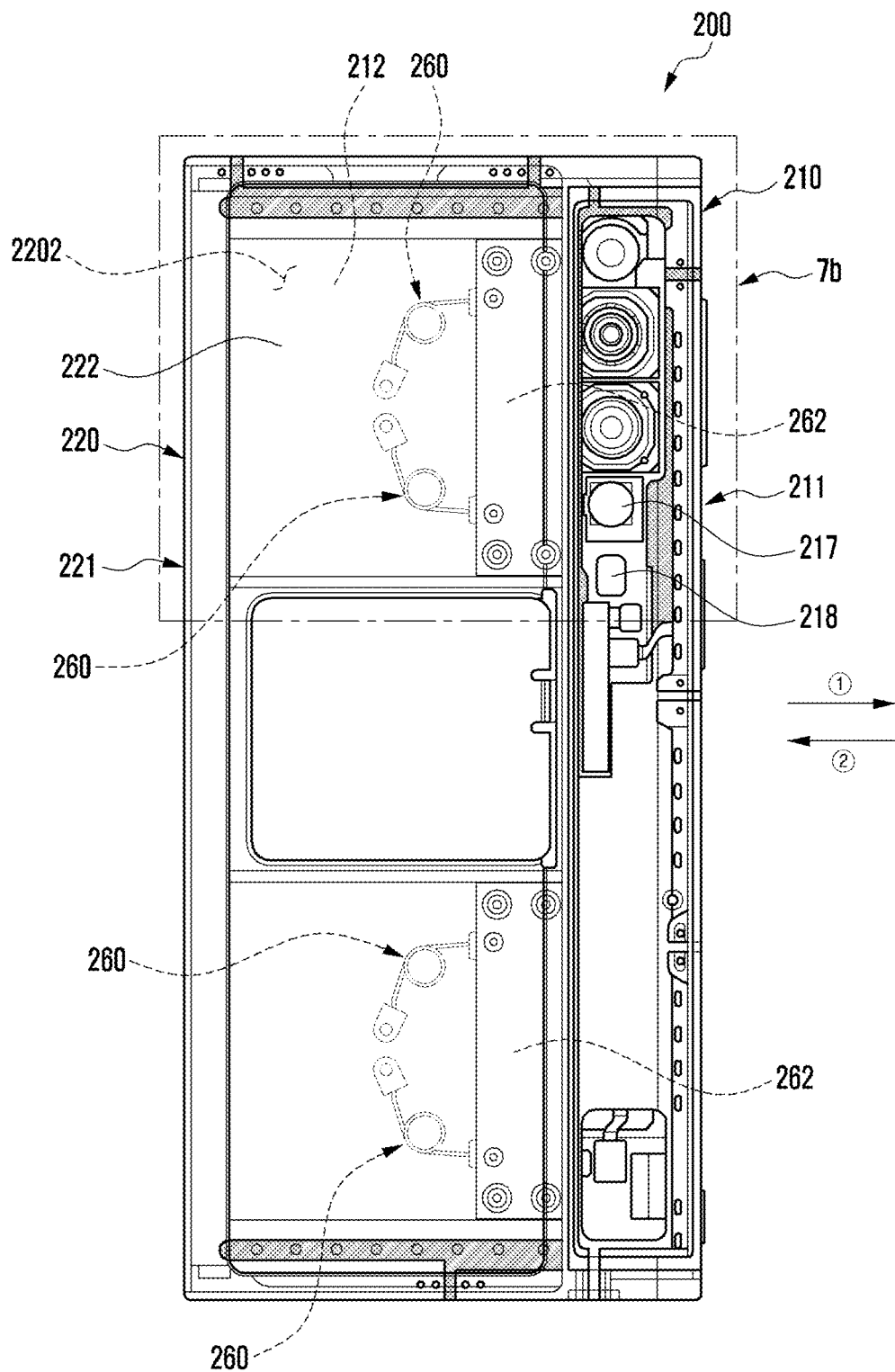
FIG. 7A illustrates a configuration diagram of an electronic device in which a slide hinge module is disposed in a slide-in state according to various embodiments of the disclosure.
Figure 7B:
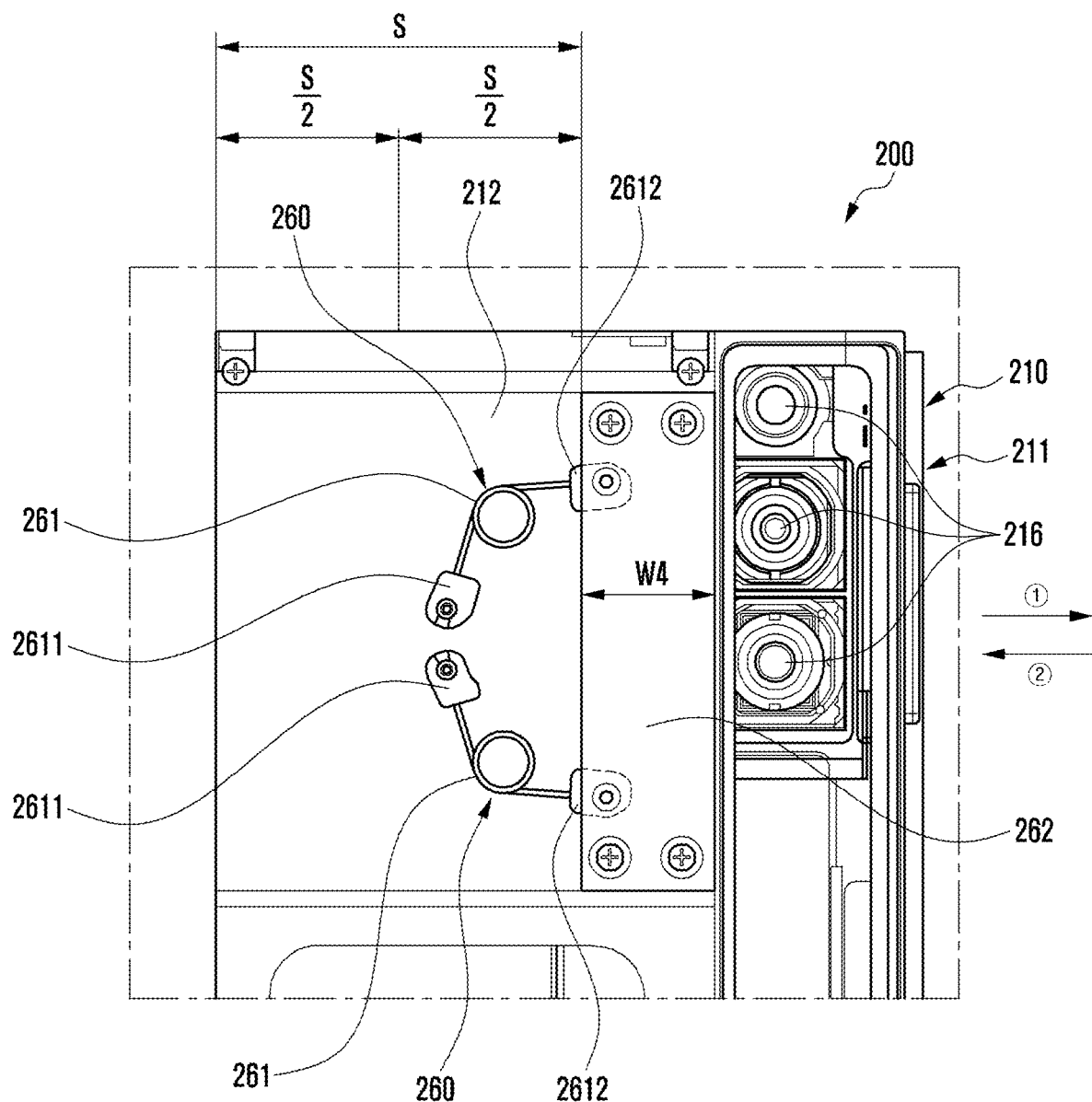
FIG. 7B illustrates an enlarged view of an area 7b of FIG. 7A according to various embodiments of the disclosure.

FIG. 7A illustrates a configuration diagram of an electronic device in which a slide hinge module is disposed in a slide-in state according to various embodiments of the disclosure. FIG. 7B illustrates an enlarged view of an area 7b of FIG. 7A according to various embodiments of the disclosure. FIG. 7B is a view illustrating a case that a slide hinge module is disposed in a first housing in a state where a second housing is omitted.

Referring to FIGS. 7A and 7B, an electronic device 200 may include a first housing 210, a second housing 220 slidably combined with the first housing 210, and at least one slide hinge module 260 disposed between the first housing 210 and the second housing 220 and pressing the first housing 210 in a slide-in direction or in a slide-out direction against the second housing 220. According to an embodiment, the electronic device 200 may include a slide plate 262 slidably disposed in a first support member 212 of the first housing 210. According to an embodiment, the slide plate 262 may be fixed to a second support member of the second housing 220 through a fastening member such as a screw.

According to various embodiments, the at least one slide hinge module 260 may include a torsion spring 261 disposed between the first support member 212 of the first housing 210 and the second support member 222 of the second housing 220. According to an embodiment, one end 2611 of the torsion spring 261 may be movably combined with the first support member 212, and the other end 2612 thereof may be movably combined with the slide plate 262. According to an embodiment, during a sliding operation of the electronic device 200 to be transitioned from a slide-in state to a slide-out state or to be transitioned from the slide-out state to the slide-in state, the torsion spring 261 may retain elasticity between the first support member 212 and the second support member 222, and may be movable at least partly. According to an embodiment, when the slide plate 262 is moved in the slide-out direction (direction ①) based on a designated inflection point, the torsion spring 261 may be disposed to provide a pressing force to continuously press the first housing 210 in the slide-out direction (direction ①). According to an embodiment, when the slide plate 262 is moved in the slide-in direction (direction ②) based on the designated inflection point, the torsion spring 261 may be disposed to provide the pressing force to continuously press the first housing 210 in the slide-in direction (direction ②).

According to various embodiments, the inflection point may be set as a half position S/2 of the total sliding distance S of the slide plate 262. According to an embodiment, the sliding distance S may be substantially equal to a second part to be seen from an outside (e.g., second width W2 of a second part 230b of FIG. 3A) when a flexible display 230 is transitioned from the slide-in state to the slide-out state. In a certain embodiment, the inflection point may be set as a position inclined to the slide-in direction or the slide-out direction of the first housing 210 rather than the half position S/2 from the total sliding distance S of the slide plate 262. In a certain embodiment, in a state where the slide plate 262 is omitted, one end 2611 of the torsion spring 261 may be movably combined with the first support member 212 of the first housing 210, and the other end 2612 thereof may be movably combined with the second support member 222 of the second housing 220.

According to various embodiments, the sliding distance S may be determined in accordance with the shape of the slide plate 262 movably combined with the first support member 212. According to an embodiment, the sliding distance S may be determined in accordance with the width W4 of the slide plate 262. For example, as the width W4 of the slide plate 262 becomes larger, the sliding distance S may become smaller, whereas as the width W4 of the slide plate 262 becomes smaller, the sliding distance S may become larger. In a certain embodiment, the sliding distance S may be determined in accordance with combination positions where the one end 2611 and the other end 2612 of the torsion spring 261 are combined with the first support member 212 and the second support member 222, respectively.

According to various embodiments, the one end 2611 of the torsion spring 261 may be rotated clockwise or counterclockwise based on the point fixed to the first support member 212. As another embodiment, the other end 2612 of the torsion spring 261 may be rotated clockwise or counterclockwise based on the point fixed to the second support member 222 or the slide plate 262.

Figure 8:
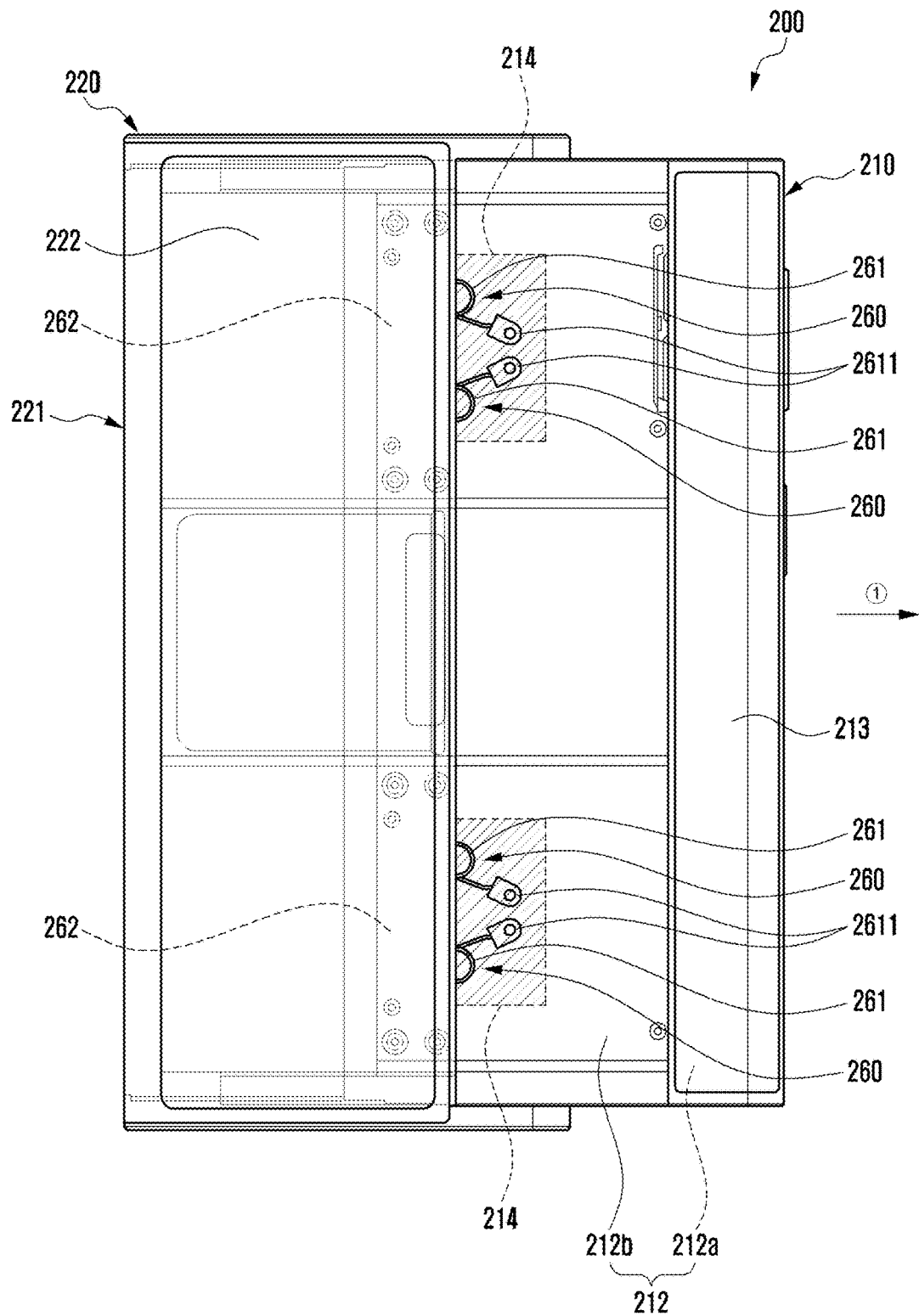
FIG. 8 illustrates a configuration diagram of an electronic device in which a slide hinge module is disposed in a slide-out state according to various embodiments of the disclosure.

FIG. 8 illustrates a configuration diagram of an electronic device in which a slide hinge module is disposed in a slide-out state according to various embodiments of the disclosure.

Referring to FIG. 8, an electronic device 200 may include a first housing 210, a second housing 220 slidably combined with the first housing 210, and at least one slide hinge module 260 disposed between the first housing 210 and the second housing 220 and pressing the first housing 210 in a slide-in direction or in a slide-out direction against the second housing 220. According to an embodiment, the slide hinge module 260 may be disposed in an overlapping part of the first housing 210, and thus may be at least partly hidden so as not to be seen from an outside through a second support member 222 of the second housing 220 in the slide-in state. According to an embodiment, in the slide-out state of the electronic device 200, the slide hinge module 260 may degrade beauty of the electronic device 200 since a part disposed in a first support member 212, for example, at least a part of a torsion spring 261 (e.g., one end 2611), is exposed so as to be seen from the outside. Accordingly, the electronic device 200 may include a cover member 214 disposed at least partly in the first support member 212 of the first housing 210 and capable of hiding a part of the slide hinge module 260 in the slide-out state. According to an embodiment, the cover member 214 may be disposed so as to avoid interference against the sliding operation of the first housing 210 and the second housing 220. In a certain embodiment, the cover member 214 may include a hauntable pipeline structure disposed between the first housing 210 and the second housing 220 and having a variable inner space in association with the sliding operation of the first housing 210. Accordingly, one end of the pipeline structure may be fixed to the first housing 210 and the other end thereof may be fixed to the second housing 220. According to an embodiment, the pipeline structure may include a plurality of pipelines disposed to be able to slide out with each other and including inner spaces. For example, in the slide-out state, at least a part of the slide hinge module 260 that can be exposed to the outside is accommodated in the inner space of the pipeline structure, and thus can be hidden so as not to be seen from the outside.

Figure 9A:
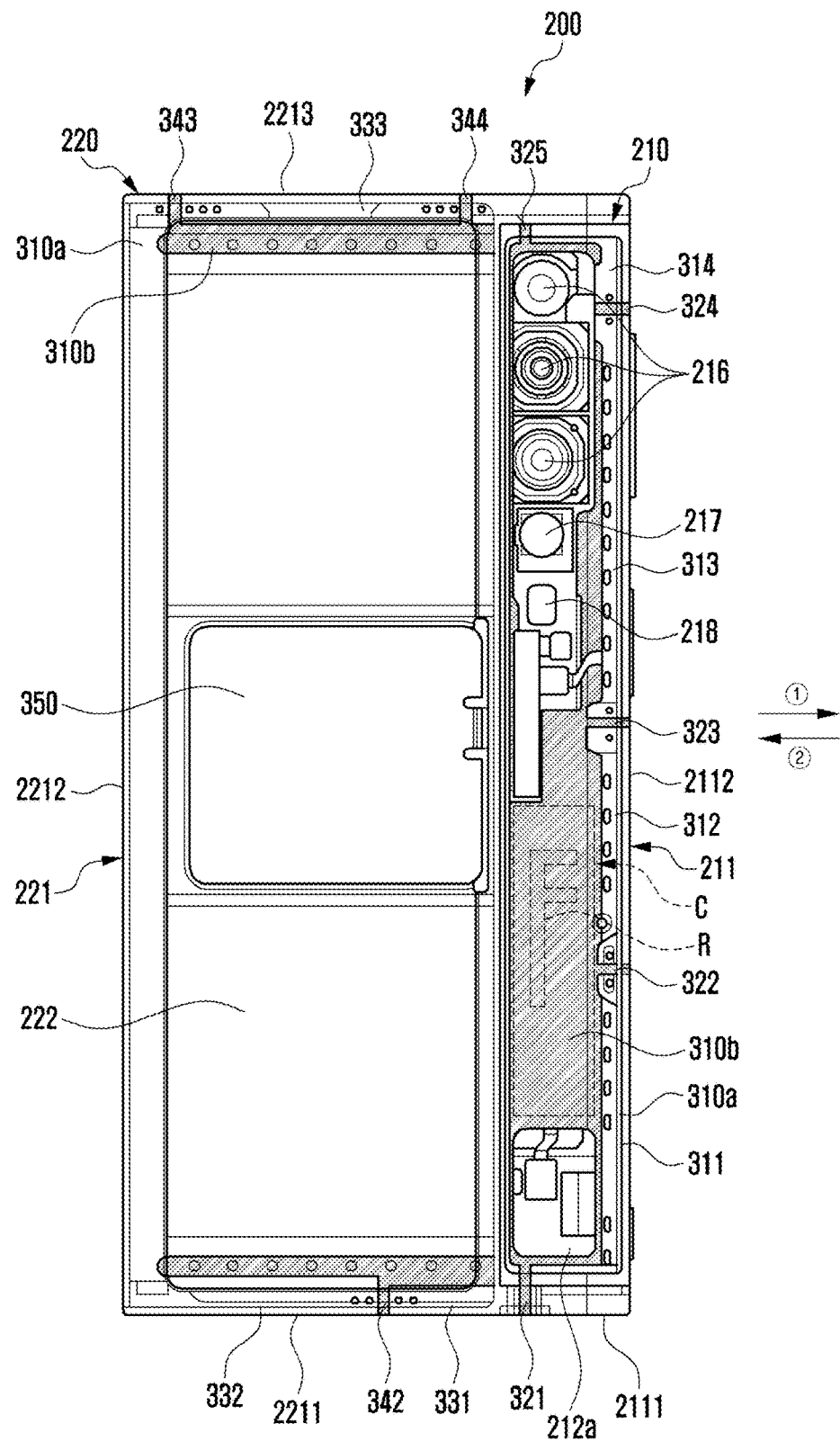
FIG. 9A illustrates a configuration diagram of a slide-in state of an electronic device including an antenna according to various embodiments of the disclosure.
Figure 9B:
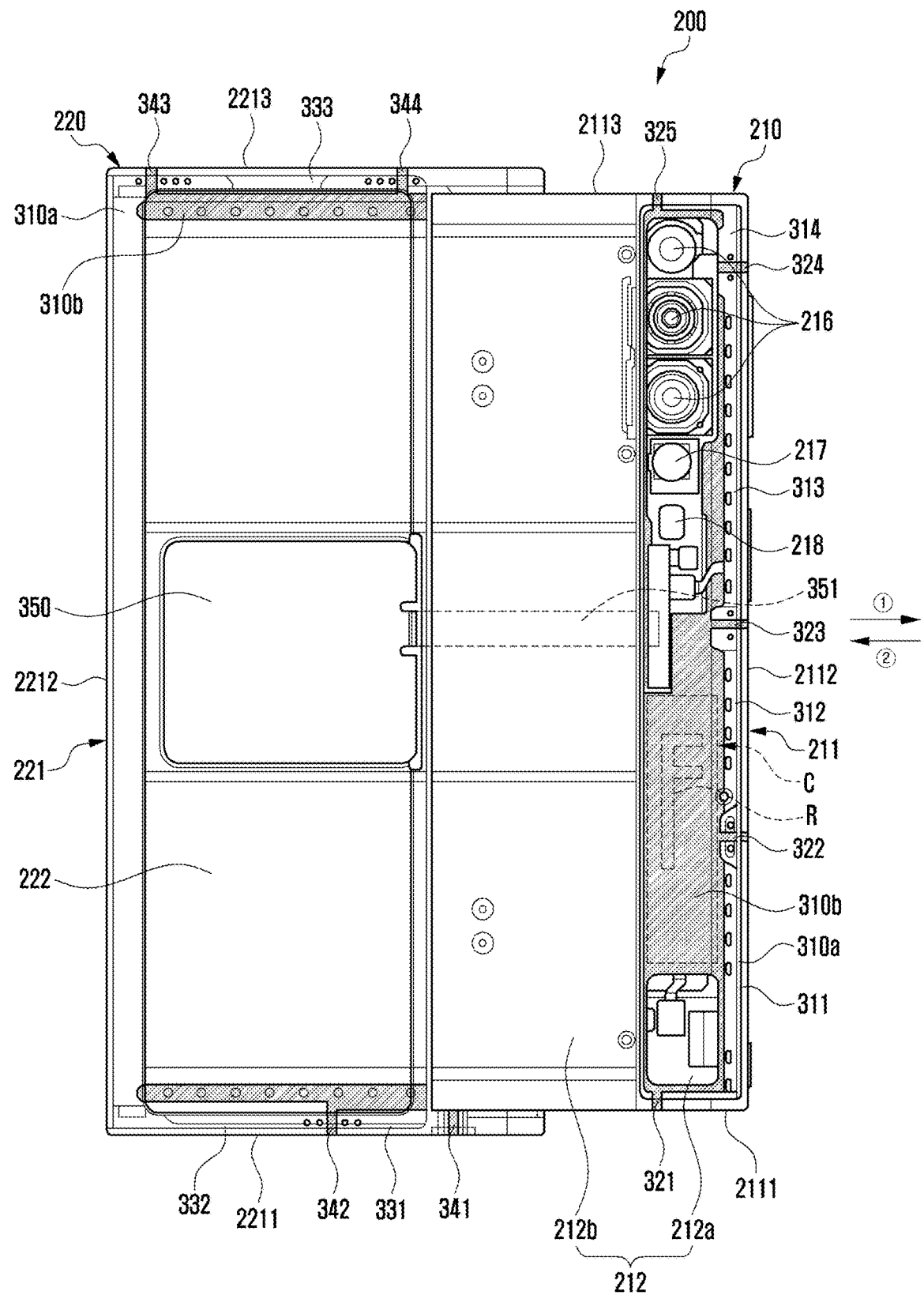
FIG. 9B illustrates a configuration diagram of a slide-out state of an electronic device including an antenna according to various embodiments of the disclosure.

FIGS. 9A and 9B illustrates configuration diagrams of the slide-in state and the slide-out state of an electronic device including an antenna according to various embodiments of the disclosure.

Referring to FIGS. 9A and 9B, an electronic device 200 may include a first housing 210, and a second housing 220 slidably combined with the first housing 210 in a designated round-trip distance. According to an embodiment, the first housing 210 may include a first side member 211 including a first side surface 2111, a second side surface 2112, and a third side surface 2113, and a first support member 212 extending from the first side member 211 to a first space 2101. According to an embodiment, the first side member and/or the first support member 212 may at least partly include a conductive material 310a (e.g., metal) and/or a non-conductive material 310b (e.g., polymer). For example, the non-conductive material 310b may be insert-injected into the conductive material 310a. According to an embodiment, the second housing 220 may include a second side member 221 including a fourth side surface 2211, a fifth side surface 2212, and a sixth side surface 2213, and a second support member 222 extending from the second side member 221 to a second space 2201. According to an embodiment, the second side member 221 and/or the second support member 222 may at least partly include a conductive material 310a (e.g., metal) and/or a non-conductive material 310b (e.g., polymer).

According to various embodiments, the electronic device 200 may include an antenna R disposed through at least a partial area C of the first housing 210 that can be seen from an outside in a slide-in state. According to an embodiment, as seen from an upside of the first support member 212, the antenna R may be disposed in a position overlapping an area formed of the non-conductive material 310b in a first subspace (e.g., first subspace A of FIG. 3B) corresponding to a non-overlapping part 212a. According to an embodiment, the antenna R may include at least one conductive pattern (e.g., antenna pattern) disposed through a main board 250 or an antenna carrier. According to an embodiment, the antenna R may be electrically connected to a wireless communication circuit (e.g., wireless communication module 192 of FIG. 1) disposed on the main board 250 of the first space 2101. According to an embodiment, the wireless communication circuit (e.g., wireless communication module 192 of FIG. 1) may be configured to transmit and/or receive a wireless signal through a first conductive part 311 in at least one frequency band among a low band (e.g., about 700 MHz to 900 MHz), mid band (about 1700 MHz to 2100 MHz), high band (about 2300 MHz to 2700 MHz), sub-6 band (about 3 GHz to 6 GHz), or NR band (about 3 GHz to 300 GHz). However, the operating frequency band may not be limited to the above examples. Accordingly, since the antenna R is disposed in the position corresponding to the non-overlapping part 212a of the first housing 210 disposed to be seen from the outside regardless of the slide-in state or the slide-out state, the interference according to the slide-in and slide-out operations of the second housing 220 can be avoided, and the corresponding radiation performance degradation can be reduced.

According to various embodiments, the electronic device 200 may include at least one first conductive part disposed through at least a part of the first side member 211 being exposed to the outside without being interfered by the second housing 220 in the slide-in state, and electrically connected to the wireless communication circuit (e.g., wireless communication module 192 of FIG. 1). According to an embodiment, the at least one first conductive part may be formed through at least one of at least a part of the first support member 212 that can be seen from the outside, at least a part of the first side surface 2111, at least a part of the second side surface 2112, or at least a part of the third side surface 2113. According to an embodiment, the at least one first conductive part may include a first conductive part 311 segmented through a first non-conductive part 321 disposed on the first side surface 2111 and a second non-conductive part 322 disposed on the second side surface 2112, a second conductive part 312 segmented through the second non-conductive part 322 and a third non-conductive part 323 disposed on the second side surface 2112, a third conductive part 313 segmented through the third non-conductive part 323 and a fourth non-conductive part 324 disposed on the second side surface 2112, and a fourth conductive part 314 segmented through the fourth non-conductive part 324 and a fifth non-conductive part 325 disposed on the third side surface 2113. According to an embodiment, the first, second, third, and fourth conductive parts 311, 312, 313, and 314 are electrically connected to the wireless communication circuit (e.g., wireless communication module 192 of FIG. 1) disposed in the first space 2101 of the first housing 210, and thus can operate as antennas configured to transmit and/or receive the wireless signal in the designated frequency band.

According to an embodiment, the wireless communication circuit (e.g., wireless communication module 192 of FIG. 1) may be configured to transmit and/or receive the wireless signal through at least one frequency band among the low band (e.g., about 700 MHz to 900 MHz), mid band (about 1700 MHz to 2100 MHz), high band (about 2300 MHz to 2700 MHz), or sub-6 band (about 3 GHz to 6 GHz) through the first, second, third, and fourth conductive parts 311, 312, 313, and 314. However, the operating frequency band may not be limited to the above examples.

According to various embodiments, in order to manifest excellent radiation performance regardless of the slide-in state and the slide-out state, the electronic device 200 may include at least one second conductive part disposed on at least a part of the second housing 220 and used as an antenna. According to an embodiment, the at least one second conductive part may include a fifth conductive part 331 segmented through a sixth non-conductive part 341 and a seventh non-conductive part 342 disposed spaced apart from each other at designated intervals on a fourth side surface 2211, a sixth conductive part 332 segmented through the seventh non-conductive part 342 and an eighth non-conductive part 343 of the sixth side surface 2213, and a seventh conductive part 333 segmented through the eighth non-conductive part 343 and a ninth non-conductive part 344 disposed on the sixth side surface 2213. According to an embodiment, the fifth, sixth, and seventh conductive parts 331, 332, and 333 may be electrically connected to the main board 250 disposed in the first housing 210 through a flexible printed circuit board (FPCB) (e.g., FPCB 2071 of FIG. 12D) having flexibility and a length enough to correspond to the sliding operation. For example, the FPCB may be electrically connected to the wireless communication circuit disposed on the main board 250. According to an embodiment, the wireless communication circuit (e.g., wireless communication module 192 of FIG. 1) may be configured to transmit and/or receive the wireless signal in at least one frequency band among the low band (e.g., about 700 MHz to 900 MHz), mid band (about 1700 MHz to 2100 MHz), high band (about 2300 MHz to 2700 MHz), or sub-6 band (about 3 GHz to 6 GHz) through the fifth, sixth, and seventh conductive parts 331, 332, and 333. However, the operating frequency band may not be limited to the above examples.

According to various embodiments, in the slide-in state, the first side surface 2111 may face the fourth side surface 2211, and may be accommodated in the second space 2201 of the second housing 220 so as not to be seen from the outside. In this case, the radiation performance of the first conductive part 311 and/or the fifth conductive part 331 may be degraded by parasitic resonant frequencies of the overlapping opposite conductive parts. Accordingly, in the slide-in state, the first non-conductive part 321 may be disposed to correspond to (to be aligned with) the sixth non-conductive part 341 to reduce the radiation performance degradation. In a certain embodiment, in the slide-in state, the first side surface 2111 may be partly accommodated in the second space 2201 of the second housing 220, and at least a part thereof may be disposed so as to be seen from the outside. In a certain embodiment, in the slide-in state, the third side surface 2113 may face the sixth side surface 2213, and may be accommodated in the second space 2201 of the second housing 220 so as not to be seen from the outside. In this case, the radiation performance of the fourth conductive part 314 and/or the seventh conductive part 333 may be degraded by parasitic resonant frequencies of the overlapping opposite conductive parts. Accordingly, in the slide-in state, the fifth non-conductive part 325 may be disposed to correspond to (to be aligned with) the ninth non-conductive part 344 to reduce the radiation performance degradation.

According to the exemplary embodiments of the disclosure, at least one antenna R 311, 312, 313, 314, 331, 332, and 333 included in the electronic device 200 may be disposed in a non-overlapping position of the first housing 210 and the second housing 220 in the slide-in state and/or the slide-out state, and thus the designated radiation performance can be manifested regardless of the sliding operation.

Figure 10A:
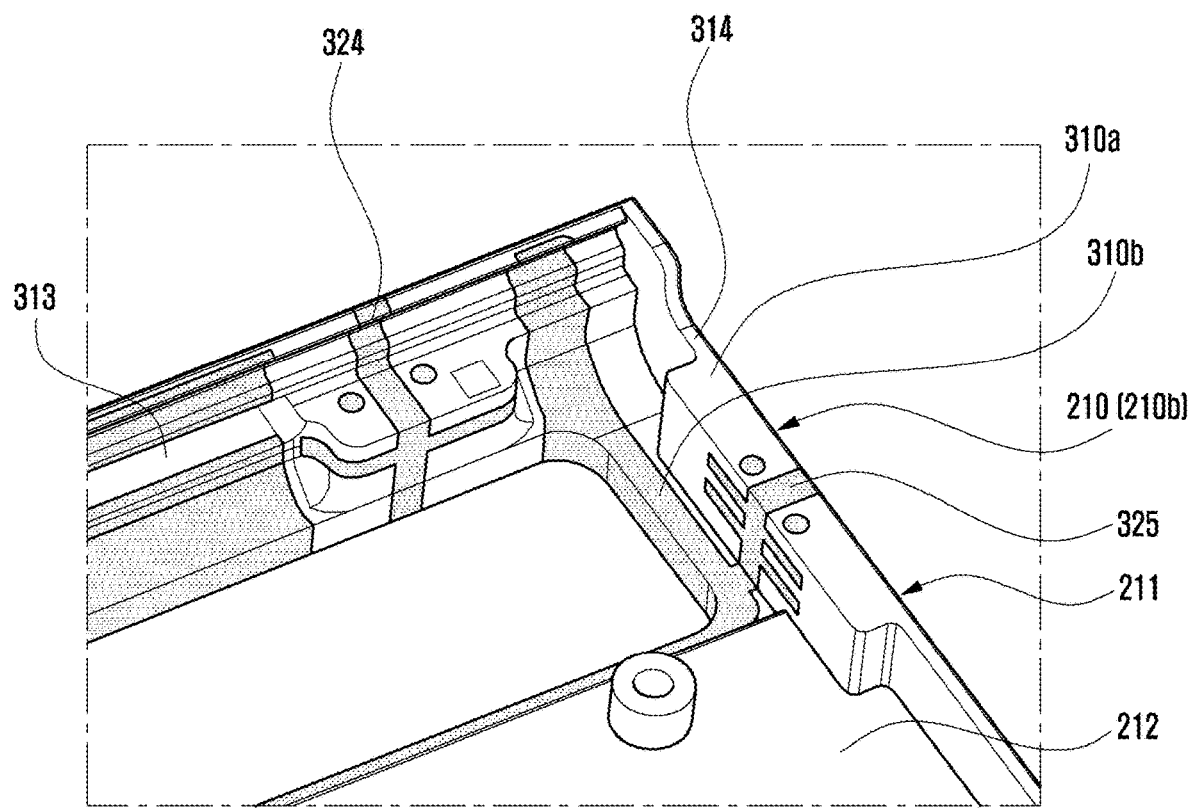
FIG. 10A illustrates is a partial perspective view of an internal configuration of a first housing in an area 10a of FIG. 9B according to various embodiments of the disclosure.
Figure 10B:
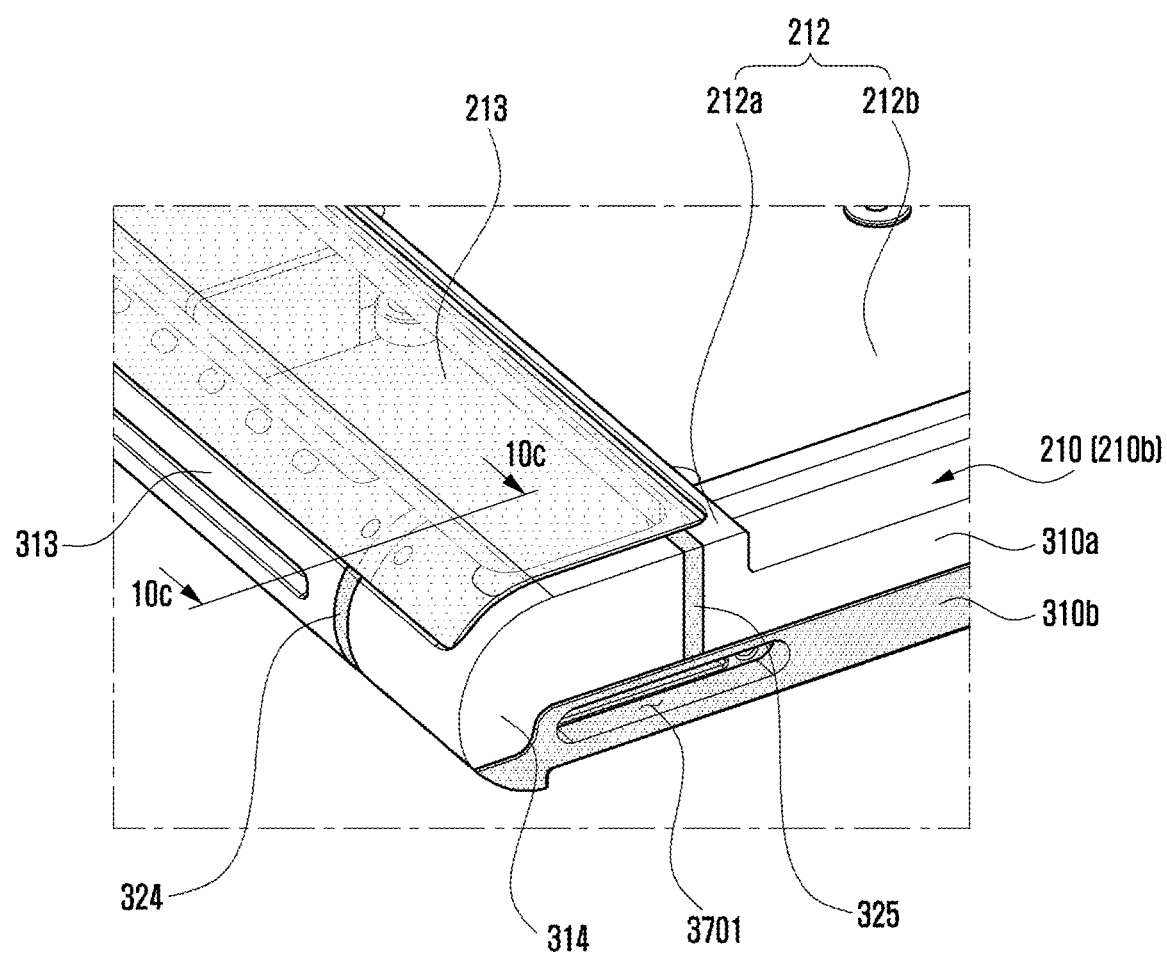
FIG. 10B illustrates an enlarged perspective view of an area 10b of FIG. 9B according to various embodiments of the disclosure.
Figure 10C:
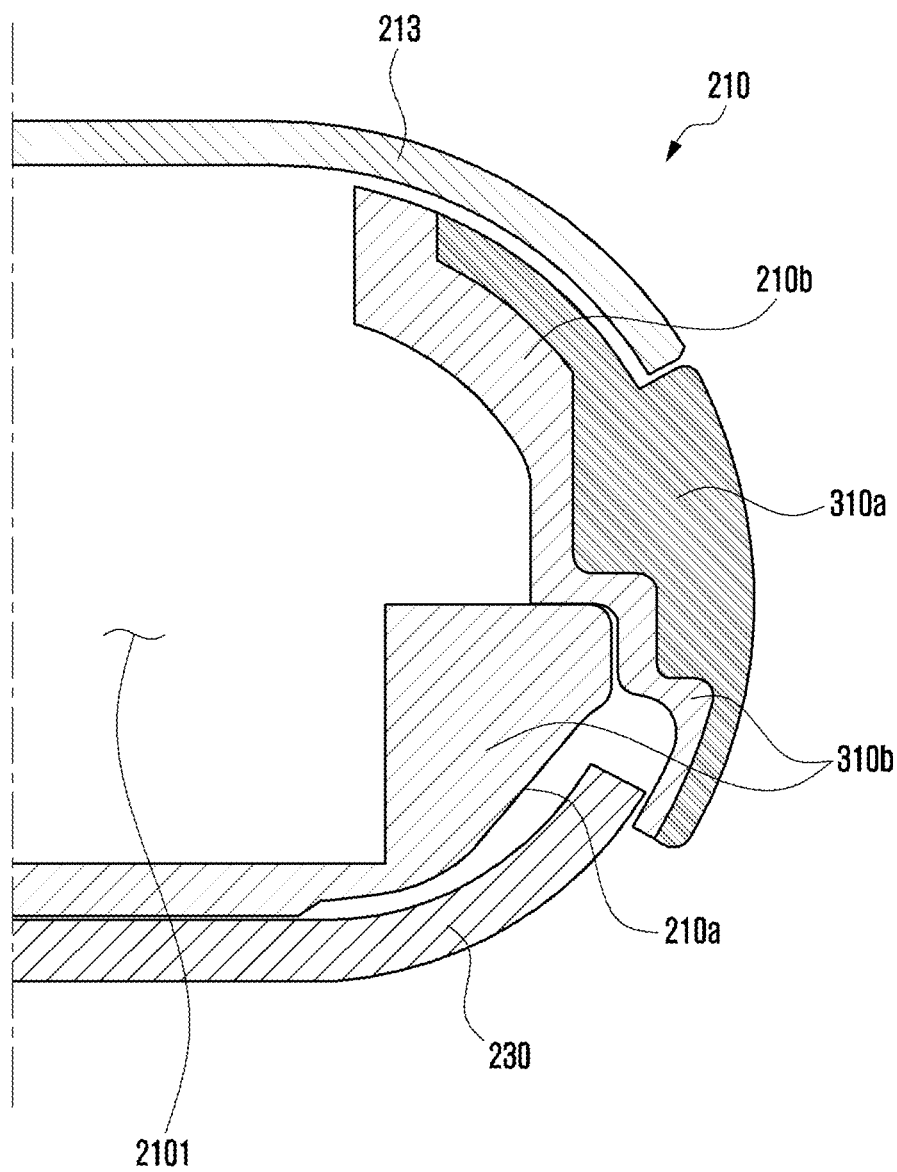
FIG. 10C illustrates a partial cross-sectional view of a first housing as seen along line 10c-10c of FIG. 10B according to various embodiments of the disclosure.

FIG. 10A illustrates a partial perspective view of an internal configuration of a first housing in an area 10a of FIG. 9B according to various embodiments of the disclosure. FIG. 10B illustrates an enlarged perspective view of an area 10b of FIG. 9B according to various embodiments of the disclosure. FIG. 10C illustrates a partial cross-sectional view of a first housing as seen along line 10c-10c of FIG. 10B according to various embodiments of the disclosure.

Referring to FIGS. 10A to 10C, a fourth conductive part 314 may be segmented through a fourth non-conductive part 324 and a fifth non-conductive part 325 spaced apart from each other at designated intervals in a second bracket housing 210b. For example, the fourth conductive part 314 may be segmented through the fourth non-conductive part 324 and the fifth non-conductive part 325 formed through a non-conductive material 310b at least partly extending up to a part of a first support member 212.

According to various embodiments, a first housing 210 may include a first bracket housing 210a and a second bracket housing 210b formed to be able to be combined with each other through a conductive material 310a and the non-conductive material 310b insert-injected into the conductive material 310a. In a certain embodiment, a first bracket housing 210a and a second bracket housing 210b may be combined with each other through a combination structure formed through the conductive material 310a. In a certain embodiment, the first bracket housing 210a and the second bracket housing 210b may be combined with each other through a combination structure formed through the conductive material 310a and the non-conductive material 310b. According to an embodiment, at least a part of the first bracket housing 210a may be formed to support a flexible display 230 through the conductive material 310a and/or the non-conductive material 310b. According to an embodiment, at least a part of the second bracket housing 210b may be formed to support a first rear cover 213 through the conductive material 310a and/or the non-conductive material 310b. According to an embodiment, since it is advantageous for shape change, the non-conductive material 310b forming the second bracket housing 210b may include at least one opening 3701 formed so as to accommodate an external electronic component (e.g., socket tray). According to an embodiment, the at least one opening 3701 may extend so as to be connected to the fifth non-conductive part 325. In a certain embodiment, the conductive material 310a and/or the non-conductive material 310b may form an external appearance (part of a side surface and/or a rear surface of the electronic device) of the electronic device 200 so as to be seen from an outside.

Figure 11A:
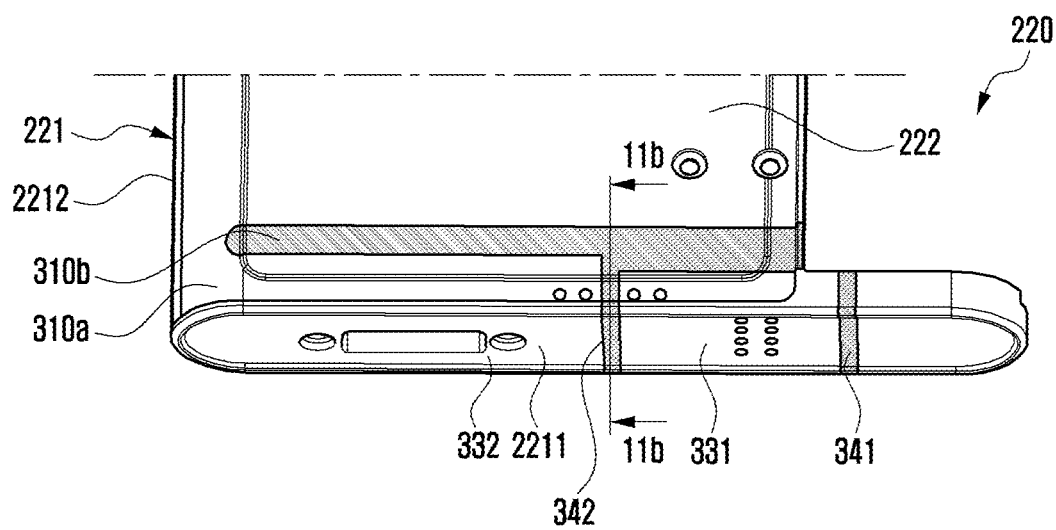
FIG. 11A illustrates a partial perspective view of a second housing according to various embodiments of the disclosure.
Figure 11B:
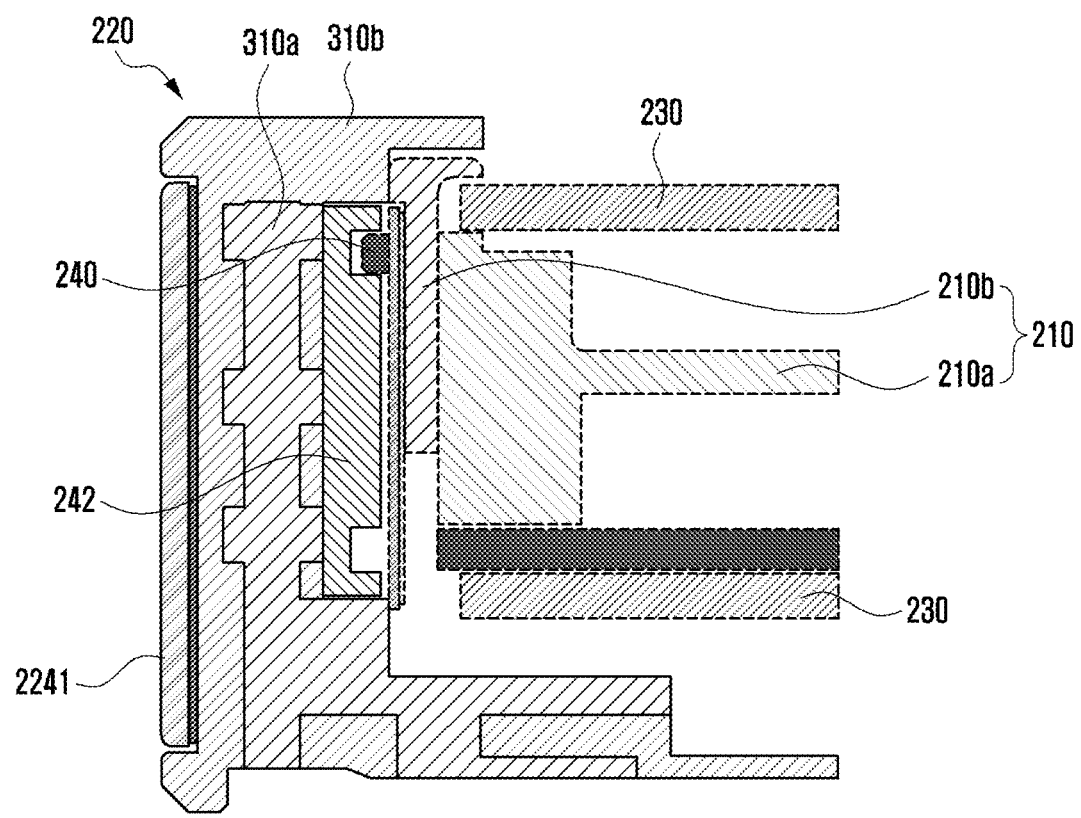
FIG. 11B illustrates a partial cross-sectional view of a second housing as seen along line 11b-11b of FIG. 11A according to various embodiments of the disclosure.

FIG. 11A illustrates a partial perspective view of a second housing according to various embodiments of the disclosure. FIG. 11B illustrates a partial cross-sectional view of a second housing as seen along line 11b-11b of FIG. 11A according to various embodiments of the disclosure. FIG. 11A is a view illustrating a part of a second housing 220 in which a first side cover 2241 is omitted.

Referring to FIGS. 11A and 11B, the second housing 220 may include a fifth conductive part 331 and a sixth conductive part 332 segmented through a sixth non-conductive part 341 and a seventh non-conductive part 342 spaced apart from each other at designated intervals on a fourth side surface 2211. According to an embodiment, the fifth conductive part 331 and the sixth conductive part 332, which are formed of a conductive material 310a, and the sixth non-conductive part 341 and the seventh non-conductive part 342, which are formed of a non-conductive material 310b, may be formed so as to extend up to at least a part of a second support member 222 of the second housing 220.

According to various embodiments, the fifth conductive part 331, the sixth conductive part 332, the sixth non-conductive part 341, and the seventh non-conductive part 342 may be disposed so as to be seen from an outside on the fourth side surface 2211. According to an embodiment, the second housing may be hidden so that at least parts of the fifth conductive part 331, the sixth conductive part 332, the sixth non-conductive part 341, and the seventh non-conductive part 342 are not seen from the outside through a first side cover 2241 disposed on the fourth side surface 2211.

According to various embodiments, a second side member 221 and the second support member 222 formed through the conductive material 310a and the non-conductive material 310b may be formed in a shape corresponding to a combination structure of a guide rail 242 combined with the second housing 220 with a first housing 210 formed through combination of a first bracket housing 210a and a second bracket housing 210b. According to an embodiment, for stiffness reinforcement, at least parts of the first housing 210 and/or a corresponding part of the first housing 210 combined with a guide rail 242 may be configured so that the conductive material 310a is disposed.

Figure 12A:
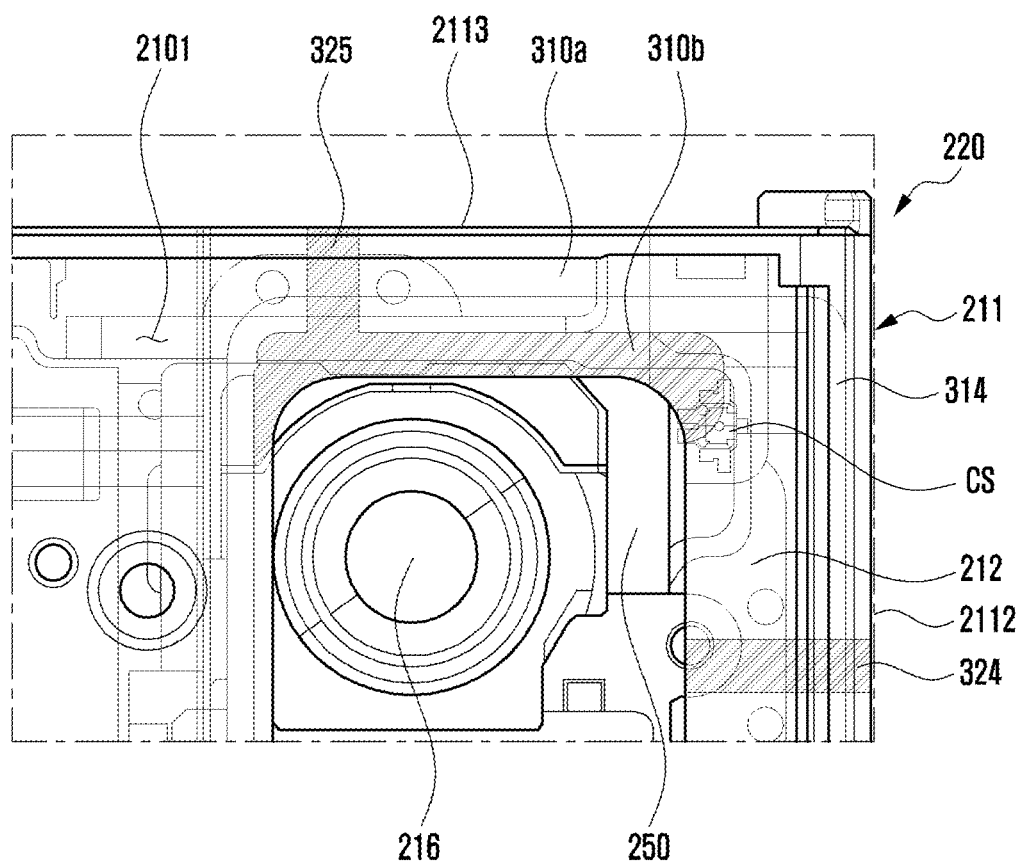
FIG. 12A illustrates a configuration diagram of an electrical connection structure of an antenna in an area 12a of FIG. 9B according to various embodiments of the disclosure.
Figure 12B:
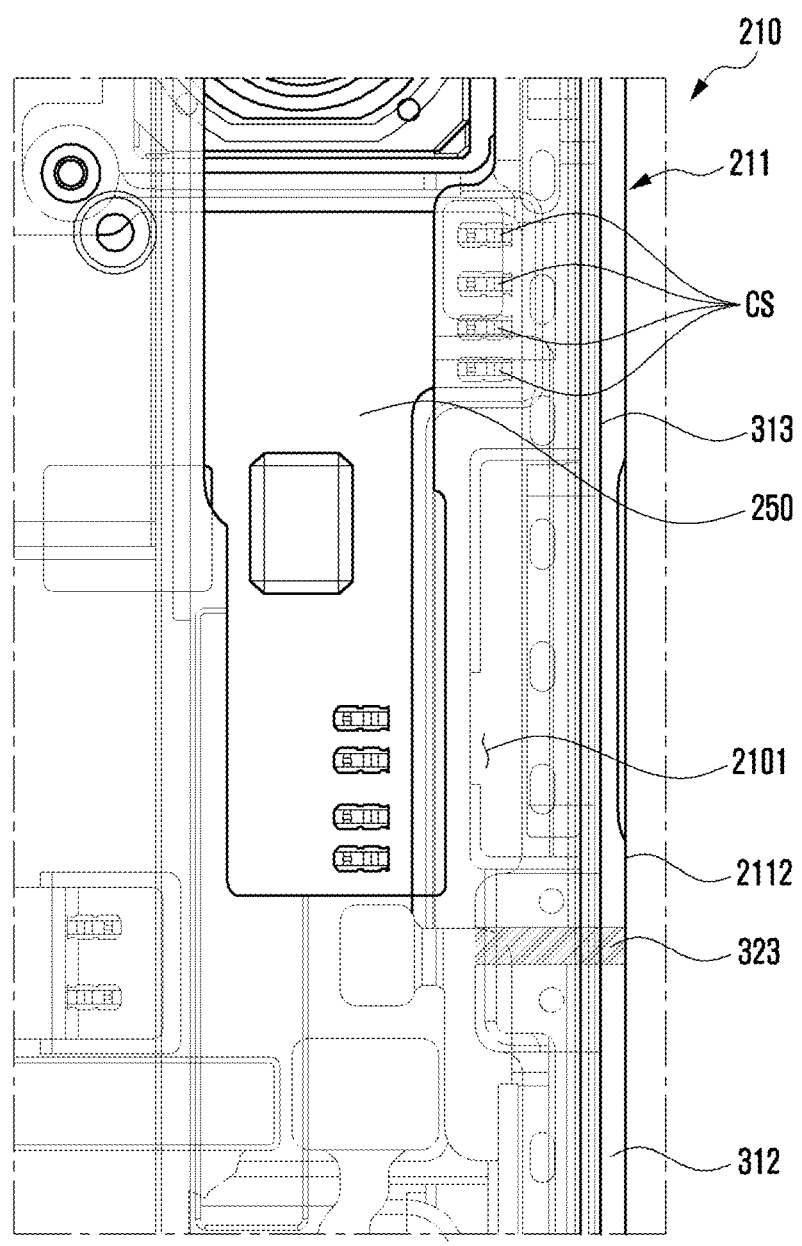
FIG. 12B illustrates a configuration diagram of an electrical connection structure of an antenna in an area 12b of FIG. 9B according to various embodiments of the disclosure.
Figure 12C:
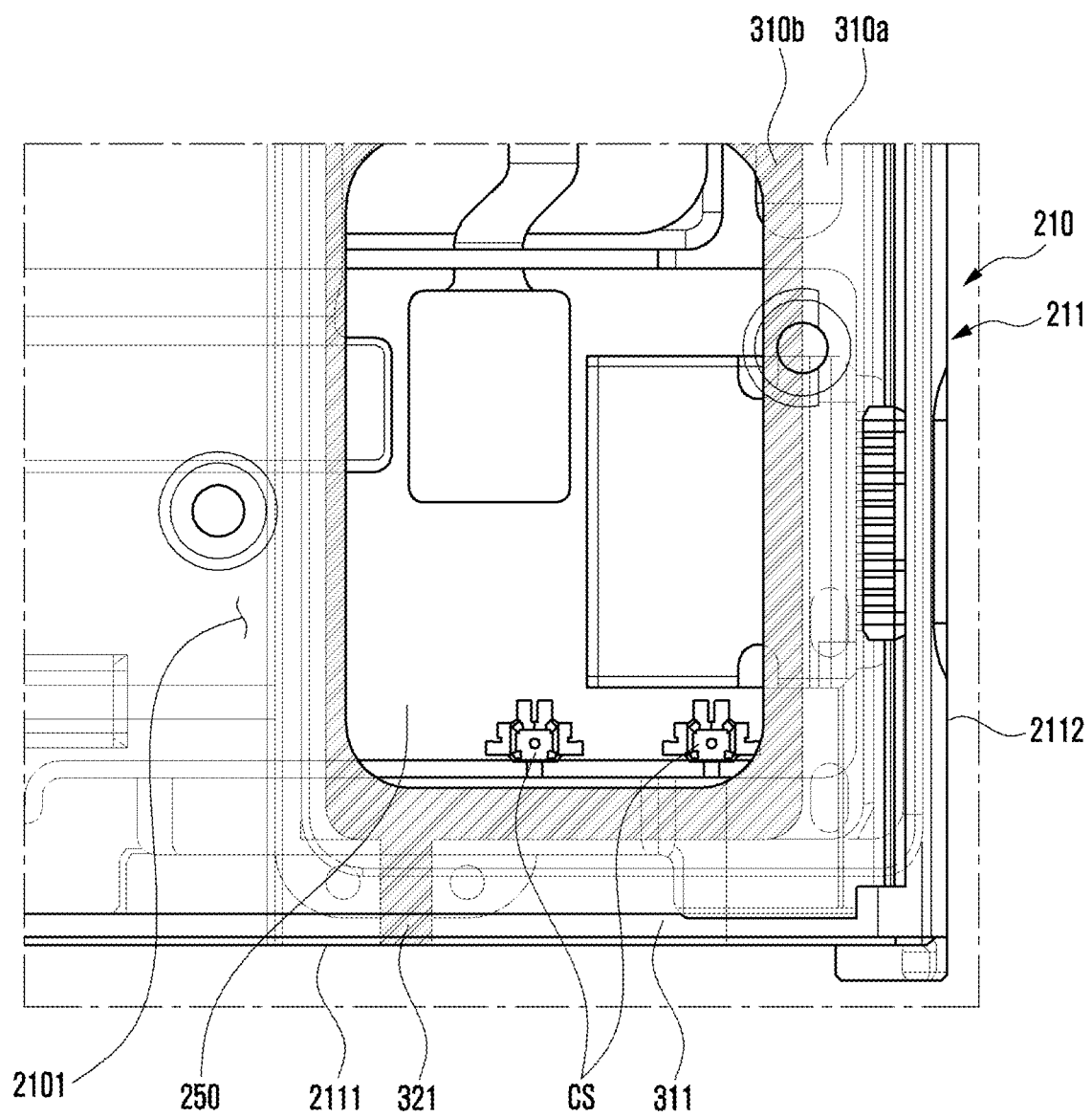
FIG. 12C illustrates a configuration diagram of an electrical connection structure of an antenna in an area 12c of FIG. 9B according to various embodiments of the disclosure.

FIG. 12A illustrates a configuration diagram of an electrical connection structure of an antenna in an area 12a of FIG. 9B according to various embodiments of the disclosure. FIG. 12B illustrates a configuration diagram of an electrical connection structure of an antenna in an area 12b of FIG. 9B according to various embodiments of the disclosure. FIG. 12C illustrates a configuration diagram of an electrical connection structure of an antenna in an area 12c of FIG. 9B according to various embodiments of the disclosure.

Referring to FIGS. 12A to 12C, a first housing 210 may include a first side member 211 and a first support member 212 at least partly extending from the first side member 211 to a first space 2101. According to an embodiment, the first housing 210 and/or a second housing 220 may include a conductive material and a non-conductive material combined with the conductive material, and the conductive material may include at least one conductive part segmented through the non-conductive material. According to an embodiment, at least a part of the at least one conductive part is electrically connected to a wireless communication circuit, and thus may be used as an antenna. For example, the first housing 210 may be formed of the non-conductive material 310b, may be segmented through a plurality of non-conductive parts 321, 322, 323, 324, and 325 spaced apart from one another at designated intervals, and may include conductive parts 311, 312, 313, 314, and 315 formed of the conductive material 310a. According to an embodiment, the conductive parts 311, 312, 313, 314, and 315 may be electrically connected to a main board 250 disposed in a first space 2101 of the first housing 210. For example, the conductive parts 311, 312, 313, 314, or 315 may be electrically connected to the main board 250 through an electrical connection member CS. In a certain embodiment, the conductive parts 311, 312, 313, 314, and 315 may include parts (e.g., connection pieces extending to the first space 2101) that are easy to be connected to the electrical connection member CS. According to an embodiment, the electrical connection member CS may include a C-clip, a conductive contact switch, or a pogo pin. Accordingly, the conductive parts 311, 312, 313, 314, and 315 may be electrically connected to a wireless communication circuit (e.g., wireless communication module 192 of FIG. 1) of the main board 250, and thus may be used as antennas operating in at least one designated frequency band. In a certain embodiment, the wireless communication circuit (e.g., wireless communication module 192 of FIG. 1) may be disposed in a different position from the main board in the first space 2101, or may be disposed on a sub board (e.g., sub board 252 of FIG. 15A) which is spaced apart from the main board 250 and is electrically connected to the main board 250.

Figure 12D:
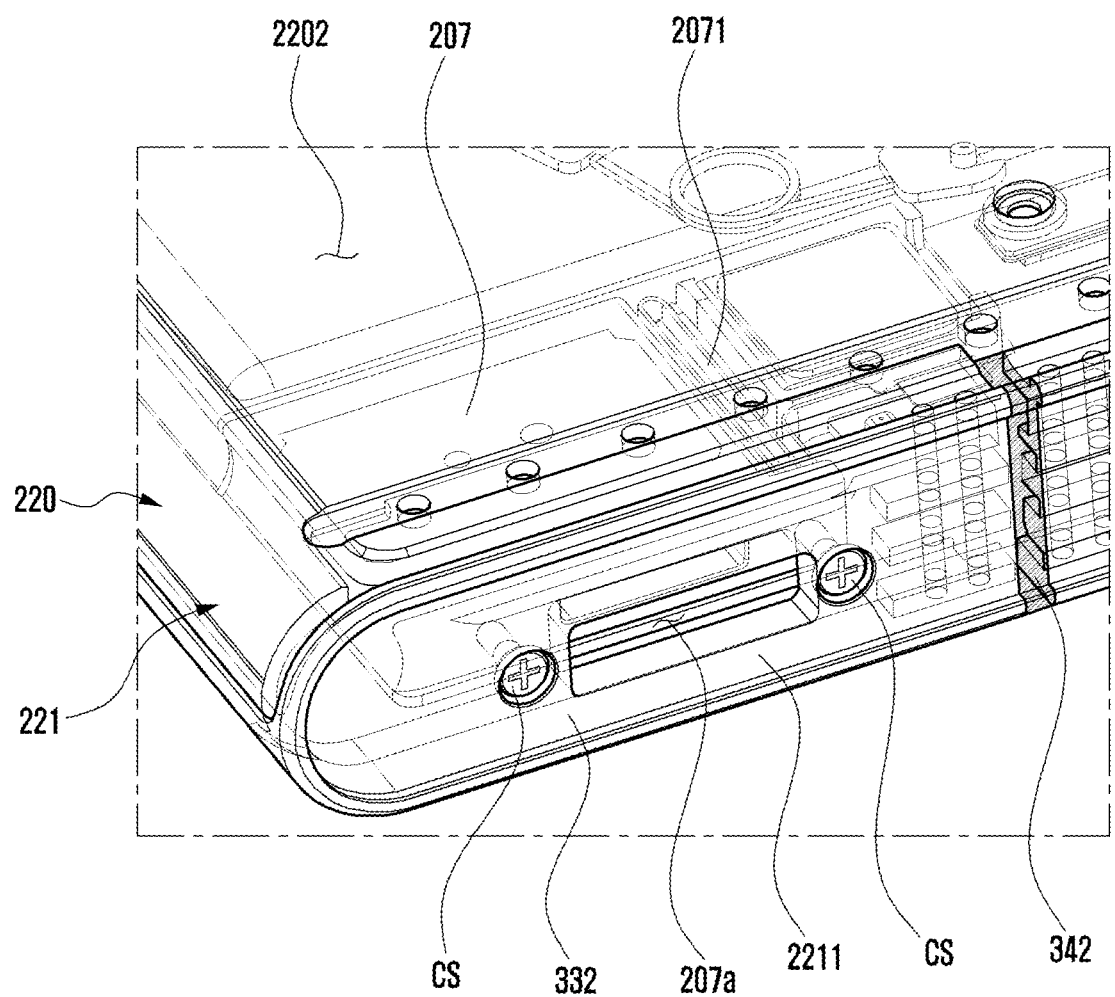
FIG. 12D illustrates a configuration diagram of an electrical connection structure of an antenna in an area 12d of FIG. 9B according to various embodiments of the disclosure.

FIG. 12D is a configuration diagram illustrating an electrical connection structure of an antenna in an area 12d of FIG. 9B according to various embodiments of the disclosure.

Referring to FIG. 12D, a second housing 220 may include a sixth conductive part 332 segmented through a seventh non-conductive part 342. According to an embodiment, the sixth conductive part 332 may be electrically connected to the wireless communication circuit (e.g., wireless communication module 192 of FIG. 1) through a flexible printed circuit board (FPCB) 2071 extending from a second space 2201 to a first space 2101 of the first housing 210. According to an embodiment, the FPCB 2071 may be disposed to have flexibility and a length enough to accommodate the sliding operation of the electronic device 200. Although not illustrated, a fifth conductive part (e.g., fifth conductive part 331 of FIG. 9B) disposed in the second housing 220 and/or a seventh conductive part (e.g., seventh conductive part 333 of FIG. 9B) may also be electrically connected to the wireless communication circuit (e.g., wireless communication module 192 of FIG. 1) disposed in the first space 2101 in a substantially similar manner.

According to various embodiments, the second housing 220 may include a speaker 207 (e.g., external speaker or speaker module) disposed in the second space 2201 to emit sound to an outside through a first speaker hole 207a formed on a fourth side surface 2211. According to an embodiment, the speaker 207 may be moved together with the second housing 220, and may extend to the first housing 210 through the FPCB 2071. In this case, the sixth conductive part 332 that is used as the antenna may be electrically connected to the wireless communication circuit (e.g., wireless communication module 192 of FIG. 1) through the FPCB 2071 extending from the speaker 207 to the first space 2101. In a certain embodiment, the FPCB 2071 for connecting the speaker 207 and the FPCB for connecting the sixth conductive part 332 may be disposed separately from each other. According to an embodiment, as an electrical connection member CS, the sixth conductive part 332 may be electrically connected to the FPCB 2071 through a screw being fastened through the fourth side surface 2211 to fix the speaker 207 into the second space 2201.

Figure 13A:
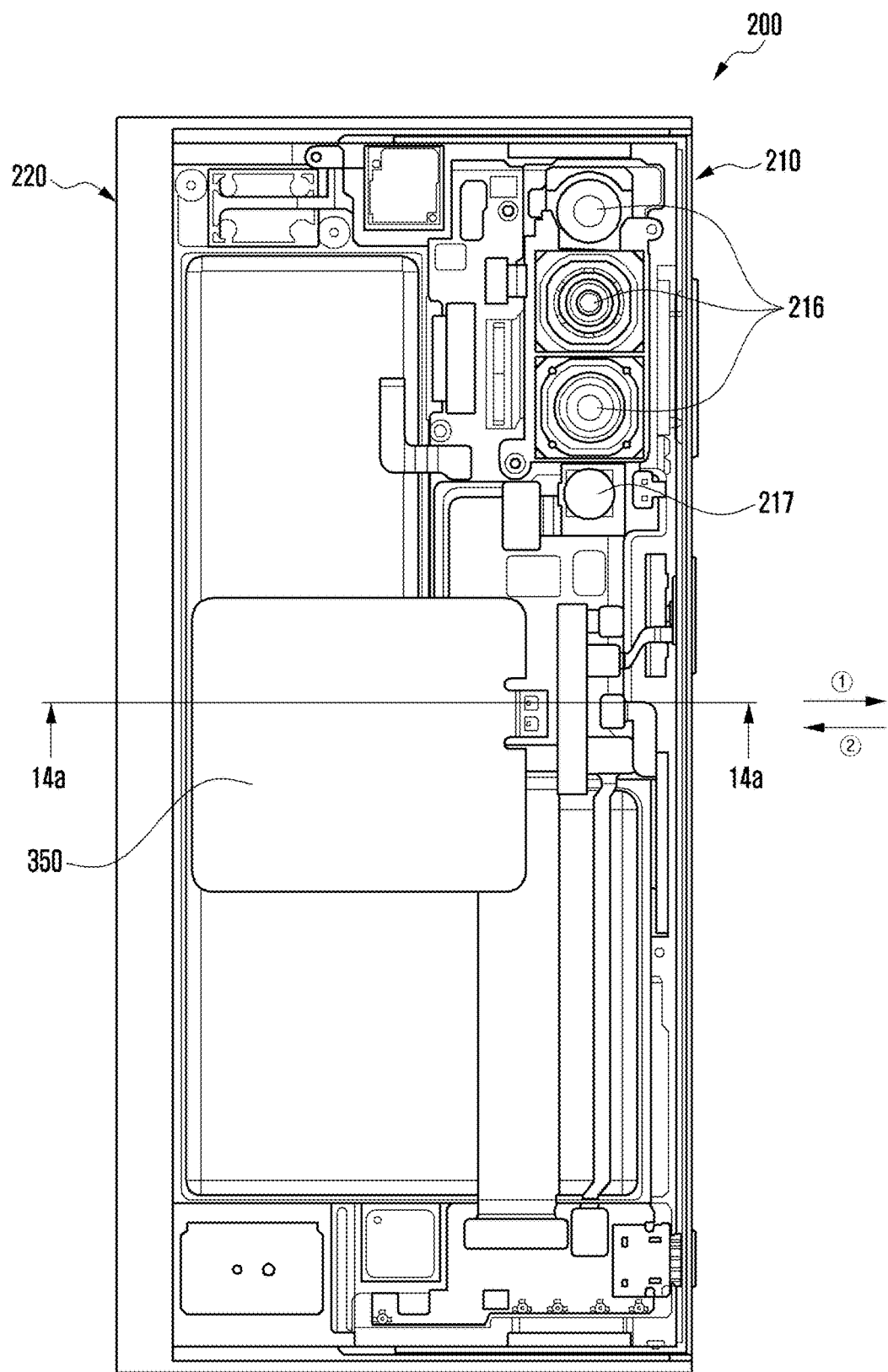
FIG. 13A illustrates a view of a slide-in state of an electronic device including an antenna member according to various embodiments of the disclosure.
Figure 13B:
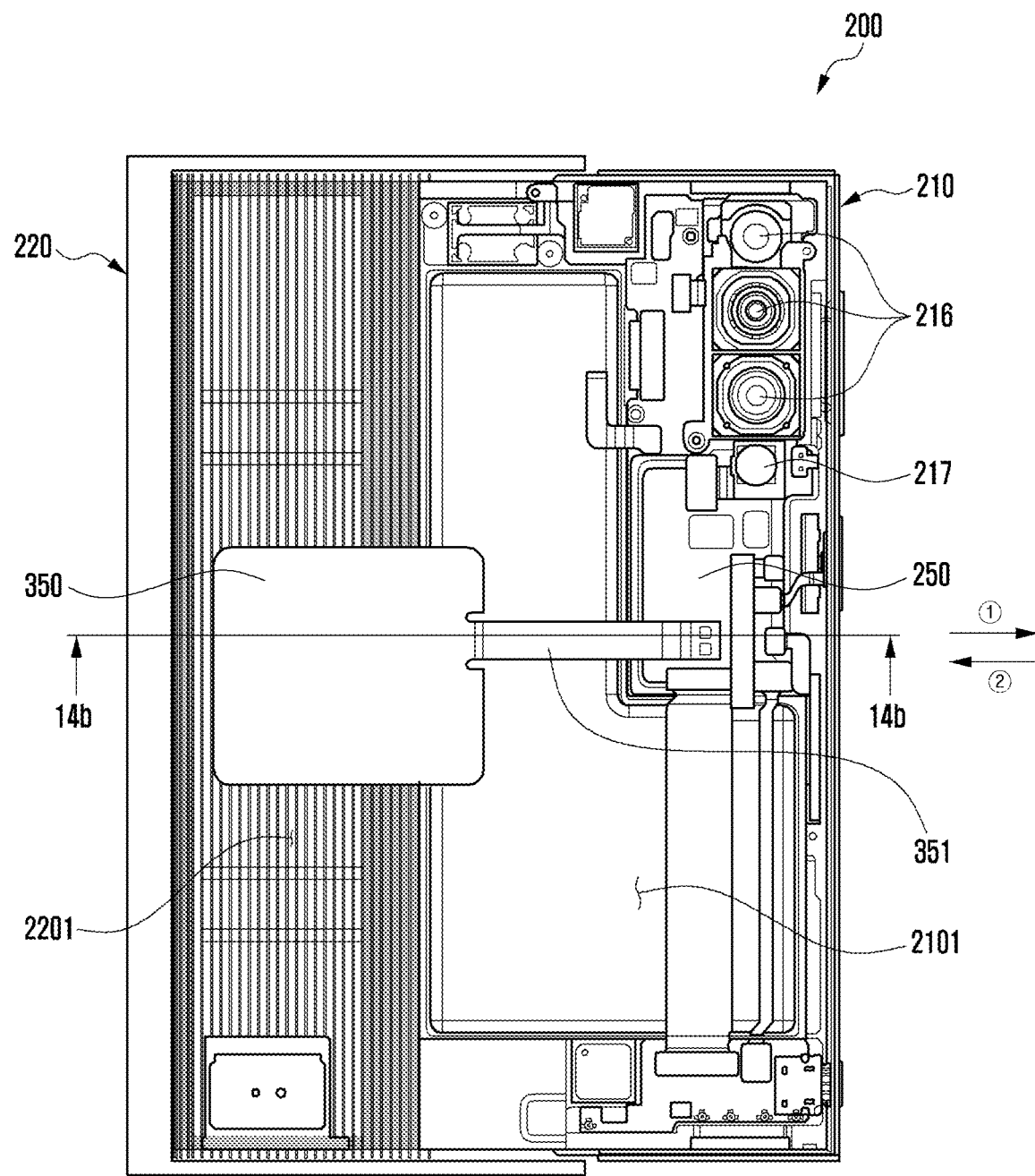
FIG. 13B illustrates a view of a slide-out state of an electronic device including an antenna member according to various embodiments of the disclosure.
Figure 14A:
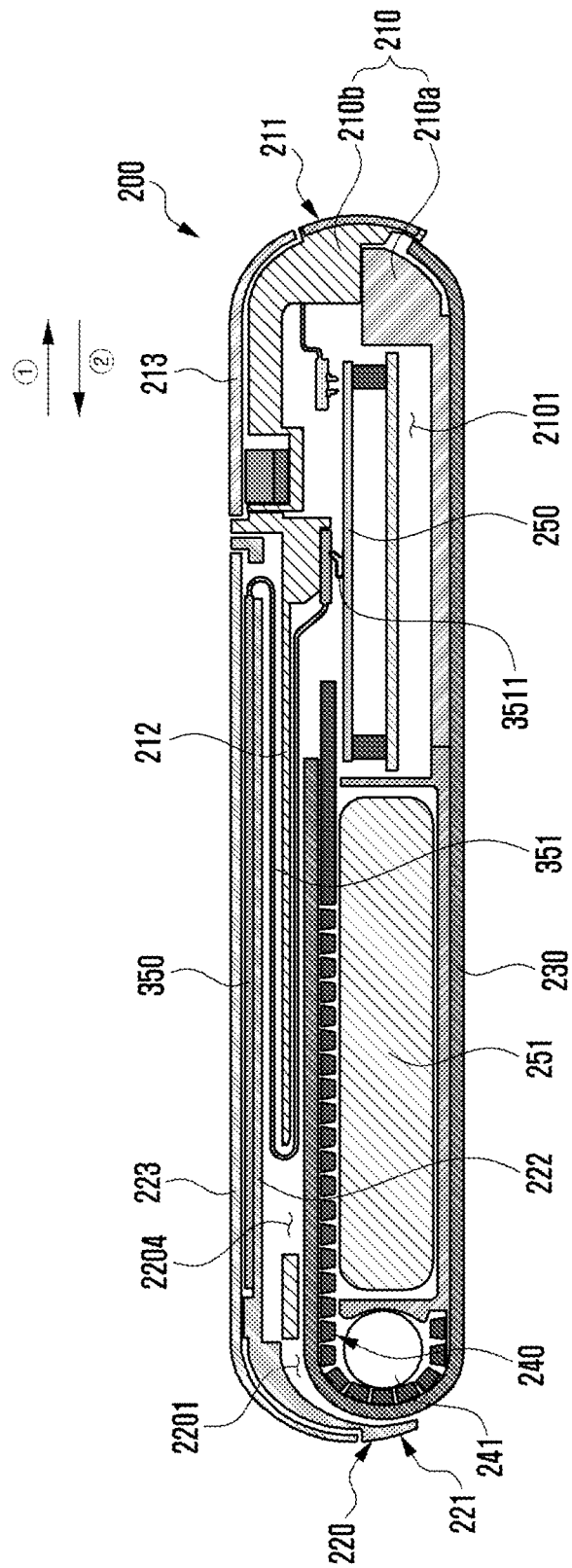
FIG. 14A illustrates a cross-sectional view of an electronic device as seen along line 14a-14a of FIG. 13A according to various embodiments of the disclosure.
Figure 14B:
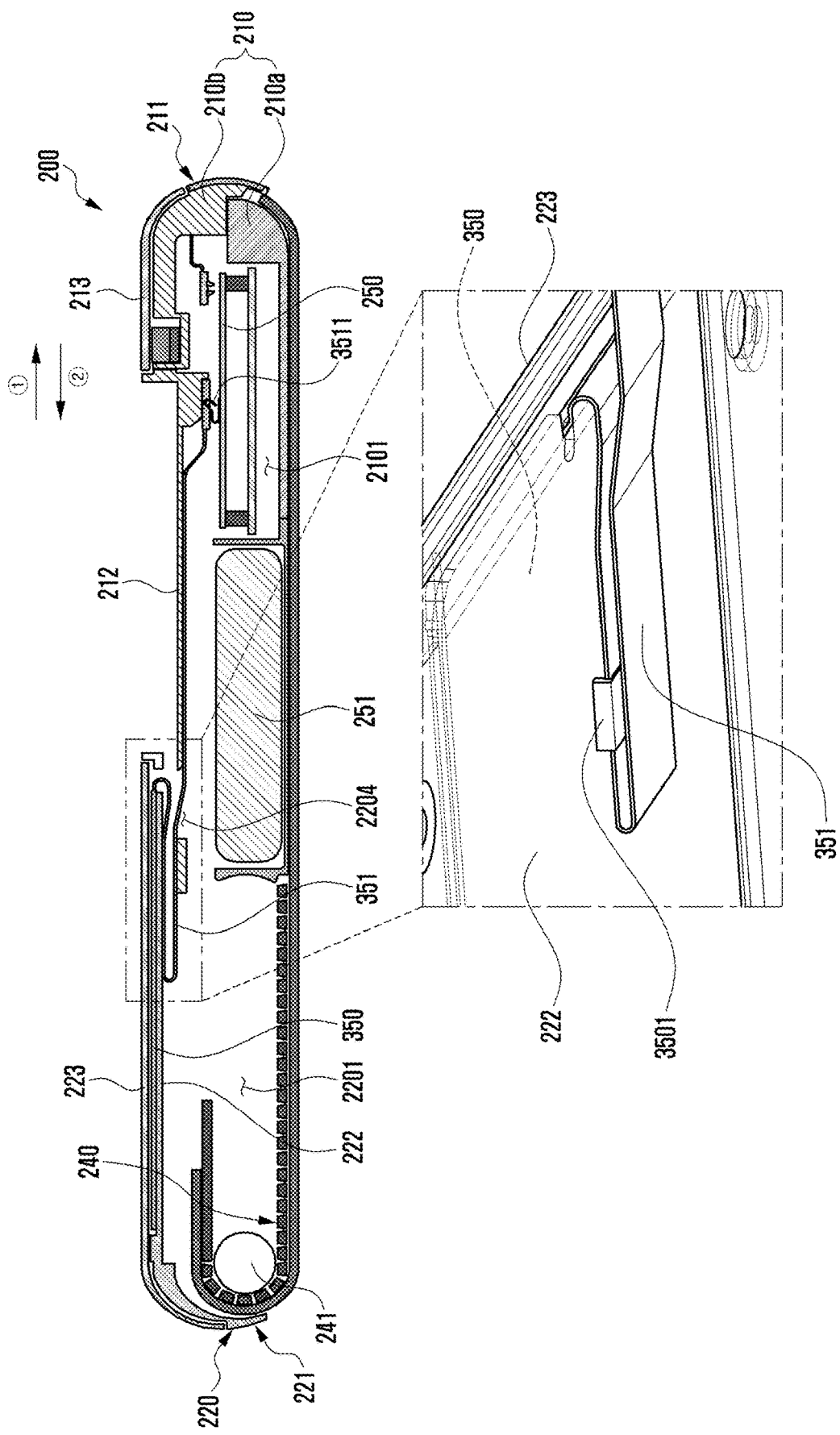
FIG. 14B illustrates a cross-sectional view of an electronic device as seen along line 14b-14b of FIG. 13B according to various embodiments of the disclosure.

FIGS. 13A and 13B illustrate views of a slide-in state and a slide-out state of an electronic device including an antenna member according to various embodiments of the disclosure. FIG. 14A illustrates a cross-sectional view of an electronic device as seen along line 14a-14a of FIG. 13A according to various embodiments of the disclosure. FIG. 14B illustrates a cross-sectional view of an electronic device as seen along line 14b-14b of FIG. 13B according to various embodiments of the disclosure.

In explaining constituent elements of an electronic device 200 of FIGS. 13A to 14B, the same reference numerals are used for constituent elements substantially the same as the constituent elements of the electronic device 200 of FIGS. 5A and 5B, and the detailed explanation thereof may be omitted.

Referring to FIGS. 13A to 14B, an electronic device 200 may include an antenna member 350 disposed on a rear surface (e.g., rear surface 200b of FIG. 2B) to transmit/receive a wireless signal through a second housing 220. According to an embodiment, the antenna member 350 may be disposed between a second support member 222 and a second rear cover 223 of the second housing 220. In this case, the second rear cover 223 may be formed of a dielectric material (e.g., polymer or glass) in order for the antenna member 350 to induce radiation in a direction directed by the second rear cover 223. According to an embodiment, the antenna member 350 may be electrically connected to a main board 250 through a flexible extension part 351 extending from the antenna member 350 to a first space 2101 of a first housing 210. According to an embodiment, the flexible extension part 351 may include an FPCB extending from the antenna member 350. According to an embodiment, one end of the extension part may be electrically connected to the antenna member 350, and the other end thereof may be electrically connected to the main board through an electrical connection member such as a conductive spring 3511. According to an embodiment, the extension part 351 may be formed on the rear surface of the second support member 222, or may be disposed so as to be at least partly supported through a support part 3501 additionally disposed. In a certain embodiment, the flexible extension part 351 may be disposed separately from the antenna member 350, and may be electrically connected to the antenna member 350.

According to various embodiments, the electronic device 200 may include a through-hole 2204 formed on the first support member 212 of the first housing 210 in order to pass the flexible extension part 351 from a space between the second support member 222 and the second rear cover 223 to the first space 2101. According to an embodiment, the through-hole 2204 may be formed in a corresponding position of the first support member 212 of the first housing 210 so as not to be seen from an outside through the second support member 222 in a slide-out state, and thus the flexible extension part 315 may be formed so as not to be seen from the outside even in the slide-out state. According to an embodiment, the antenna member 350 may include a coil member disposed through a dielectric film. According to an embodiment, the antenna member 350 may include a multi-function coil or multi-function core (MFC) antenna for performing a wireless charging function, a near field communication (NFC) function, and/or an electronic payment function.

Figure 15A:
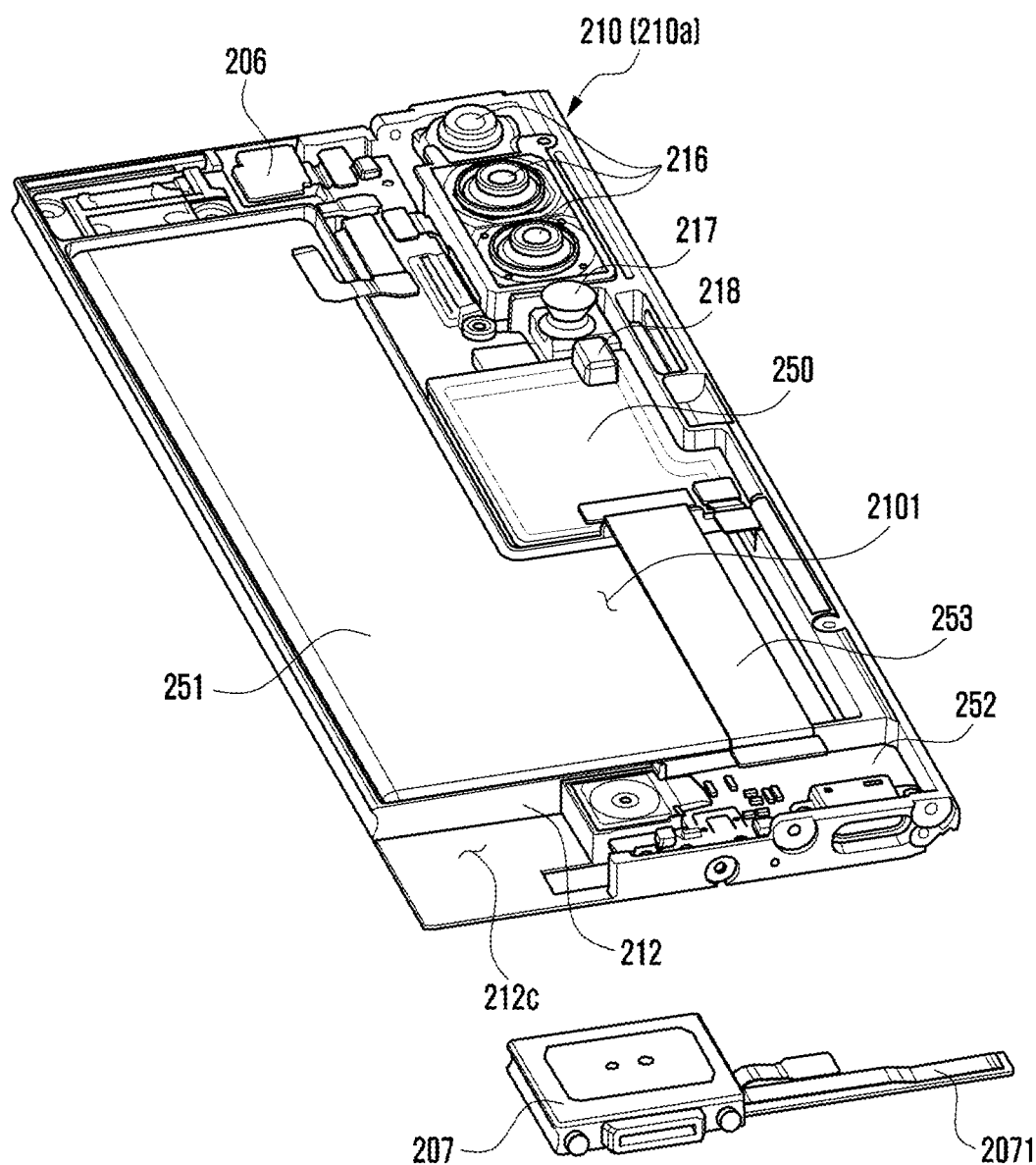
FIG. 15A illustrates a perspective view of a first housing of a component arrangement structure according to various embodiments of the disclosure.
Figure 15B:
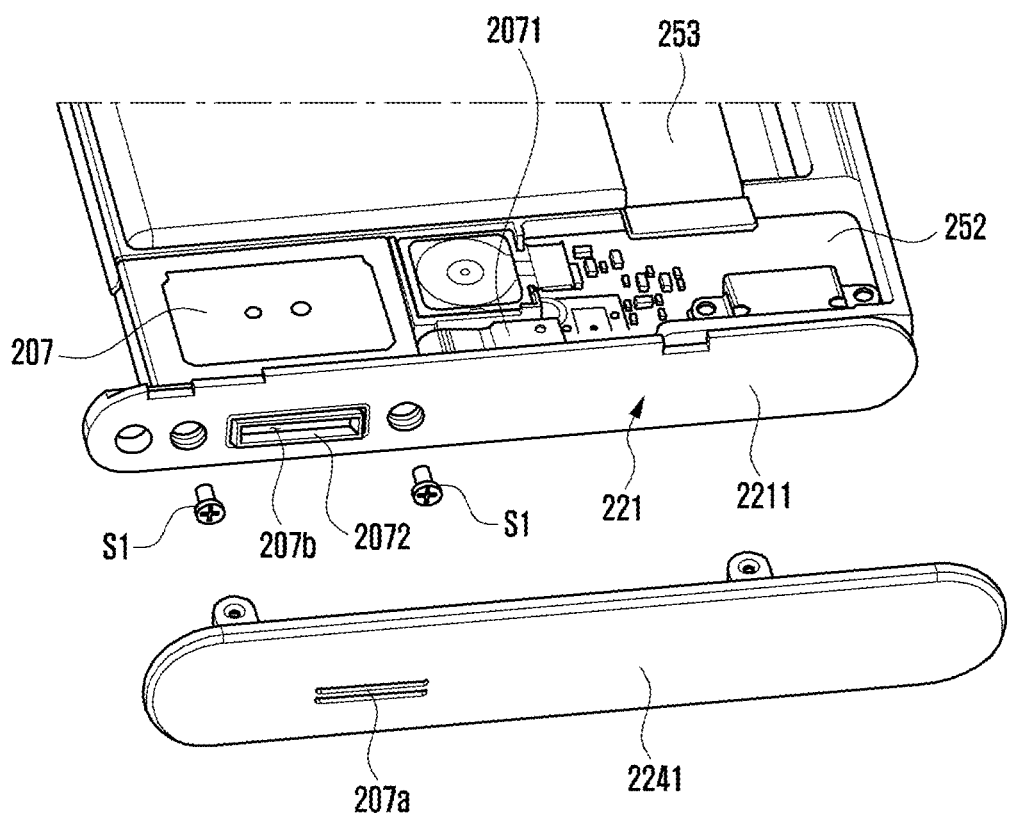
FIG. 15B illustrates a partial perspective view of an electronic device of a speaker arrangement structure according to various embodiments of the disclosure.

FIG. 15A illustrates a perspective view of a first housing of a component arrangement structure according to various embodiments of the disclosure. FIG. 15B illustrates a partial perspective view of an electronic device of a speaker arrangement structure according to various embodiments of the disclosure.

Figure 16A:
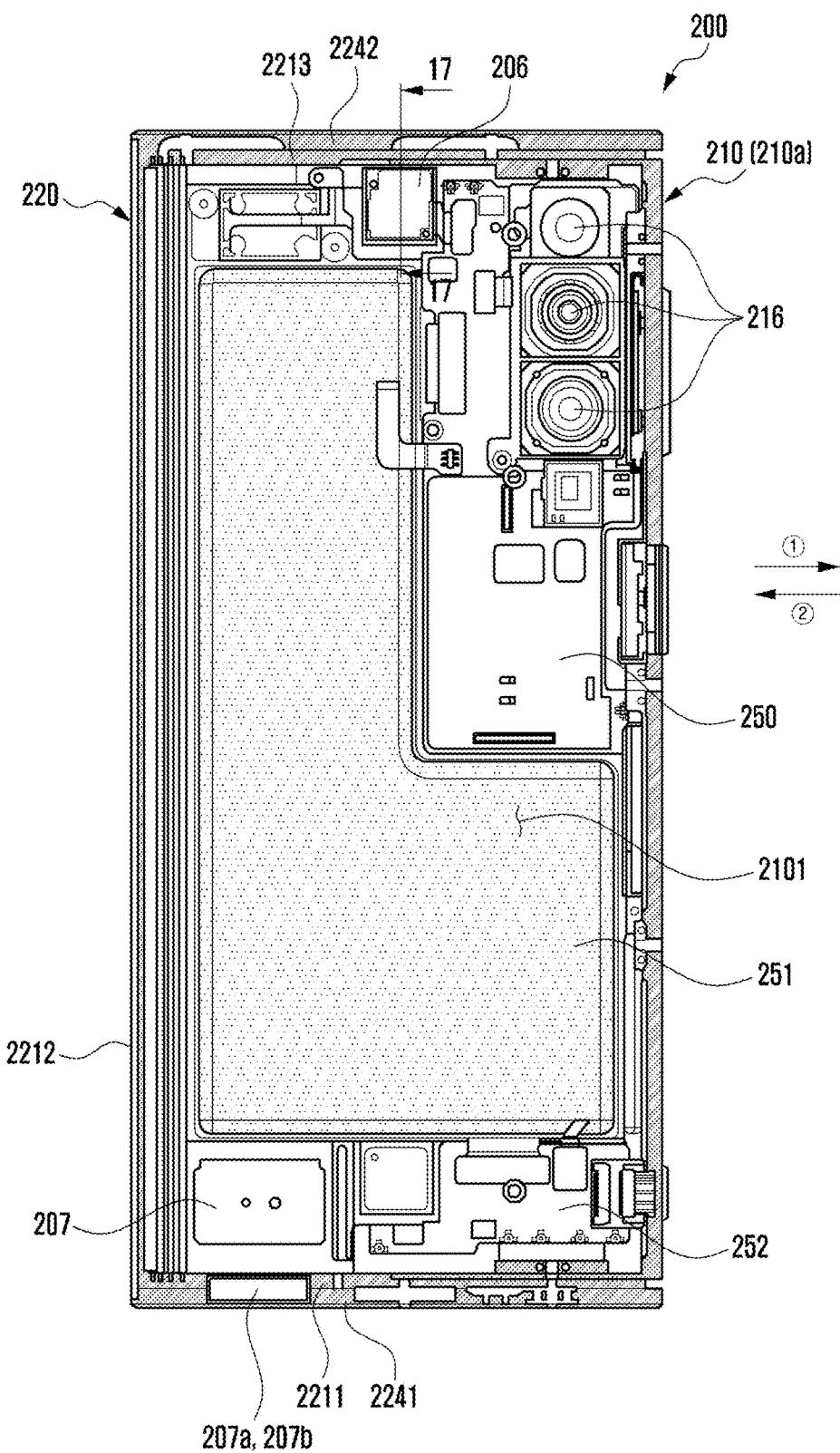
FIG. 16A illustrates a view of a slide-in state of an electronic device including a speaker according to various embodiments of the disclosure.
Figure 16B:
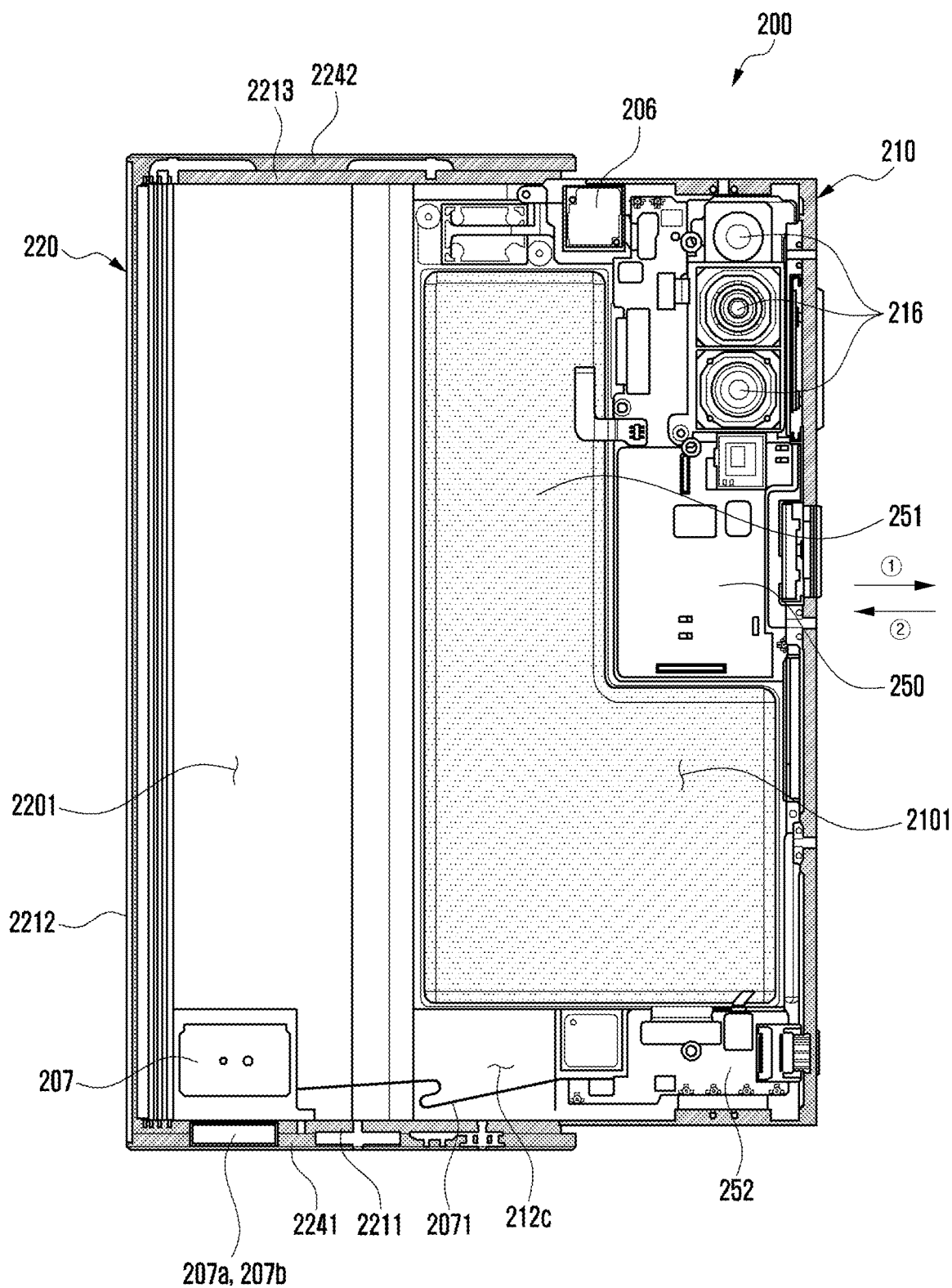
FIG. 16B illustrates a view of a slide-out state of an electronic device including a speaker according to various embodiments of the disclosure.

Referring to FIGS. 15A and 15B, an electronic device (e.g., electronic device 200 of FIG. 16B) may include a first housing 210 including a first space (e.g., first space 2101 of FIG. 16B) and a second housing (e.g., second housing 220 of FIG. 16B) slidably combined with the first housing 210 and including a second space (e.g., second space 2201 of FIG. 16B). According to an embodiment, the electronic device 200 may include at least one first electronic component disposed in an first space 2101 of the first housing 210. According to an embodiment, the at least one first electronic component may include a main board 250 disposed in the first space 2101, at least one camera module 216, a sensor module 217, a flash 218, a receiver 206 (e.g., call speaker), and/or a battery 251. For example, the at least one camera module 216 may be disposed in a position that does not overlap the main board 250. According to an embodiment, the at least one first electronic component may be disposed to be spaced apart from the main board 250, and may include a sub board 252 electrically connected through a connection cable 253. In a certain embodiment, the main board 250 may extend up to an area in which the sub board 252 is disposed in a state where the connection cable 253 and the sub board 252 are omitted.

According to various embodiments, the electronic device 200 may include at least one second electronic component disposed in the second space 2201 of the second housing 220. According to an embodiment, the at least one second electronic component may include a speaker 207 (e.g., external speaker). According to an embodiment, the speaker 207 may be disposed in the second space 2201 through a structural shape change of a second support member 222 and/or a second side member 221. According to an embodiment, the speaker 207 may be fixed into the second space 2201 through a fastening member such as a screw Si penetrating through the second side member 221. According to an embodiment, the speaker 207 may be disposed so as to emit sound to an outside through a first speaker hole 207a formed on a first side cover 2241. According to an embodiment, the speaker 207 may be disposed so as to face a second speaker emission hole 207b formed on a fourth side surface 2211 of the second side member 221 in the second space 2201, and may be aligned to correspond to the first speaker hole 207a of the first side cover 2241. According to an embodiment, the electronic device 200 may include a sealing member 2072 disposed between the fourth side surface 2211 and the first side cover 2241. According to an embodiment, the sealing member 2072 may include at least one of sponge, rubber, urethane, or silicone.

According to various embodiments, the electronic device 200 may include a flexible printed circuit board (FPCB) 2071 extending from the second space 2201 to the first space 2101 and electrically connected to the sub board 252. According to an embodiment, the FPCB 2071 may be formed to have flexibility and a length capable of accommodating the sliding operation of the electronic device 200. According to an embodiment, the first housing 210 may include an accommodation part 212c formed to accommodate the speaker 207 disposed in the second space 2201 of the second housing 220 in a slide-in state through the structural shape of the first support member 212.

According to an exemplary embodiment of the disclosure, since the speaker 207 is disposed in the second space 2201 of the second housing 220 and is disposed to emit the sound through the first speaker hole 207a and the second speaker emission hole 207b being exposed to the outside regardless of the slide-in or slide-out operation through the second side member 221 of the second housing, it is possible to prevent sound quality deterioration such as a sound leak phenomenon due to a gap between side surfaces (e.g., first side surface 2111 and fourth side surface 2211), which occurs in accordance with the assembly tolerance of the two housings 210 and 220 or the sliding operation thereof.

Figure 17:
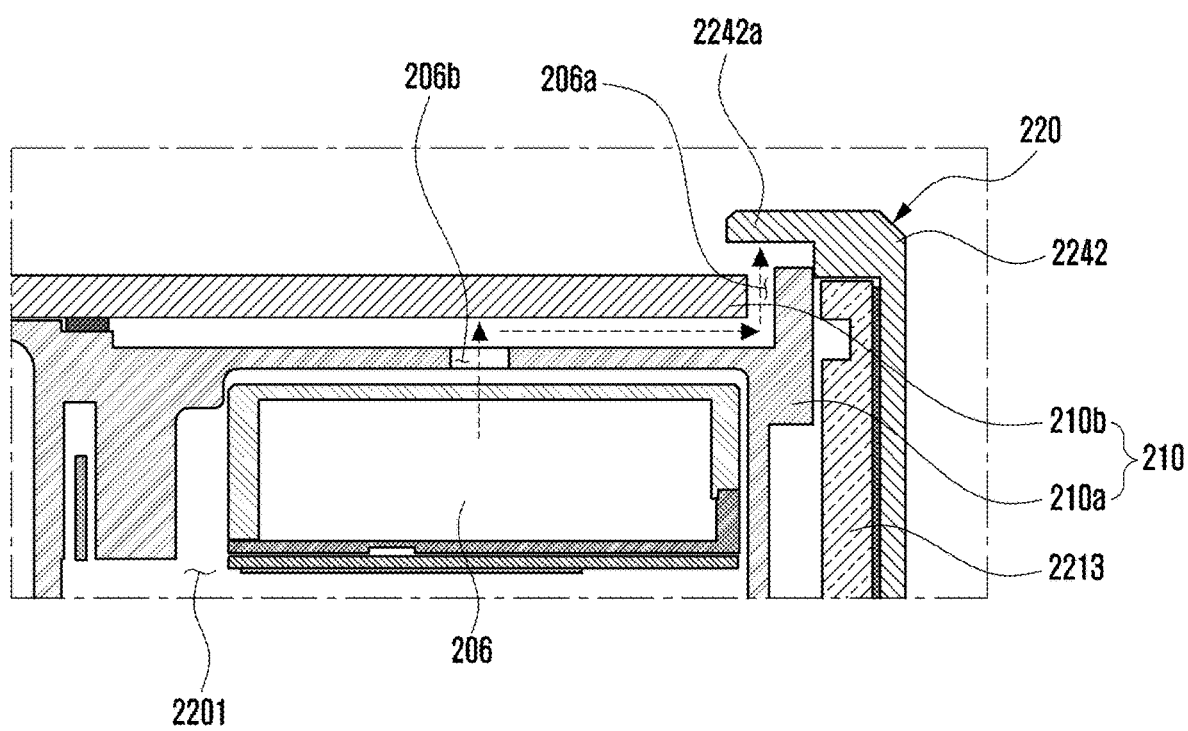
FIG. 17 illustrates a partial cross-sectional view of an electronic device as seen along line 17-17 of FIG. 16A according to various embodiments of the disclosure.
Figure 18A:
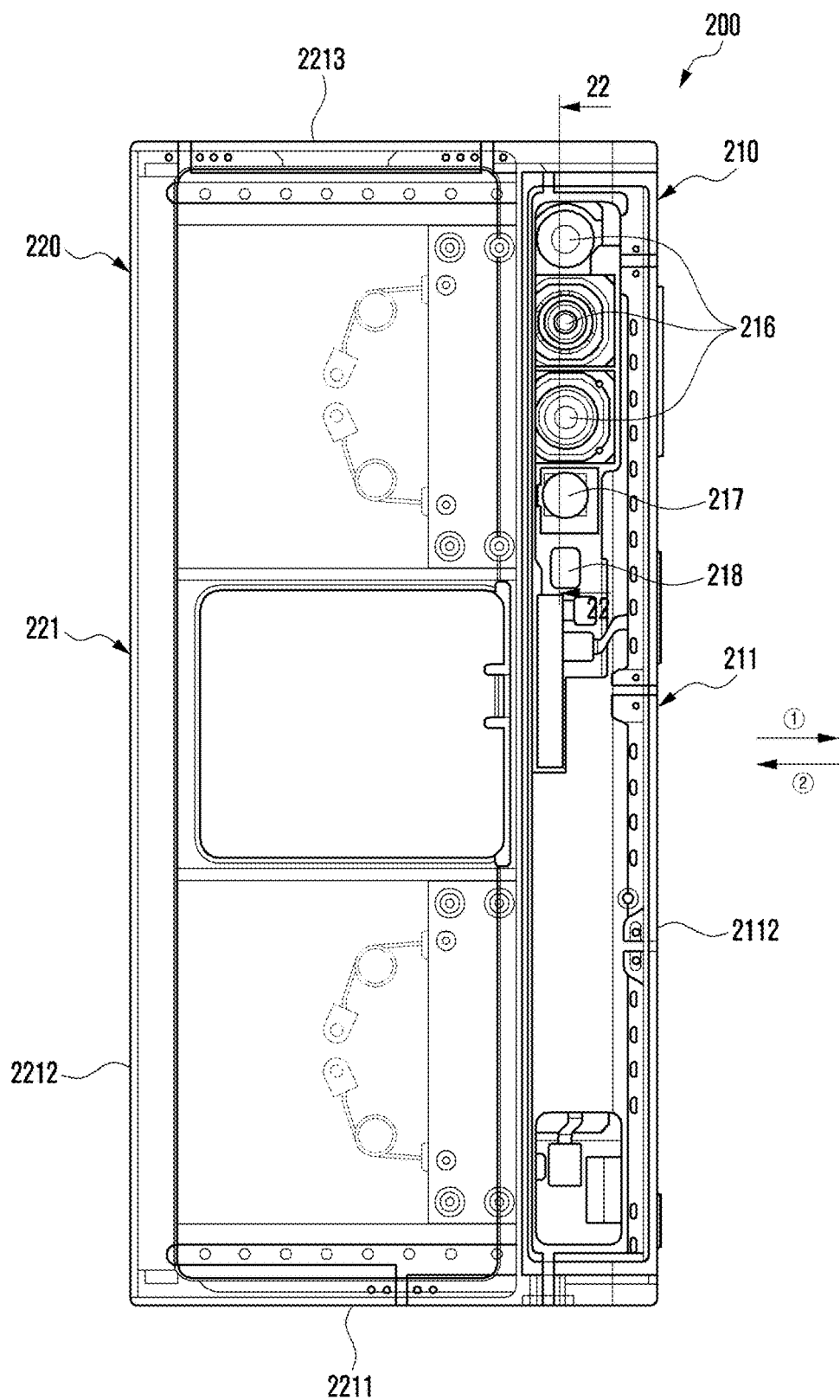
FIG. 18A illustrates a view of a mounting structure of a card tray in a slide-in state of an electronic device according to various embodiments of the disclosure.
Figure 18B:
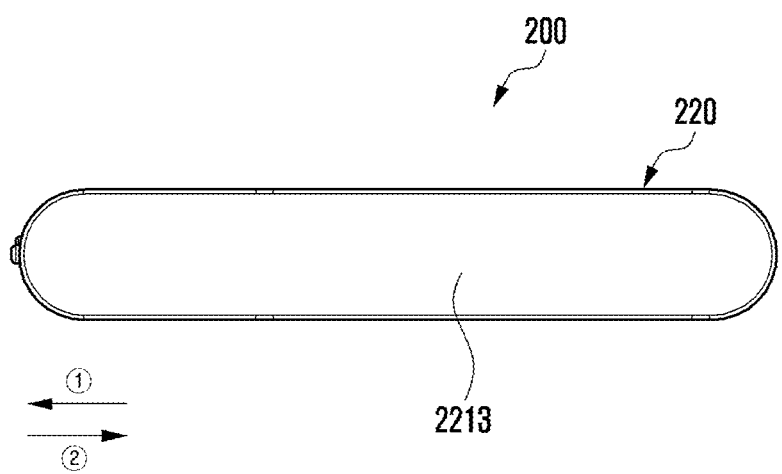
FIG. 18B illustrates a view of a mounting structure of a card tray in a slide-in state of an electronic device according to various embodiments of the disclosure.
Figure 19A:
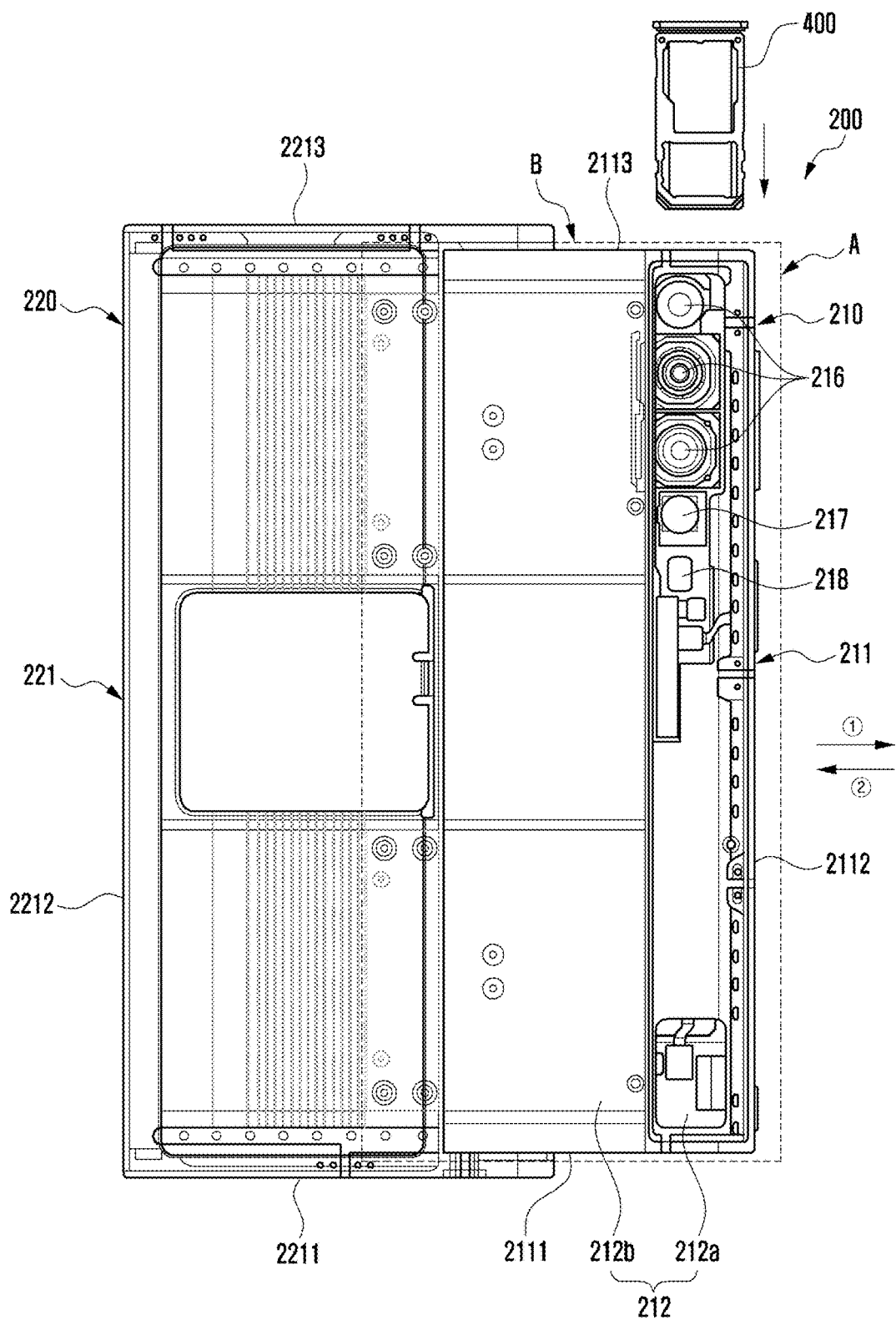
FIG. 19A illustrates a view of a mounting structure of a card tray in a slide-out state of an electronic device according to various embodiments of the disclosure.
Figure 19B:
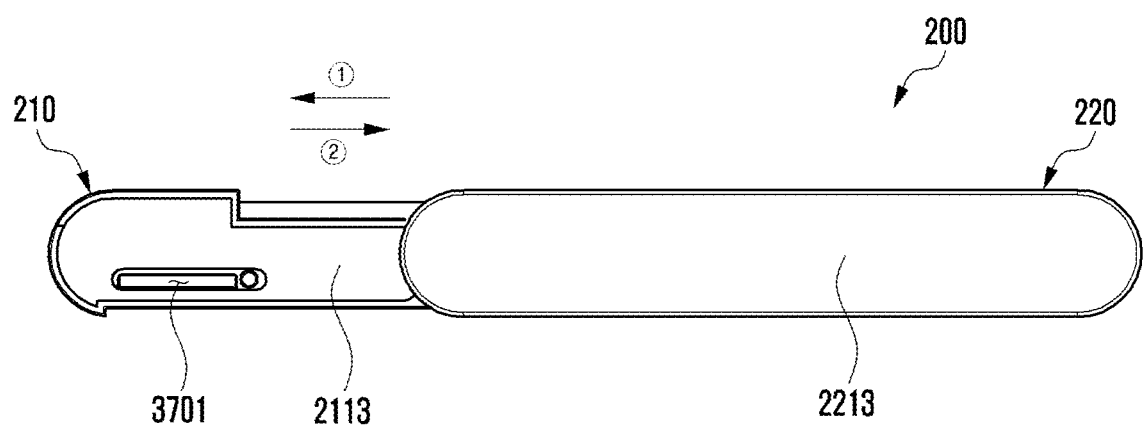
FIG. 19B illustrates a view of a mounting structure of a card tray in a slide-out state of an electronic device according to various embodiments of the disclosure.

FIGS. 16A and 16B are views illustrating a slide-in state and a slide-out state of an electronic device including a speaker according to various embodiments of the disclosure. FIG. 17 is a partial cross-sectional view of an electronic device as seen along line 17-17 of FIG. 16A according to various embodiments of the disclosure.

FIG. 16A illustrates a view of the configuration of an electronic component arrangement of a first housing in a state where a second support member of a second housing is omitted. FIG. 16B illustrates a view of a slide-out state of an electronic device including a speaker according to various embodiments of the disclosure. FIG. 17 illustrates a partial cross-sectional view of an electronic device as seen along line 17-17 of FIG. 16A according to various embodiments of the disclosure.

Referring to FIGS. 16A to 17, in a slide-in state of an electronic device 200, a speaker 207 disposed in a second space 2201 of a second housing 220 may be positioned in an accommodation part 212c disposed through the structural shape of a first support member 212 of a first housing 210. According to an embodiment, in a slide-out state of the electronic device 200, the first housing 210 may be moved in a designated first direction (direction ①) against a second housing 220, and the speaker 207 disposed in the second space 2201 may also be moved against the accommodation part 212c. In this case, the speaker 207 can continuously maintain an electrical connection state with a sub board 252 through a flexible printed circuit board (FPCB) 2071. According to an embodiment, since the speaker 207 emits sound through a first speaker hole 207a and a second speaker emission hole 207b disposed in the second housing 220 so as to be exposed to an outside, the best acoustic emission performance can be maintained.

According to various embodiments, the electronic device 200 may include a receiver 206 (e.g., call speaker) disposed in the first space 2101 through the structural shape of the first support member 212 of the first housing 210. According to an embodiment, the receiver 206 may be disposed to emit sound to the outside through a through-hole 206b formed in a first bracket housing 210a of the first housing 210 and an acoustic emission hole 206a formed through a combination structure of the first bracket housing 210a and a second bracket housing 210b. According to an embodiment, the acoustic emission hole 206a may be disposed so as not to be seen from the outside through a second side cover 2242 in the slide-in state. According to an embodiment, the acoustic emission hole 206a may be hidden so as not to be seen from the outside through a bent part 2242a formed to be bent at an end part of the second side cover 2242 in the slide-in state. In a certain embodiment, the acoustic emission hole 206a may be disposed in a position that can be at least partly seen from the outside in the slide-out state. In a certain embodiment, the acoustic emission hole 206a may be disposed to be hidden through the second side cover 2242 so as not to be seen from the outside even in the slide-out state.

According to the exemplary embodiments of the disclosure, at least one other electronic component that may be interfered in accordance with the sliding operation of the first housing 210 and the second housing 220 may be disposed in substantially the same method as that of the speaker 207. According to an embodiment, the at least one other electronic component may include at least one of an IF connector port, a sensor module, or a socket module.

FIGS. 18A to 19B illustrate views of a mounting structure of a card tray in a slide-in state and in a slide-out state of an electronic device according to various embodiments of the disclosure.

Referring to FIGS. 18A to 19B, an electronic device 200 may include a first housing 210, and a second housing 220 slidably combined with the first housing 210 in a designated round-trip distance. According to an embodiment, the first housing 210 may include a first side member 211 including a first side surface 2111, a second side surface 2112, and a third side surface 2113, and a first support member 212 extending from the first side member 211 to a first space 2101. According to an embodiment, the second housing 220 may include a second side member 221 including a fourth side surface 2211, a fifth side surface 2212, and a sixth side surface 2213, and a second support member 222 extending from the second side member 221 to a second space 2201. According to an embodiment, since in a slide-in state, at least parts of the first side surface 2111 and the third side surface 2113 are accommodated in a second space 2201, and face the fourth side surface 2211 and the sixth side surface 2213 of the second housing 220, respectively, they can be disposed so as not to be seen from an outside. According to an embodiment, since in a slide-out state, the first side surface 2111 and the third side surface 2113 slide out at least partly from the second space 2201, they can be disposed so as to be seen from the outside. According to an embodiment, the electronic device 200 may include a component assembly CA which is disposed in a first subspace A of the first housing 210 and in which at least two electronic components are disposed in a laminated manner. According to an embodiment, the component assembly CA may include a first electronic component disposed in the first subspace A and a second electronic component disposed in a manner that it is laminated with the first electronic component and disposed to correspond to an external environment through at least a part of the third side surface 2113. According to an embodiment, the first electronic component may include a camera module 216 disposed so as to detect the external environment through a first rear cover in the first subspace A. In a certain embodiment, the first electronic component may include at least one of the camera module 216, a sensor module 217, or a flash 218. According to an embodiment, the second electronic component may include a socket module (e.g., socket module 370 of FIG. 20) disposed so as to accommodate a socket tray 400 through an opening 3701 formed on the third side surface 2113 in the first subspace A. According to an embodiment, as seen from an upside of the first support member 212, at least two electronic components are disposed in a laminated structure in which the electronic components at least partly overlap each other through the component assembly CA, and thus can help usage of an arrangement space of other electronic components (e.g., antenna R of FIG. 9A). According to an embodiment, the opening 3701 formed on the third side surface 2113 to accommodate the socket tray 400 is hidden from the outside through a sixth side surface 2213 in the slide-in state, and thus can help formation of beautiful appearance of the electronic device 200. In a certain embodiment, the socket module 370 may be replaced by an IF connector port which may be used in the slide-out state.

Figure 20:
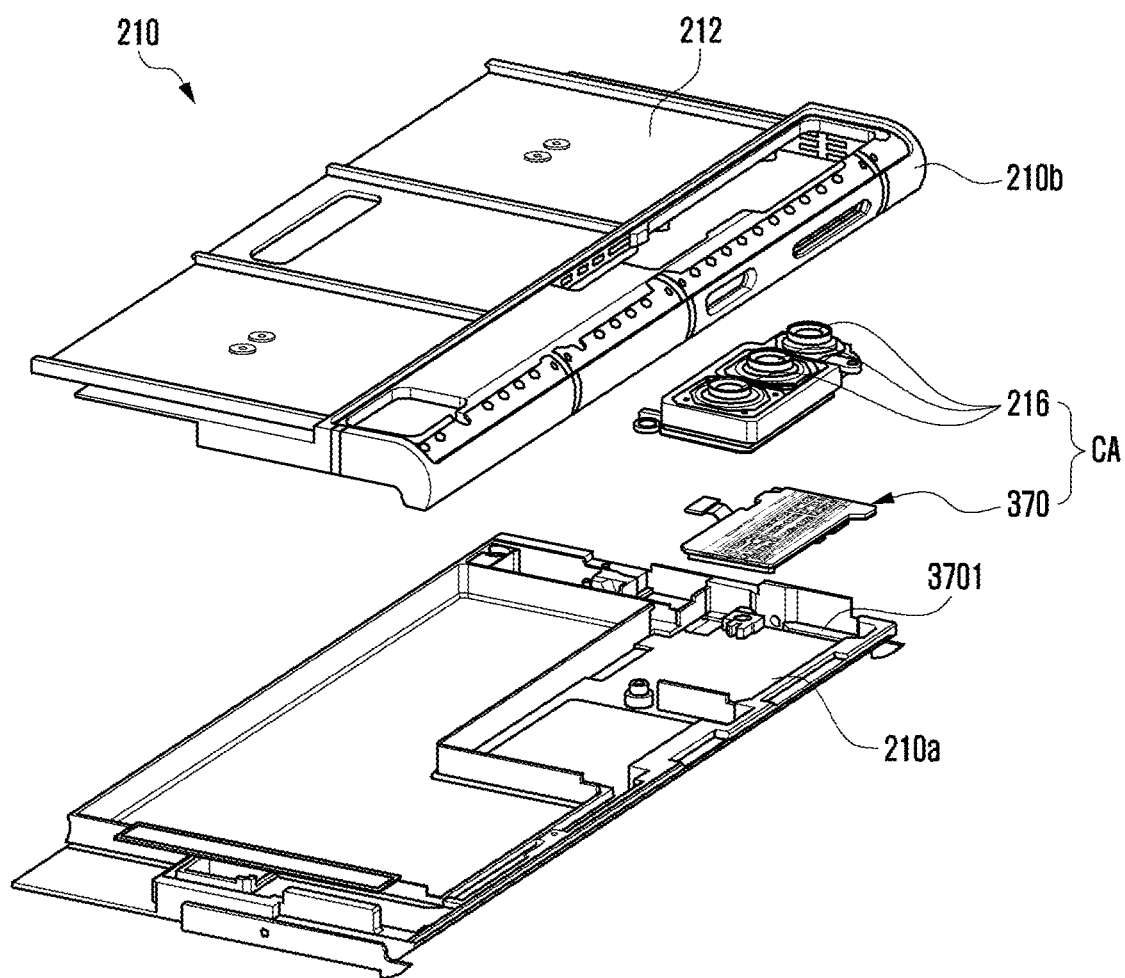
FIG. 20 illustrates an exploded perspective view of a first housing including a component assembly according to various embodiments of the disclosure.

FIG. 20 illustrates an exploded perspective view of a first housing including a component assembly according to various embodiments of the disclosure.

Referring to FIG. 20, a component assembly CA may be disposed in a first space (e.g., first space 2101 of FIG. 22) of a first housing 210 formed through a combination of a first bracket housing 210a and a second bracket housing 210b. According to an embodiment, the component assembly CA may include a camera module 216 and a socket module 370 disposed in a manner that it is laminated with the camera module 216. According to an embodiment, as seen from an upside of a first support member 212, the component assembly CA may be disposed so that the camera module 216 overlaps the socket module 370 at least partly. In this case, the socket module 370 may be disposed in a position facing an opening 3701 formed on a third side surface (e.g., third side surface 2113 of FIG. 19B) in the first housing 210.

Figure 21A:
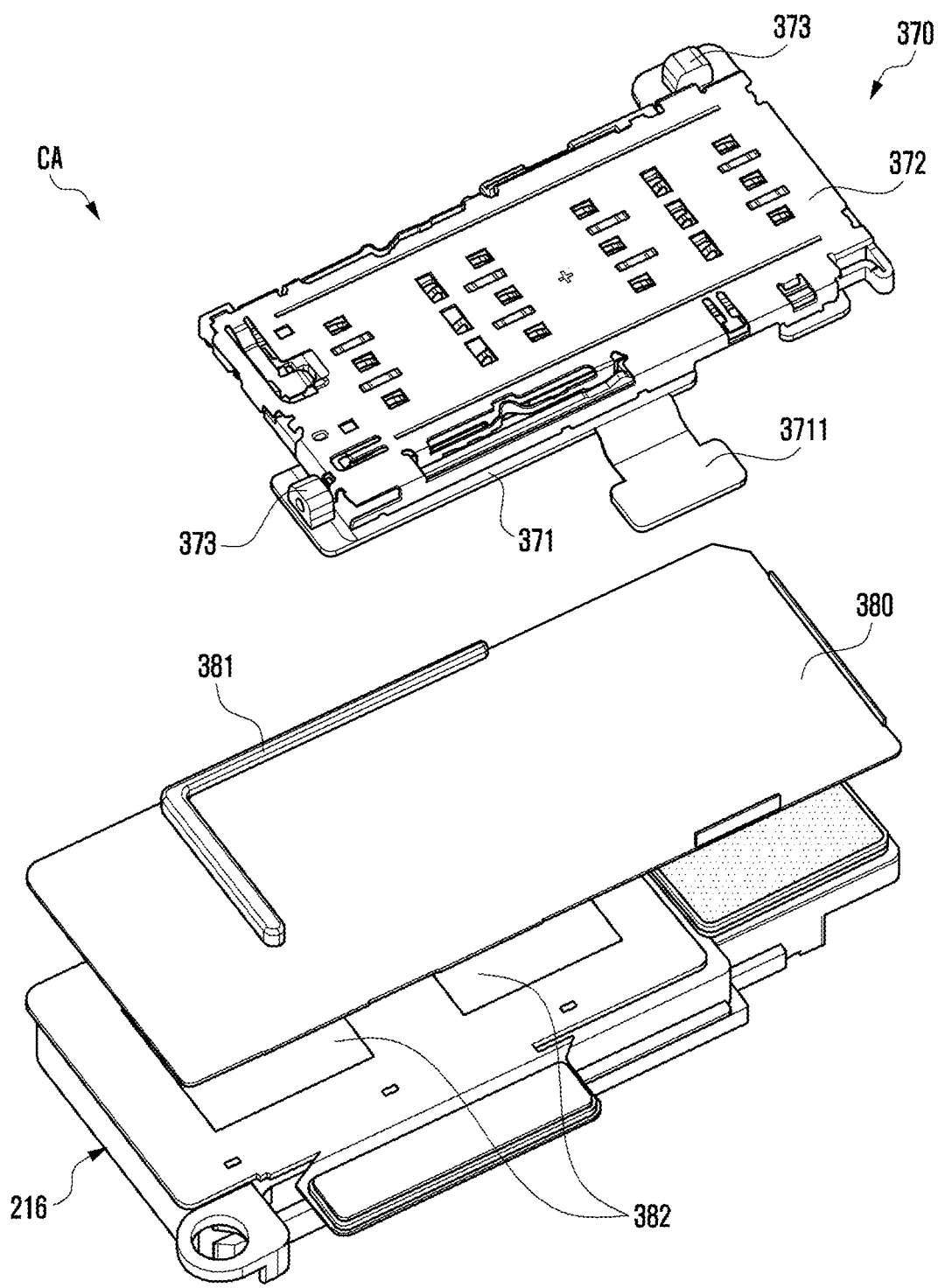
FIG. 21A illustrates a perspective view of an assembly operation of a component assembly according to various embodiments of the disclosure.
Figure 21B:
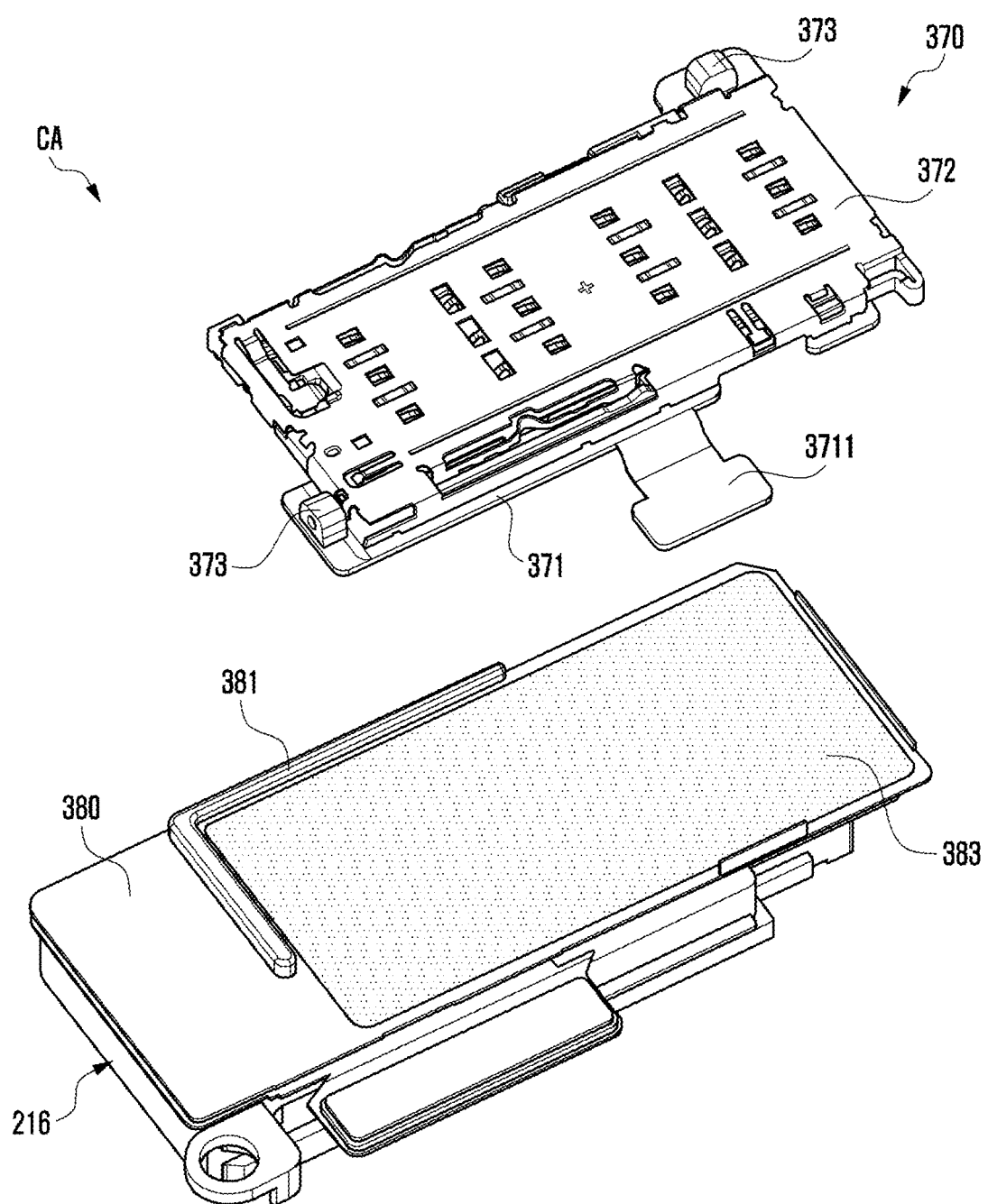
FIG. 21B illustrates a perspective view of an assembly operation of a component assembly according to various embodiments of the disclosure.
Figure 21C:
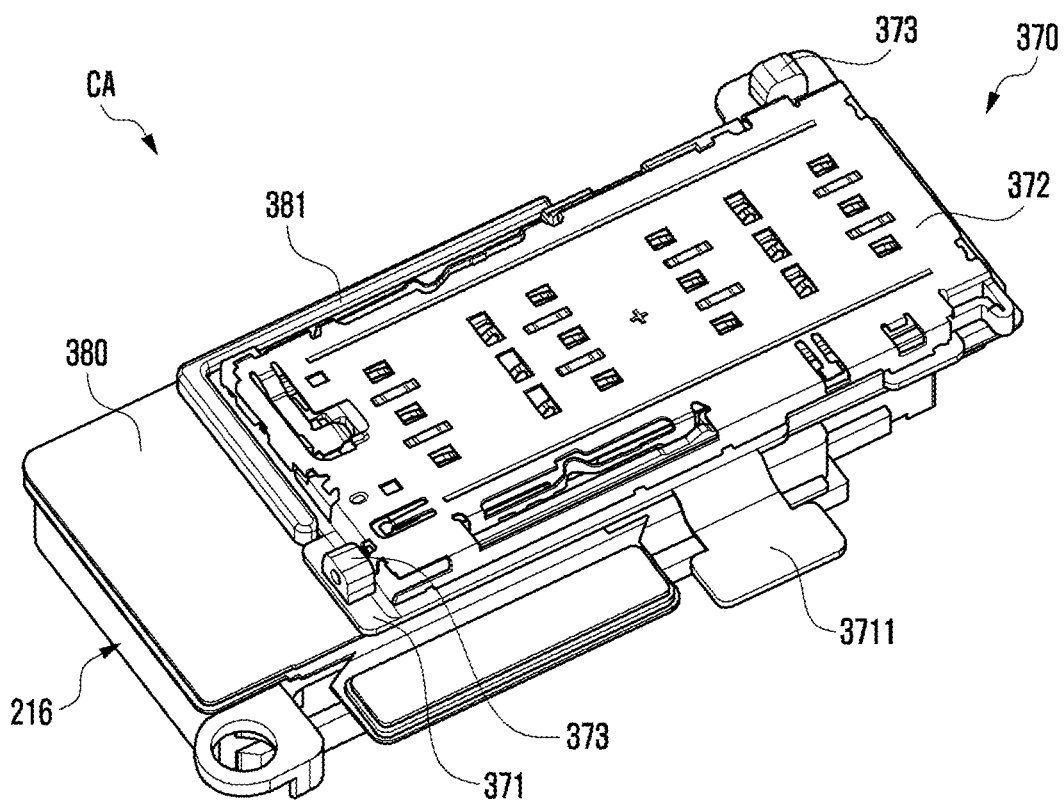
FIG. 21C illustrates a perspective view of an assembly operation of a component assembly according to various embodiments of the disclosure.
Figure 22:
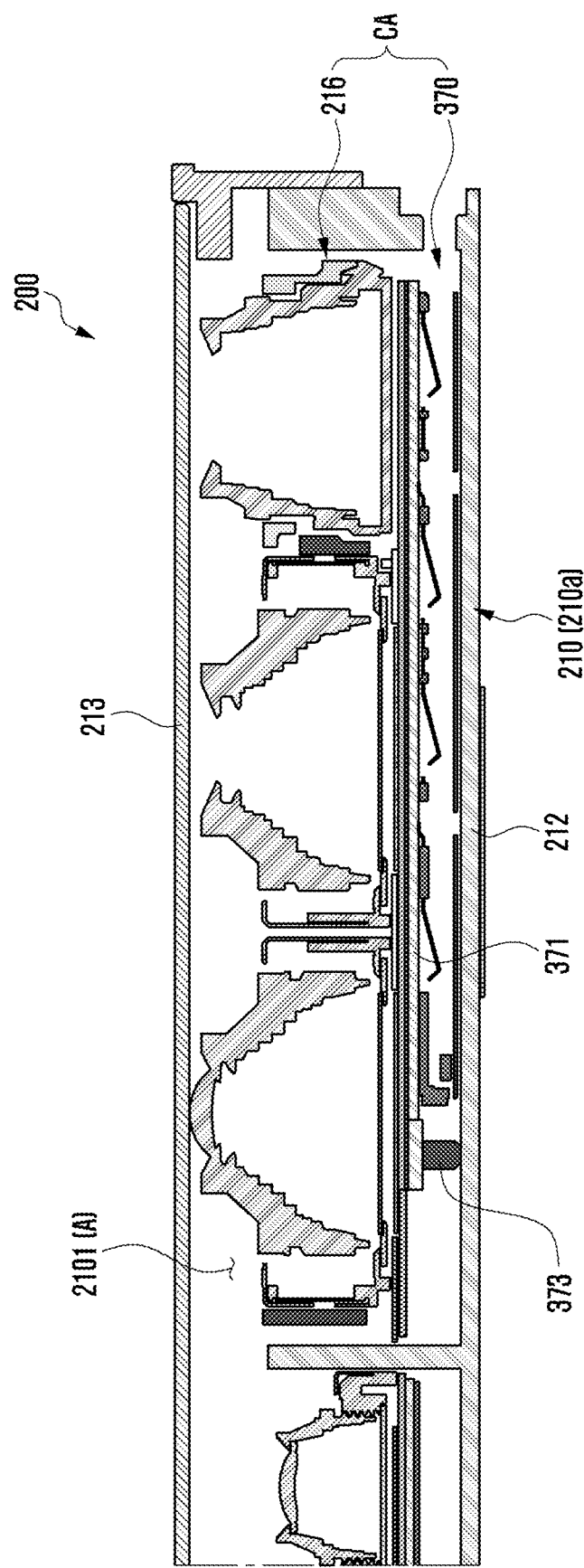
FIG. 22 illustrates a partial cross-sectional view of an electronic device as seen along line 22-22 of FIG. 18A according to various embodiments of the disclosure.

FIGS. 21A to 21C illustrate perspective views of an assembly operation of a component assembly according to various embodiments of the disclosure. FIG. 22 illustrates a partial cross-sectional view of an electronic device as seen along line 22-22 of FIG. 18A according to various embodiments of the disclosure.

Referring to FIGS. 21A to 21C, in an embodiment, a component assembly CA may include a socket module 370 and a camera module 216 combined with the socket module 370 in a laminated manner. According to an embodiment, the socket module 370 may include a substrate 371 including a connector 3711 and a socket base 372 disposed on the substrate 371. According to an embodiment, the component assembly CA may include a reinforcement plate 380 disposed between the substrate 371 of the socket module 370 and camera modules 216. According to an embodiment, the reinforcement plate 380 may help stiffness reinforcement of the component assembly CA, and may reduce the performance degradation of the camera module 216 through performing of a shielding action. In a certain embodiment, the reinforcement plate 380 may firmly fix electronic components of the component assembly CA, and may provide a fixing structure with a first housing (e.g., first housing 210 of FIG. 20). In a certain embodiment, the reinforcement plate 380 may provide a heat transfer structure (e.g., heat dissipation structure) diffusing heat generated from the electronic components of the component assembly CA to the surroundings. According to an embodiment, in order to provide a fixing position of the socket module 370, the reinforcement plate 380 may include an alignment projection part 381 projecting from an outer surface in a designated shape. According to an embodiment, the reinforcement plate 380 may be formed of a metal material. According to an embodiment, the socket module 370 and the camera module 216 may be fixed to the reinforcement plate 380 through adhesive members 382 and 383 (e.g., double-sided tape). In a certain embodiment, the socket module 370 and the camera module 216 may be fixed to the reinforcement plate 380 through bonding, ultrasonic welding, or structural combination.

Referring to FIG. 22, in case that a component assembly CA is disposed in a first space 2101 (e.g., first subspace A) of a first housing 210, a camera module 216 may face a first rear cover 213, and a socket module 370 may face a first support member 212. In this case, an electronic device 200 may further include a middle member 373 disposed between the socket module 370 and the first support member 212. According to an embodiment, the middle member 373 may be disposed so as to come in substantial contact with the socket module 370 and a conductive part of the first support member 212. According to an embodiment, the middle member 373 may include a conductive buffer member which grounds the socket module 370 in the first housing 210 and performs buffering action. According to an embodiment, the conductive buffer member may include at least one of conductive sponge, conductive tape, or conductive adhesives. According to an embodiment, the middle member 373 may include a heat transfer member for diffusing heat generated from the socket module 370 and/or the camera module 216 to the first housing 210. According to an embodiment, the heat transfer member may include a thermal interface material (TIM). In a certain embodiment, the middle member 373 may be replaced by a material that can perform all of buffering, insulating, and heat transfer actions.

According to the exemplary embodiments of the disclosure, the electronic device has the arrangement structure for the antenna which can manifest the designated radiation performance regardless of the slide-in state and/or the slide-out state, and thus can help reliability improvement of the electronic device.

According to various embodiments, an electronic device (e.g., electronic device 200 of FIG. 5A) may include a first housing (e.g., first housing 210 of FIG. 5A) including a first space (e.g., first space 2101 of FIG. 5A) and including a first support member (e.g., first support member 212 of FIG. 5A) at least partly extending to the first space; a second housing (e.g., second housing 220 of FIG. 5A) including a second space (e.g., second space 2201 of FIG. 5A), including a second support member (e.g., second support member 222 of FIG. 5A) at least partly extending to the second space, and slidably combined with the first housing along a first direction (e.g., direction ① of FIG. 5A); a bendable member (e.g., bendable member 240 of FIG. 5A) connected to the first housing, being at least partly accommodated in the second space in a slide-in state, and at least partly forming the same plane with the first housing in a slide-out state; a flexible display (e.g., flexible display 230 of FIG. 3A) including a first part (i.e., first part 230a of FIG. 3A) disposed to be seen from an outside in the slide-in state, and a second part (e.g., second part 230b of FIG. 3A) extending from the first part and being at least partly accommodated in the second space so as not to be seen from the outside through the bendable member; at least one first antenna (e.g., first antenna R of FIG. 9B) disposed in the first housing; and a wireless communication circuit (e.g., wireless communication module 192 of FIG. 1) disposed in the first space and configured to transmit and/or receive a wireless signal in at least one frequency band through the at least one first antenna, wherein the first support member may include a non-overlapping part (e.g., non-overlapping part A of FIG. 5A) not overlapping the second support member in the slide-in state and at least partly formed as a non-conductive area (e.g., non-conductive area C of FIG. 9B), and wherein as seen from an upside of the first support member, the at least one first antenna may be disposed in a position overlapping the non-conductive area.

According to various embodiments, in the slide-out state, the second part of the flexible display may be at least partly exposed to the outside to be seen from the outside while being supported by the bendable member.

According to various embodiments, the first support member may be formed through a conductive material and a non-conductive material insert-injected into the conductive material, and the non-conductive area may be formed of the non-conductive material.

According to various embodiments, the electronic device may include a main board disposed in the first space, and the wireless communication circuit may be disposed on the main board.

According to various embodiments, the first housing may include a first side member including a first side surface parallel to the first direction, a second side surface extending from the first side surface in a second direction being vertical to the first direction, and a third side surface extending from the second side surface in a direction parallel to the first side surface, and the first support member may extend from the first side member to the first space.

According to various embodiments, the second housing may include a second side member including a fourth side surface facing at least a part of the first side surface, a fifth side surface extending from the fourth side surface and disposed in parallel to the second side surface, and a sixth side surface extending from the fifth side surface and facing at least a part of the third side surface, and the second support member may extend from the second side member to the second space.

According to various embodiments, in the slide-in state, the first side surface and the third side surface may be hidden by the fourth side surface and the sixth side surface so as not to be seen from the outside.

According to various embodiments, in the slide-in state, the first support member may extend from the non-overlapping part, and may include an overlapping part overlapping the second support member.

According to various embodiments, the first side member may include at least one first conductive part formed through at least one first non-conductive part in an area corresponding to the non-overlapping part, and the at least one first conductive part may be electrically connected to the wireless communication circuit.

According to various embodiments, the at least one first conductive part and/or the at least one first non-conductive part may be disposed at least partly to be seen from the outside on at least a part of the first side surface and/or at least a part of the second side surface and/or the third side surface.

According to various embodiments, the second side member may include at least one second conductive part formed through at least one second non-conductive part, and the at least one second conductive part may be electrically connected to the wireless communication circuit.

According to various embodiments, the at least one second conductive part and/or the at least one second non-conductive part may be disposed at least partly to be seen from the outside on the fourth side surface, the fifth side surface, and/or the sixth side surface.

According to various embodiments, the electronic device may include at least one cover member disposed on the fourth side surface and/or the sixth side surface, and the at least one second conductive part and/or the at least one second non-conductive part may be at least partly hidden through the at least one cover member.

According to various embodiments, the at least one second conductive part may be electrically connected to a main board through an electrical connection member.

According to various embodiments, the electrical connection member may include a flexible printed circuit board (FPCB) connecting the at least one second conductive part and the main board with each other.

According to various embodiments, in the slide-in state, the at least one first non-conductive part formed on the first side surface and/or the third side surface may be disposed in a position facing the at least one second non-conductive part formed on the fourth side surface and/or the sixth side surface.

According to various embodiments, the electronic device may include a first rear cover disposed on at least a part of the first support member, and a second rear cover disposed on at least a part of the second support member.

According to various embodiments, the electronic device may further include at least one second antenna disposed between the second support member and the second rear cover, and the at least one second antenna may be electrically connected to the main board through an FPCB.

According to various embodiments, the FPCB may be connected from the second space to the first space through a through-hole formed on the first support member.

According to various embodiments, the at least one second antenna may include a multi-function coil or multi-function core (MFC) antenna for performing a wireless charging function, a near field communication (NFC) function, and/or an electronic payment function.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a first housing;
a second housing slidably coupled to the first housing based on a slide-in state or a slide-out state of the second housing;
a flexible display including:
a first portion disposed to be visible from an outside in the slide-in state, and
a second portion extending from the first portion based on a transition from the slide-in state to the slide-out state of the second housing and received in an inner space of the second housing in the slide-in state;
at least one first antenna disposed in the first housing; and
a wireless communication circuit disposed in the first housing and configured to transmit or receive a wireless signal in at least one frequency band through the at least one first antenna,
wherein the first housing includes a non-overlapping part not overlapping the second housing in the slide-in state and at least partly formed as a non-conductive area, and
wherein the at least one first antenna is disposed in a position for transmitting or receiving the wireless signal through the non-conductive area.

2. The electronic device of claim 1, wherein:
the first housing comprises at least one first conductive part formed through at least one first non-conductive part in the non-overlapping part, and
the at least one first conductive part is electrically connected to the wireless communication circuit.

3. The electronic device of claim 2, wherein the first housing comprises a first side member,
wherein the first side member includes:
a first side surface in a first direction,
a second side surface extending from the first side surface in a second direction being vertical to the first direction, and
a third side surface extending from the second side surface in a direction parallel to the first side surface, and
wherein the at least one first conductive part or the at least one first non-conductive part are disposed at least partly to be visible to the outside on at least one of: at least a part of the first side surface, at least a part of the second side surface, or at least a part of the third side surface in the slide-in state.

4. The electronic device of claim 3, wherein:
the second housing comprises at least one second conductive part formed through at least one second non-conductive part, and
the at least one second conductive part is electrically connected to the wireless communication circuit.

5. The electronic device of claim 4, wherein the second housing comprises a second side member, wherein the second side member includes:
a fourth side surface facing at least a part of the first side surface,
a fifth side surface extending from the fourth side surface and disposed in parallel to the second side surface, and
a sixth side surface extending from the fifth side surface and facing at least a part of the third side surface, and
wherein the at least one second conductive part or the at least one second non-conductive part are disposed at least partly to be visible to the outside on at least one of: at least a part of the fourth side surface, at least a part of the fifth side surface, or at least a part of the sixth side surface.

6. The electronic device of claim 5, wherein, in the slide-in state, the first side surface is hidden by the fourth side surface and the third side surface is hidden by the sixth side surface such that the first side surface and third side surface are not visible to the outside in the slide-in state.

7. The electronic device of claim 5, further comprising at least one cover member disposed on the fourth side surface or the sixth side surface,
wherein the at least one second conductive part or the at least one second non-conductive part are at least partly hidden through the at least one cover member.

8. The electronic device of claim 7, wherein the at least one second conductive part is electrically connected to the wireless communication circuit in the first housing through a flexible printed circuit board (FPCB).

9. The electronic device of claim 5, wherein the at least one first non-conductive part formed on the first side surface or the third side surface is disposed in a position facing the at least one second non-conductive part formed on the fourth side surface or the sixth side surface in the slide-in state.

10. The electronic device of claim 5, wherein the first housing comprises a first support member at least partly extending from the first side member to an inner space of the first housing,
wherein the second housing comprises a second support member at least partly extending from the second side member to the inner space of the second housing, and
wherein the first support member extends from the non-overlapping part, and comprises an overlapping part overlapping the second support member.

11. The electronic device of claim 10, further comprising:
a first rear cover disposed on at least a part of the first support member; and
a second rear cover disposed on at least a part of the second support member.

12. The electronic device of claim 10, further comprising at least one second antenna disposed between the second support member and a second rear cover,
wherein the at least one second antenna is electrically connected to a main board disposed in the first housing through a FPCB.

13. The electronic device of claim 12, wherein the FPCB is connected from the inner space of the second housing to the inner space of the first housing through a through-hole formed on the first support member.

14. The electronic device of claim 12, wherein the at least one second antenna comprises at least one of: a multi-function coil or multi-function core (MFC) antenna for performing a wireless charging function, a near field communication (NFC) function, or an electronic payment function.

15. The electronic device of claim 1, further comprising a bendable support connected to the first housing and configured to support the second portion of the flexible display in the slide-out state.

16. The electronic device of claim 15, wherein the second portion of the flexible display is supported by the bendable support and visible, at least in part, from the outside in the slide-out state.

17. The electronic device of claim 1, wherein the first antenna includes at least one conductive pattern disposed through at least one of a main board and antenna carrier within the first housing.

18. An electronic device comprising:
  a first housing including at least one conductive part formed through at least one non-conductive part in an area;
  a second housing slidably coupled to the first housing based on a slide-in state or a slide-out state of the second housing;
  a flexible display including:
    a first portion disposed to be visible from an outside in the slide-in state, and
    a second portion extending from the first portion based on a transition from the slide-in state to the slide-out state of the second housing and received in an inner space of the second housing in the slide-in state; and
  a wireless communication circuit disposed in the first housing and configured to transmit or receive a wireless signal in at least one frequency band through the at least one conductive part,
  wherein the first housing includes a non-overlapping part not overlapping the second housing in the slide-in state, and
  wherein the at least one conductive part is disposed in the non-overlapping part.

19. The electronic device of claim 18, wherein the first housing comprises a first side member, the first side member includes:
  a first side surface in a first direction;
  a second side surface extending from the first side surface in a second direction being vertical to the first direction; and
  a third side surface extending from the second side surface in a direction parallel to the first side surface,
  wherein the at least one conductive part or the at least one non-conductive part are disposed at least partly to be visible the outside on at least one of: at least a part of the first side surface, at least a part of the second side surface, or at least a part of the third side surface in the slide-in state.

20. The electronic device of claim 19, wherein the second housing comprises a second side member, the second side member includes:
  a fourth side surface facing at least a part of the first side surface;
  a fifth side surface extending from the fourth side surface and disposed in parallel to the second side surface; and
  a sixth side surface extending from the fifth side surface and facing at least a part of the third side surface,
  wherein, in the slide-in state, the first side surface is hidden by the fourth side surface and the third side surface is hidden by the sixth side surface, such that the first side surface and the third side surface are not visible to the outside.

* * * * *